(12) United States Patent
Lincoln

(10) Patent No.: US 12,458,473 B2
(45) Date of Patent: Nov. 4, 2025

(54) SYSTEM AND METHOD FOR FULL ARCH, TEETH-ONLY BRIDGE DESIGN

(71) Applicant: TruBridge Dental L.L.C., Bainbridge, WA (US)

(72) Inventor: Helena Soomer Lincoln, Bainbridge Island, WA (US)

(73) Assignee: TruBridge Dental L.L.C., Bainbridge Island, WA (US)

( * ) Notice: Subject to any disclaimer, the term of this patent is extended or adjusted under 35 U.S.C. 154(b) by 50 days.

(21) Appl. No.: 18/631,602

(22) Filed: Apr. 10, 2024

(65) Prior Publication Data

US 2025/0318916 A1    Oct. 16, 2025

(51) Int. Cl.
*A61C 13/00* (2006.01)
*A61C 8/00* (2006.01)
(Continued)

(52) U.S. Cl.
CPC ........ *A61C 13/0004* (2013.01); *A61C 8/0095* (2013.01); *A61C 13/34* (2013.01); *G05B 19/4097* (2013.01); *G06T 19/20* (2013.01); *G05B 2219/35012* (2013.01); *G05B 2219/45167* (2013.01); *G06T 2219/2004* (2013.01); *G06T 2219/2016* (2013.01); *G06T 2219/2021* (2013.01)

(58) Field of Classification Search
CPC ... A61C 13/0004; A61C 13/34; A61C 8/0006; A61C 8/0036; A61C 8/0018; A61C 8/0077; A61C 8/095; A61C 8/0037; A61C 13/00; A61C 13/0001; A61C 13/0003; A61C 13/0006; A61C 13/08; A61C 13/081; A61C 13/087; A61C 13/09; A61C 13/26; G06T 19/20
See application file for complete search history.

(56) References Cited

U.S. PATENT DOCUMENTS

2018/0000568 A1* 1/2018 Berger .................. A61C 13/26
2021/0128280 A1* 5/2021 Gregg, II ............. A61C 8/0089
(Continued)

FOREIGN PATENT DOCUMENTS

EP           4088684 A1 * 12/2021 ............. A61C 13/00

*Primary Examiner* — Yogesh P Patel
(74) *Attorney, Agent, or Firm* — Christensen O'Connor Johnson Kindness PLLC

(57) ABSTRACT

A method of making a teeth-only, gingiva-free dental restoration device for a full-arch dental replacement of a replacement arch of a patient may include using a computing device for: receiving a model of a replacement arch of a patient having post-extraction tooth sockets defined by a substantially original interdental and interradicular ridge of the patient; generating a model of a teeth-only, gingiva-free dental restoration device having individual replacement teeth portions each having a tooth axis extending between a gingival section and an incisal/occlusal section; designating individual replacement teeth portions to include abutment holes based on a location in the model of the replacement arch of straight implants secured within corresponding post-extraction tooth sockets; modifying at least one of a location, shape, and size of one or more of the teeth portions; and outputting information regarding the model for fabricating a teeth-only, gingiva-free dental restoration device.

15 Claims, 65 Drawing Sheets

(51) Int. Cl.
*A61C 13/34* (2006.01)
*G05B 19/4097* (2006.01)
*G06T 19/20* (2011.01)

(56) References Cited

U.S. PATENT DOCUMENTS

2021/0220093 A1* 7/2021 Sato .................... A61C 8/0095
2022/0061966 A1* 3/2022 Häfele ............... A61C 13/0004

* cited by examiner

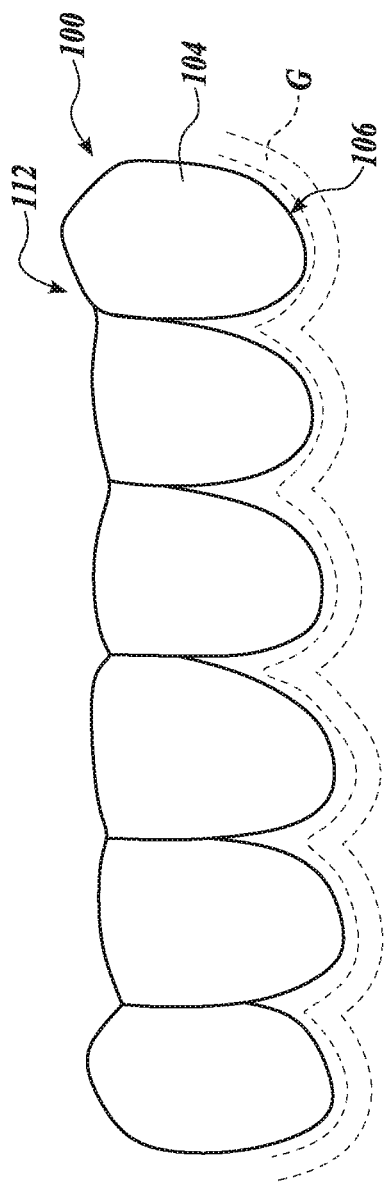
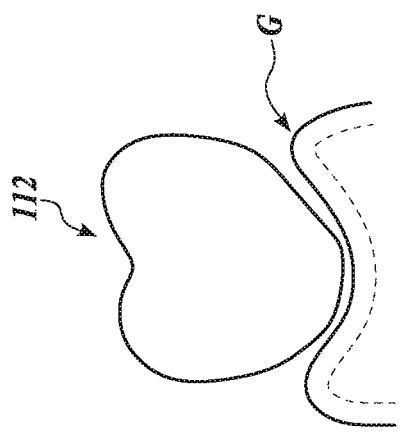
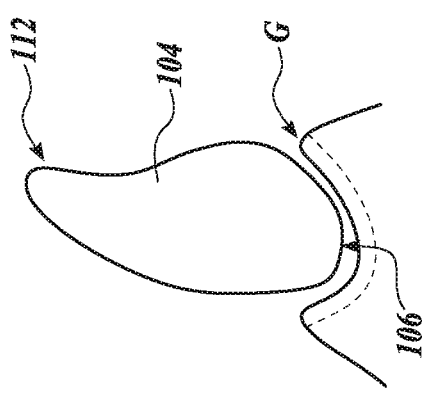
FIG. 13A
FIG. 13B
FIG. 13C

SYSTEM AND METHOD FOR FULL ARCH, TEETH-ONLY BRIDGE DESIGN

SUMMARY

A method of making a teeth-only, gingiva-free dental restoration device for a full-arch dental replacement of a replacement arch of a patient may include: receiving, with a computing device, a model of a replacement arch of a patient having post-extraction tooth sockets defined by a substantially original interdental and interradicular ridge of the patient; generating, with a computing device, a model of a teeth-only, gingiva-free dental restoration device having individual replacement teeth portions, each individual replacement tooth portion having a tooth axis extending between a gingival section and an incisal/occlusal section of the tooth portion; designating, with a computing device, at least first, second, third, and fourth individual replacement teeth portions to include abutment holes based on a location in the model of the replacement arch of at least first, second, third, and fourth straight implants secured within at least first, second, third, and fourth corresponding post-extraction tooth sockets; modifying, with a computing device, at least one of a location, shape, and size of one or more of the teeth portions; outputting, with a computing device, information regarding the model of the teeth-only, gingiva-free dental restoration device for fabricating a teeth-only, gingiva-free dental restoration device.

A system for making a teeth-only, gingiva-free dental restoration device for a full-arch dental replacement of a replacement arch of a patient may include: a scanning system having a scanner for capturing scan data of a replacement arch of a patient having post-extraction tooth sockets defined by a substantially original interdental and interradicular ridge of the patient; a design computing device having at least one processor and a non-transitory computer-readable medium; wherein the design computing device is communicatively coupled to the scanning system; wherein the non-transitory computer-readable medium has a data store and computer-executable instructions stored thereon; and wherein the instructions, in response to execution by the at least one processor, cause the design computing device to perform actions comprising: receiving a model of the replacement arch of the patient generated from the scan data; generating a model of a teeth-only, gingiva-free dental restoration device having individual replacement teeth portions, each individual replacement tooth portion having a tooth axis extending between a gingival section and an incisal/occlusal section of the tooth portion; designating at least first, second, third, and fourth individual replacement teeth portions to include abutment holes based on a location in the model of the replacement arch of at least first, second, third, and fourth straight implants secured within at least first, second, third, and fourth corresponding post-extraction tooth sockets; modifying at least one of a location, shape, and size of one or more of the teeth portions; outputting information regarding the model of the teeth-only, gingiva-free dental restoration device for fabricating a teeth-only, gingiva-free dental restoration device.

A method of training one or more machine learning models to generate a model of a teeth-only, gingiva-free dental restoration device for a replacement arch of a patient may include: receiving, by a computing device, training data including models of teeth-only, gingiva-free dental restoration devices for replacement arches of patients and at least one of corresponding scan data of an antagonist arch, corresponding scan data of a replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetics requirements, and corresponding bridge material; adding, by a computing device, the training data in a data store; training, by a computing device, the machine learning model to generate a model of a teeth-only, gingiva-free dental restoration device for the replacement arch of the patient using the training data as input; and storing, by a computing device, the one or more machine learning models in a data store.

A method of using one or more machine learning models to generate a model of a teeth-only, gingiva-free dental restoration device for a replacement arch of a patient may include: receiving, with a computing device, at least one input regarding dental restoration for the replacement arch of a patient including at least one of scan data of an antagonist arch of the patient, scan data of the replacement arch before extraction, scan data of the replacement arch after extraction and before implant placement, scan data of the replacement arch after extraction and after implant placement, scan data of the replacement arch after extraction and implant placement with scan bodies, implant specifications, abutment specifications, required crown tooth portion size surrounding an abutment hole, aesthetic requirements, and bridge material; retrieving, by a computing device, one or more machine learning models from a data store; and processing, by a computing device, the input using the one or more machine learning models to generate a model of a teeth-only, gingiva-free dental restoration device for the replacement arch of the patient as output.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 13A-13C depict front and side views of portions of a dental bridge shown formed in accordance with exemplary aspects of the present disclosure seated against a ridge/gingiva of a patient's jaw preserved in accordance with exemplary aspects of the pre-prosthetic ridge preservation process of FIGS. 8A-8C.

DETAILED DESCRIPTION

Systems and methods for designing a full arch, teeth-only bridge are disclosed herein.

Figure 1:
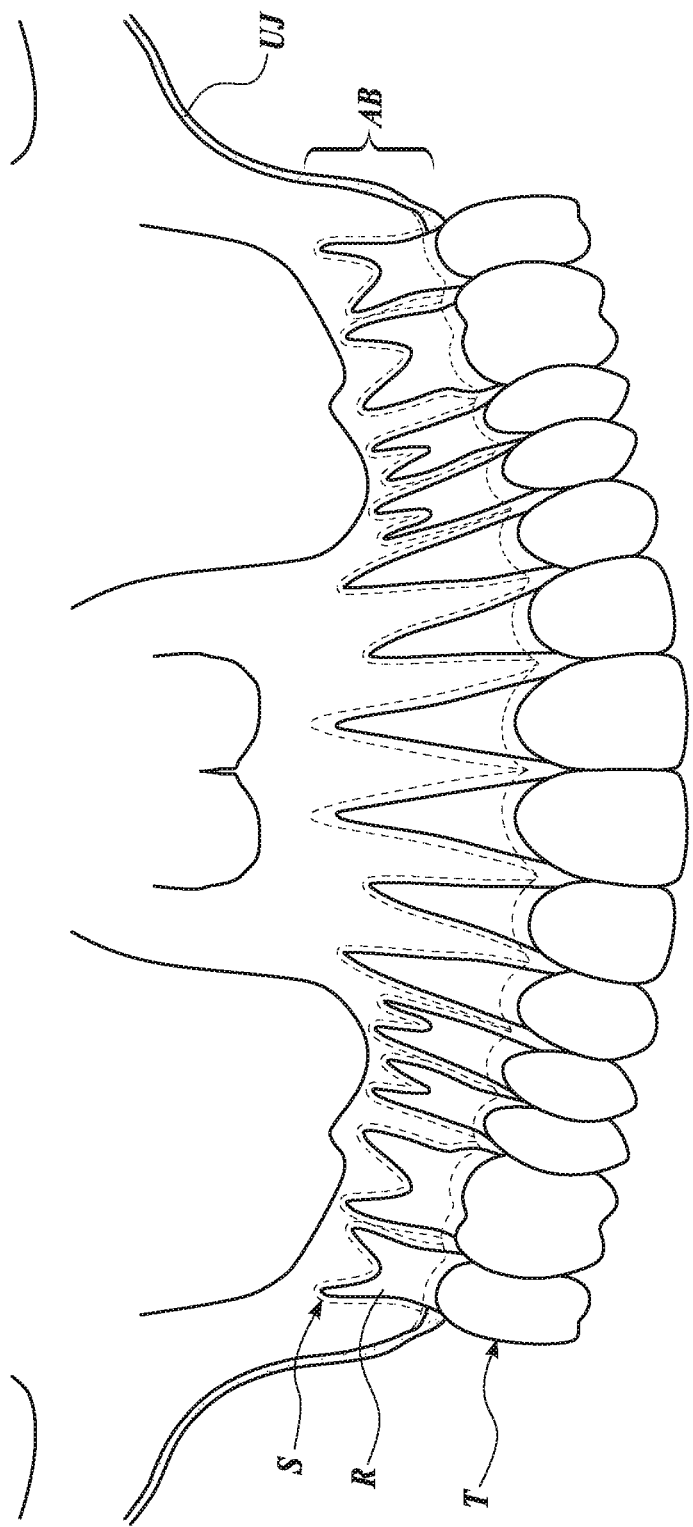
FIG. 1 depicts an image of an exemplary human upper jaw showing fourteen (14) natural teeth each having roots secured within corresponding teeth sockets defined in an upper jawbone.

FIG. 1 depicts an image of an exemplary human upper jaw showing fourteen (14) natural teeth T each having roots R secured within corresponding teeth sockets S defined in an upper jawbone UJ. The portion of the upper jawbone UJ defining the teeth sockets S is called the alveolar bone AB.

Tooth decay can necessitate removal of a diseased part of the tooth and restoration of the same, which is typically an ongoing process. Small restorations (e.g., fillings) can become larger restorations (e.g., crowns or bridges) as the tooth ages. Ultimately, there may be a time when a tooth becomes non-restorable (also sometimes called "non-retainable" or "terminal"). For instance, the tooth may be cracked, a tooth may have decay on the root surface, a tooth may have poor bone support, etc. In such an instance, a dental professional may determine that it is better for the health of the remaining dentition to remove such teeth. In some instances, all or substantially all of the teeth of the upper and/lower jaw may necessitate replacement, and a full mouth (e.g., 10, 12, or 14-teeth of an upper or lower jaw) teeth replacement is recommended. There are various modalities to replace teeth.

For instance, a dental implant(s) may be secured within a jaw of a patient, and a single tooth, a bridge of teeth, or implant retained dentures are then secured to the dental implant. More specifically, a dental implant, which is a small titanium screw, is positioned into the jawbone to support either a single tooth, a bridge of teeth, or implant retained dentures. In other words, the titanium implant forms the foundation by which the replacement teeth are attached.

For a conventional dental implant procedure, a full arch rehabilitation requires six-to eight (6-8) implants to support a full fixed bridge or implant retained dentures. A limitation of the conventional full arch teeth replacement method arises when screwing the posterior implants into areas of reduced bone density.

An All On 4™ or "Malo bridge" technique as well as other similar prior art techniques has become widely acknowledged as the superior treatment option for a full-arch teeth replacement because only four implants are needed to provide support for the full arch, and the results are instant. Consumers were convinced that this form of treatment for "getting an instant, beautiful smile" was the "clear choice" over other treatment options. Aspects of this prior art treatment, such as the All On 4™ technique, including the full-arch teeth replacement prosthesis used for the technique is shown in FIGS. 2-8.

Figure 2:
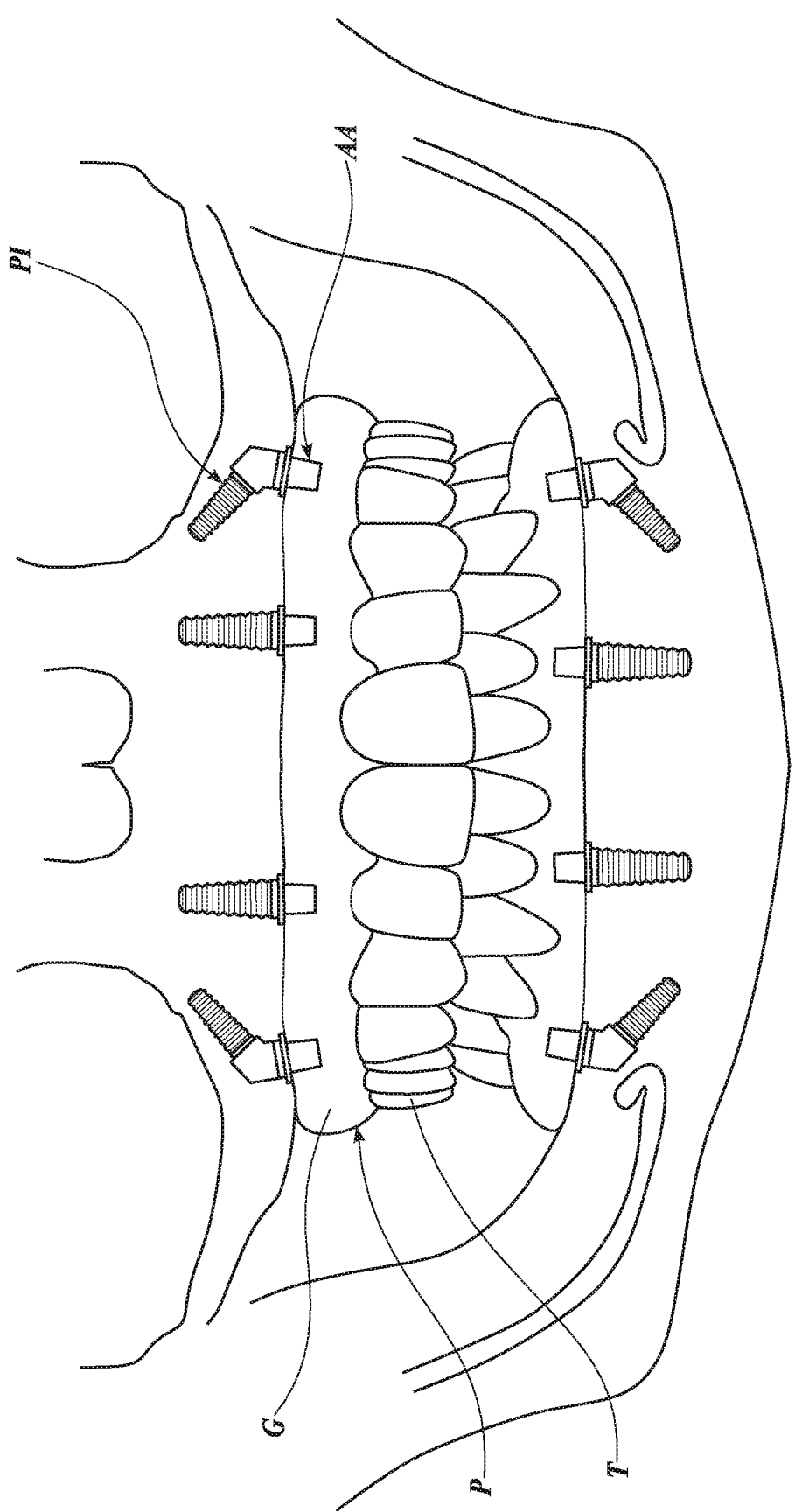
FIG. 2 depicts a front view of an exemplary prior art dental restoration system, including a full-arch teeth replacement prosthesis having artificial gingiva and teeth secured to angulated implants with angulated abutments for both an upper and lower jaw.
Figure 3:
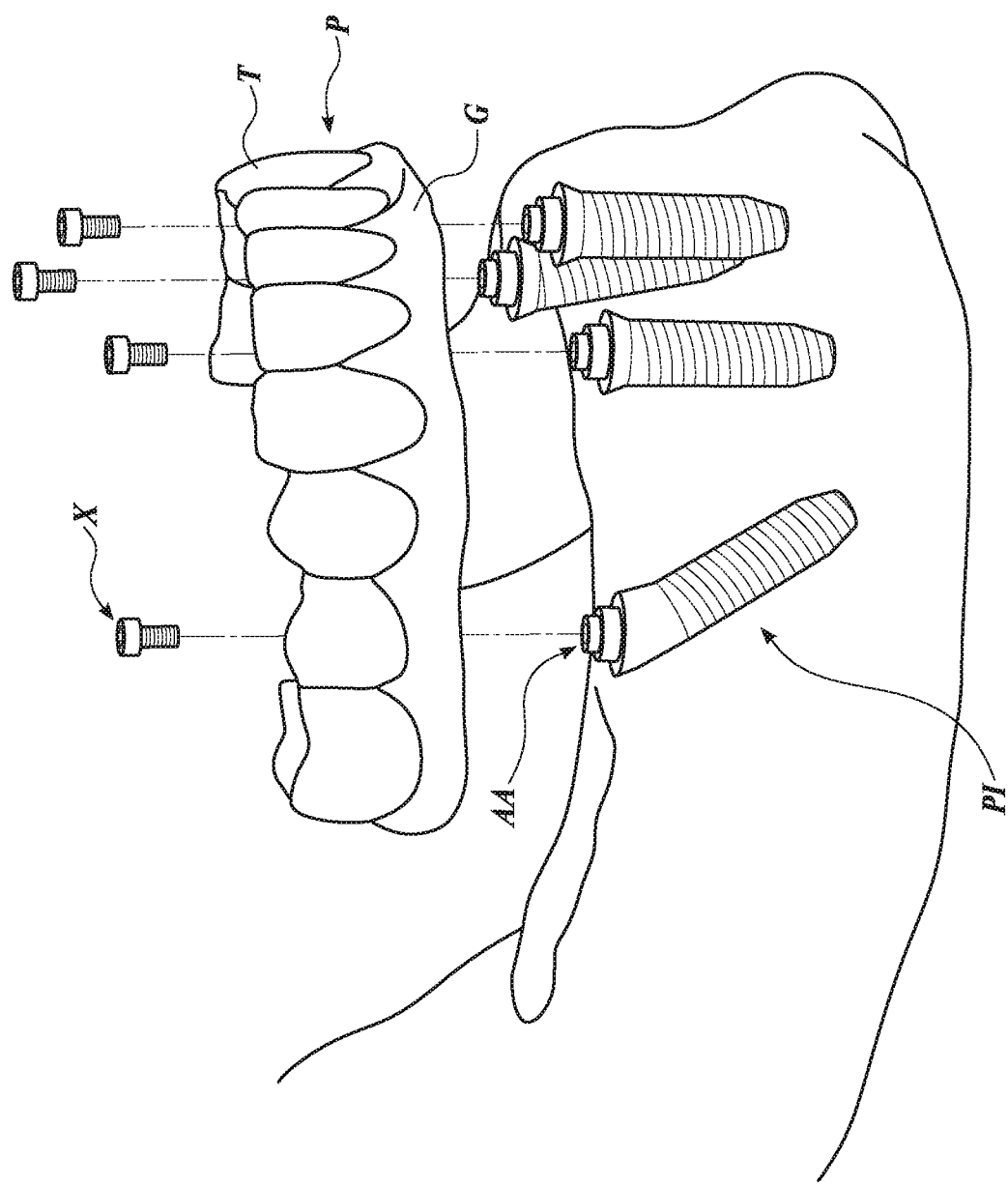
FIG. 3 depicts an isometric view of the prior art dental restoration system of FIG. 2 for the lower jaw.

Referring specifically to FIGS. 2 and 3, with the All On 4™ dental implant procedure, the posterior implants PI are tilted 45° towards the rear of the mouth and placed into the anterior maxilla, a region of the jaw with higher bone density. More specifically, long posterior implants PI are inserted at 45-degree angles into the anterior maxilla and mandible, and angled abutments AA (such as multi-unit angulated abutments) are used at the distal end of the posterior implants PI to attach a prior art prosthetic P to the upper and lower jaw. The angled abutments AA are generally at a 45-degree angle relative to the longitudinal axis of the posterior implants PI such that screws X may be inserted transversely through the prosthetic P into the abutment opening.

Compared to other implant methods, the All On 4 technique doesn't require the same density of bone in order to secure the implant. Rather, the introduction of the 45° angulated implant meant that bone-deficient areas of the jaw could be avoided.

For any dental implant procedure, a pre-prosthetic surgery is likely necessary to prepare a patient's mouth before the placement of a prosthesis. For instance, a pre-prosthetic surgery protocol may include smoothing out, reshaping, and/or partially removing the bone surrounding the teeth.

Figure 4A:
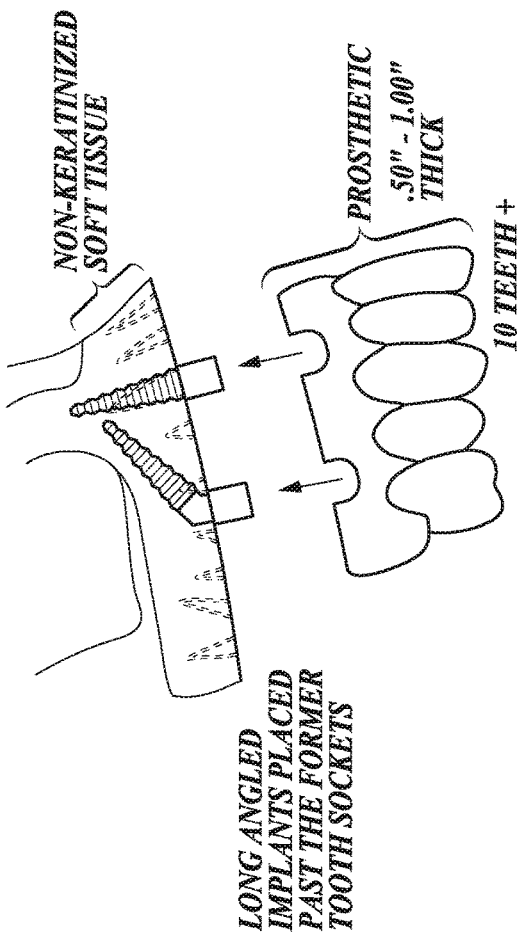
FIGS. 4A-4C depict images providing an overview of techniques used for the prior art dental restoration system of FIG. 2.
Figure 4B:
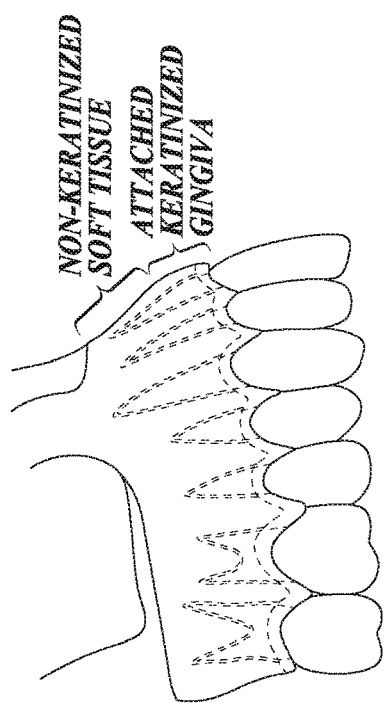
Figure 4C:
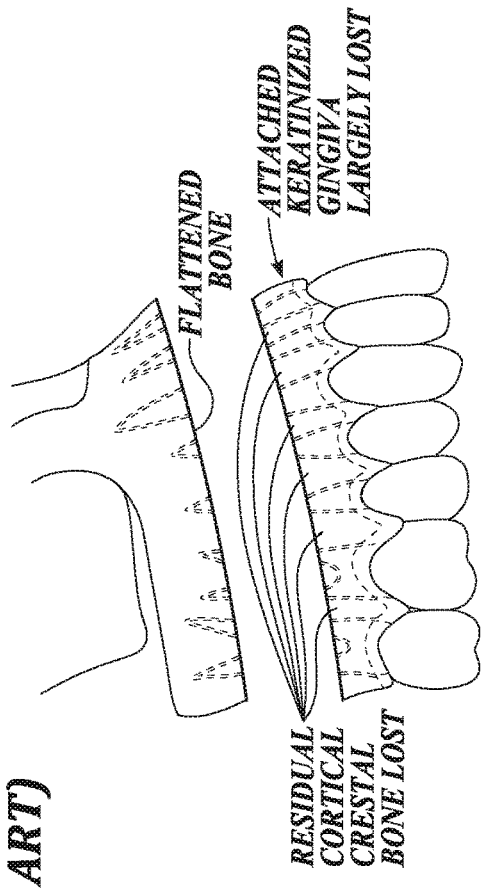
Figure 5:
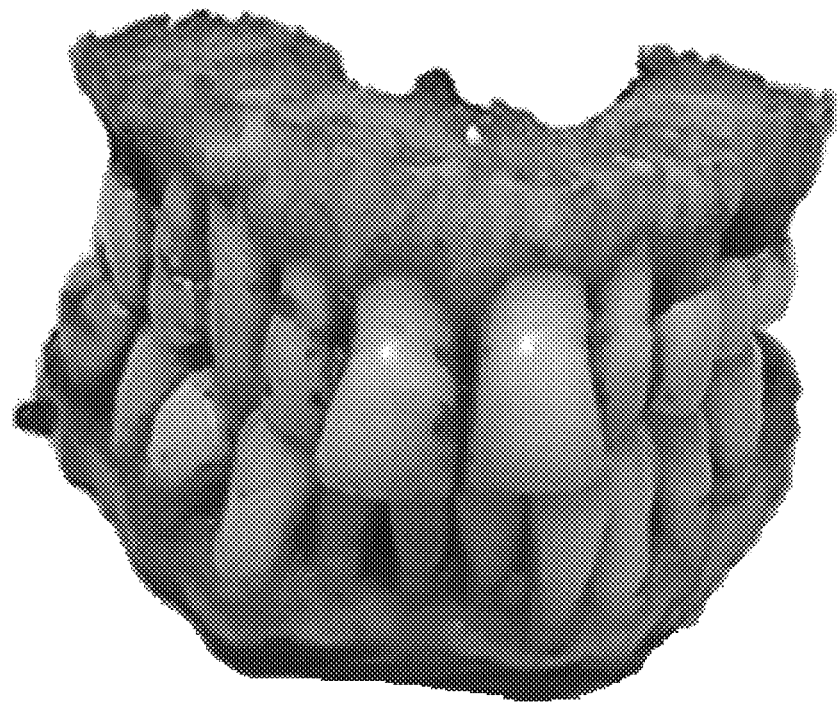
FIGS. 5 and 6 depict photograph images of a patient's teeth and jaw removed using techniques for the prior art dental restoration system of FIG. 2.
Figure 6:
Figure 7:
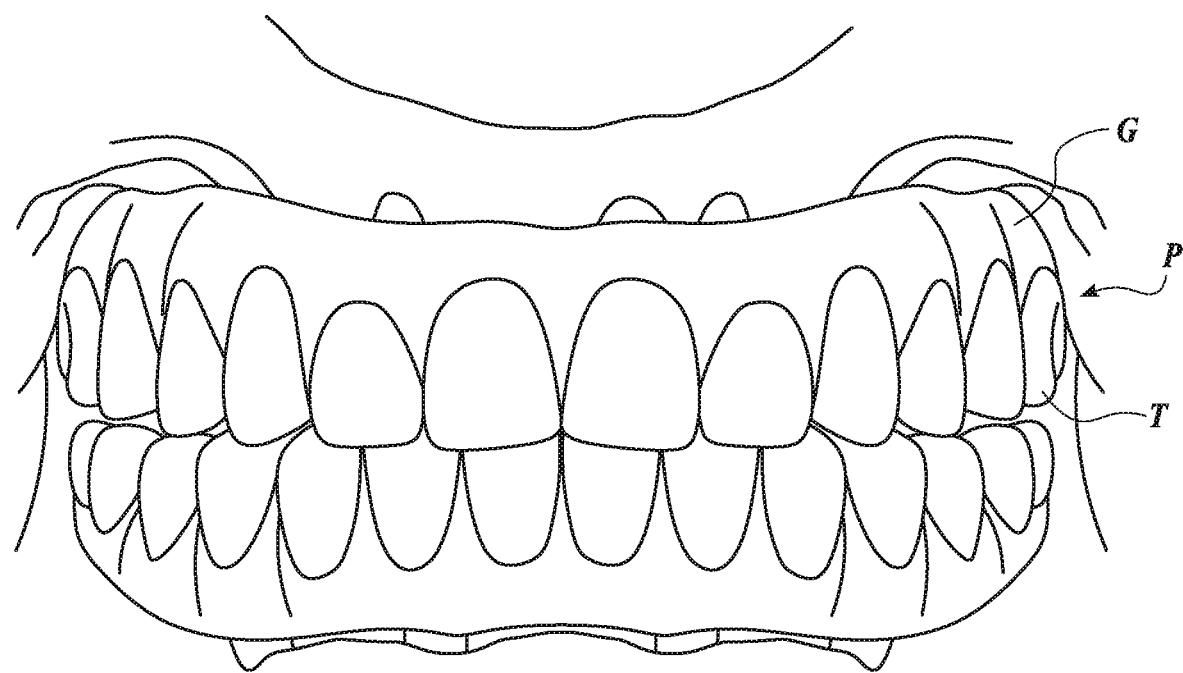
FIG. 7 depicts a full-arch teeth replacement prostheses having artificial gingiva and teeth secured to upper and lower jaws of patient.
Figure 8:
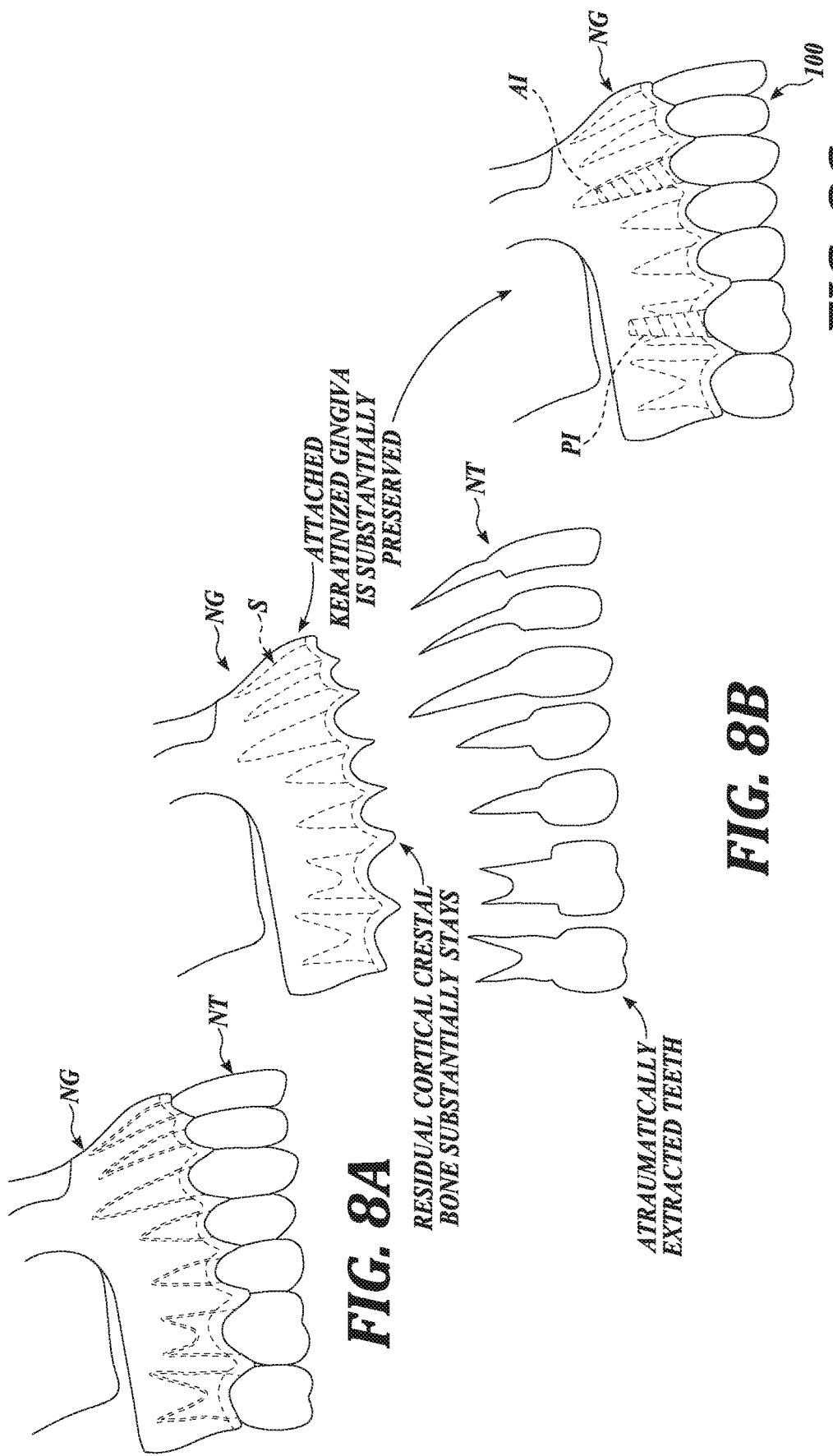
FIGS. 8A-8C depict an overview of a pre-prosthetic ridge preservation process and a dental restoration device (or simply a "dental bridge") formed in accordance with examples of the present disclosure.

Referring to FIGS. 4-6, the All On 4™ pre-prosthetic surgery protocol includes removing about one inch of bone (along the height of the jaw) from the maxillary and/or mandibular arches, which includes the alveolar bone that houses the teeth and all of the keratinized gingival tissue KG (i.e., the attached, sturdy tissue that covers the alveolar bone and supports the teeth). Such a dramatic pre-prosthetic surgery protocol used for the All On 4™ technique is quick compared to smoothing out, reshaping, and/or partially removing the bone surrounding the teeth to accommodate individual teeth, a conventional bridge, etc. The rehabilitation process for the All On 4™ pre-prosthetic surgery is also considerably shorter because the bone does not need to heal to support the new prosthetic. Further, because fewer implant fixtures are used, there is more flexibility to design and fit the optimum replacement teeth compared to conventional full arch teeth replacement or the like. Accordingly, many patients have opted for this "new teeth in a day" procedure.

As noted above, the All On 4™ pre-prosthetic surgery protocol includes removing one inch of bone from maxillary and/or mandibular arches, including the alveolar bone that houses the teeth and the keratinized gingival tissue. Accordingly, the prior art prosthetic P used for the All On 4™ dental implant procedure, which is shown in FIGS. 2-4 and 7, must replace the missing bone and tissue. In that regard, the All On 4™ prior art prosthetic P includes an artificial gum portion AG and artificial teeth AT extending from the gum portion AG. When removing the bone, the maxillary and/or mandibular arches are flattened such that the artificial gum portion AG may be universally designed to generally fit in any patient's mouth. Moreover, a flattened prosthesis interface may easily seat against the jaw for securing to the implant abutments.

The prosthetic P is purposefully made tall (about one-half to one inch tall defined by the height of teeth+the height of the artificial gingiva) and thick to prevent breakage during its use, to hide the transition line from artificial gingiva to patient's natural gingiva, and to provide instant teeth secured to the just-placed implants without a period of healing. However, when so tall and thick, the prosthetic P can include only ten (versus twelve or fourteen) teeth, i.e., the prosthetic P does not usually include the second bicuspid and second molar. If the prosthetic P included all fourteen functional teeth, the prosthetic P would be so large that the patient could not open sufficiently wide to allow for the prosthetic P to be screwed into their jaw.

The design of the prosthetic P includes other drawbacks. For instance, the prosthetic P does not seat with the patient's gum line in a way that teeth naturally do, which makes it very difficult to clean underneath the prosthetic, often leading to chronic tissue irritation and inflammation. Moreover, a tall and thick prosthetic such as the All On 4™ prosthetic P causes speech difficulties, such as in the form of lisping from the gap that forms between the prosthetic and the patient's natural gums. Further, despite being tall and thick, breakage still frequently occurs.

As a further issue, the long-angled implants are placed in the jawbone past the former tooth sockets, into the native bone that is naturally not meant to house roots or implants. Moreover, implants that are at sharp angles and abrupt transitions like the 45-degree angle implants used with the All On 4™ procedure are un-natural to the body and often cause soft tissue irritation and inflammation. Moreover, if the underlying implants fail, the patient cannot later decide to use a different type of prosthetic because the bone and gum has already been permanently removed.

Accordingly, it can be appreciated that the quick teeth replacement fix provided by the All On 4™ procedure or similar procedures has major drawbacks.

Systems and methods disclosed herein are directed to computer-aided design and fabrication of a unique and custom dental restoration device that can support a full mouth teeth replacement (e.g., 10 to 14 teeth of an upper or lower jaw) while using a minimal number of straight or non-angulated implants (e.g., four non-angulated implants) and while preserving a patient's bone and natural gum line to provide a natural teeth feel and look. In that regard, a dental restoration device made in accordance with the exemplary systems and methods described herein is designed to replace all teeth of a patient's arch while avoiding the need to remove bone in preparation for receiving and mating the patient's gums with the dental restoration device.

Generally, the systems and methods disclosed herein include designing and fabricating a full arch, teeth-only bridge that is configured to be secured to a patient's preserved, natural ridge or bone/gum line. In that regard, using the systems and methods described herein, a dental restoration device may be designed and made for a full-mouth dental replacement that is free of artificial gingiva. Rather, the dental restoration device includes only artificial teeth that seat directly against a patient's natural bone/gum line. Moreover, no connecting part or similar is needed for securing the dental restoration device to the implants or otherwise providing an interface between the dental restoration device and the implants.

The dental restoration device described herein is generally configured as a full arch dental bridge and may hereinafter be referenced as a "full arch bridge", "dental bridge", "bridge", or the like. However, it should be noted that the dental restoration device may instead be considered to be any other suitable dental restoration device, such as an implant-based denture, a prosthetic, etc. Accordingly, the use of the term "bridge" should not be seen as limiting.

The dental restoration device described herein may be configured as a full arch dental bridge for replacing all the teeth in the upper or lower arch of a patient. In some cases, both an upper and lower arch will need to be replaced. In other cases, only one of the arches needs to be replaced. In any event, when the systems and methods disclosed herein are being used to design and fabricate a full arch, teeth-only bridge, it is for a "replacement arch" of the patient, regardless of whether it is the upper or lower arch. The other of the upper or lower arch that is not being designed and/or fabricated is considered the antagonist (opposite) arch, regardless of whether it includes original teeth (including crowns, partial bridges, dental implants, prosthetics, dentures, etc.) or a full arch, teeth-only bridge designed and fabricated in accordance with the exemplary systems and methods described herein. Moreover, in some instances, both the upper and lower arch may be designed and fabricated simultaneously or substantially simultaneously, in which case both the upper and lower arch may be considered a replacement arch and an antagonist arch, depending on the task at hand.

A dental restoration device or full arch bridge designed and made in accordance with exemplary systems and methods described herein may be used in association with a full arch dental restoration device arch preparation system and method. A full arch preparation system and method prepares a patient's arch for receiving a full arch, teeth-only bridge as described herein. The full arch dental restoration device arch preparation system and method may incorporate aspects of a preliminary bridge design process, a pre-prosthetic ridge preservation process to prepare a patient's mouth for the bridge, and a design and use of a surgical guide configured to aid in implant placement.

A preliminary bridge design process may include using foresight and/or steps of bridge design to determine a strategy for performing at least one of the pre-prosthetic ridge preservation process and a design and use of a surgical guide. Foresight of bridge design may be based on techniques, know-how, learnings, etc., of the systems and methods for designing and fabricating a full arch, teeth-only bridge disclosed herein.

The preliminary bridge design process may include using foresight of bridge design to at least preliminarily designate a socket for implant placement, define surgical guide use strategy (e.g., determine whether a surgical guide may benefit implant placement), define design aspects of a surgical guide (e.g., type, size, configuration), define aspects of teeth extraction and ridge preservation, etc.

As noted above, the full arch dental restoration device arch preparation system and method may also incorporate aspects of a pre-prosthetic ridge preservation process used to prepare a patient's mouth for the bridge. The pre-prosthetic ridge preservation process generally includes performing atraumatic dental extractions of all the teeth in an arch and preserving the original tooth sockets of the arch. In that regard, using the atraumatic, pre-prosthetic ridge preservation process, a patient's natural ridge or bone/gum line is substantially preserved for receiving a dental restoration device designed and made in accordance with the systems and methods described herein. Any suitable pre-prosthetic ridge preservation process may be used that substantially preserves the bone and tissue defining the patient's natural tooth sockets. For instance, the pre-prosthetic ridge preservation process may include the process shown and described in the inventor's co-pending U.S. patent application Ser. No. 18/162,497 filed on Jan. 31, 2023, Ser. No. 18/593,793 filed Mar. 1, 2024, Ser. No. 18/535,699 filed Dec. 11, 2023, Ser. No. 18/535,800 filed on Dec. 11, 2023, and/or application Ser. No. 18/632,185, entitled "Arch Preparation System And Method For Receiving A Full Arch Dental Restoration Device" filed on Apr. 10, 2024, incorporated by reference in their entirety.

FIGS. 8A-8C generally depicts aspects an overview of a pre-prosthetic ridge preservation and dental restoration process, including performing atraumatic dental extractions of each natural tooth NT to prepare the patient's jaw for mating with a dental restoration device or a dental bridge 100. The dental extractions are done atraumatically in a manner that substantially preserves the bone and tissue (natural gums NG) defining the patient's natural tooth sockets S. In other words, the pre-prosthetic ridge preservation process substantially preserves the gingival-covered alveolar bone and the full height of the dental inter-radicular ridge for seating against the dental bridge 100.

Figure 9:
FIG. 9 depicts a photograph image of a patient's upper jaw showing all teeth extracted using an atraumatic tooth extraction process performed in accordance with exemplary aspects of the pre-prosthetic ridge preservation process of FIGS. 8A-8C.

FIG. 9 depicts a photograph of a patient's upper jaw showing post-extraction root sockets just after all teeth were extracted using an atraumatic tooth extraction process. All four walls of the post-extraction root socket (e.g., the 360-degree enclosed wall of the socket) are substantially left intact. After the teeth are extracted, appropriate steps (e.g., as discussed in U.S. patent application Ser. No. 18/162,497 filed on Jan. 31, 2023, Ser. No. 18/593,793 filed Mar. 1, 2024, Ser. No. 18/535,699 filed Dec. 11, 2023, Ser. No. 18/535,800 filed on Dec. 11, 2023, and/or application Ser. No. 18/632,185, entitled "Arch Preparation System And Method For Receiving A Full Arch Dental Restoration Device" filed on Apr. 10, 2024) are taken to ensure appropriate healing of the post-extraction root sockets in preparation for implant placement.

Figure 10A:
FIG. 10A depicts a photograph image of a patient's lower jaw showing post-extraction sockets about two months after all teeth were extracted using an atraumatic tooth extraction process performed in accordance with exemplary aspects of the pre-prosthetic ridge preservation process of FIGS. 8A-8C.

FIG. 10A depicts a photograph image of a patient's lower jaw showing post-extraction sockets about two months after all teeth were extracted using an atraumatic tooth extraction process. An outline of each post-extraction socket is generally defined by a dimple in the gum line. The shape and location of the dimples in the gum line may be used to define corresponding teeth locations for the dental bridge as well as an ovate contour of each of the teeth portions of the dental bridge for mating/sealing the dental bridge with the patient's gums, as described further below. The dimples in the gum line may also be used to provide a visual indication of socket locations for implant placement.

As noted above, a dental restoration device designed and made in accordance with exemplary systems and methods described herein may be secured to a patient's preserved, natural ridge or bone/gum line using only tooth or socket-sized (non-angulated or straight) implants. Unlike prior art devices and methods, socket-sized (non-angulated or straight) implants can be used in the posterior region of the jaw (e.g., the first molar tooth socket) because the implants can be secured in the substantially preserved alveolar bone of the patient. In other words, angulated implants, as used in the prior art method, are not necessary because sufficient posterior jawbone density is preserved (i.e., it is not removed during the pre-prosthetic surgery as in the prior art method).

Figure 10B:
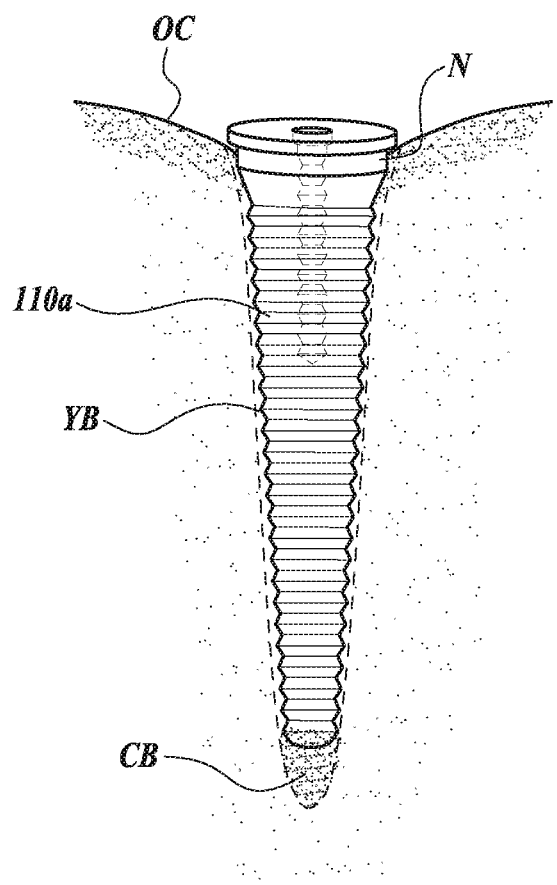
FIG. 10B depicts a front view of bi-cortical anchorage of an implant placed within a tooth socket preserved in accordance with exemplary aspects of the pre-prosthetic ridge preservation process of FIGS. 8A-8C.

Referring to FIG. 10B, each of the implants I are placed into the sockets such that a longitudinal axis of each of the implants is substantially coaxially aligned with a longitudinal axis of the corresponding tooth root. In this manner, the implant substantially harmoniously resembles the roots of the original teeth. The root socket longitudinal axis may be determined during, for instance, a cone beam computer tomography scan ("CBCT scan") optionally with an intraoral scan analysis at the beginning of the pre-prosthetic ridge preservation process and/or after atraumatic extraction is complete.

The implants are preferably placed in the root sockets such that a neck or collar C of the implant protrudes from the tooth socket. More specifically, the oblique threads 110a defined on the body of the implant may be disposed in the newly ossifying portions of the alveolar bone defining the socket (or young bone YB), the fine threads (not shown in detail) may be disposed in the outer cortex layer of the bone OC, and the collar C of the implant may be located generally above the outer cortex layer of the bone at least partially in the gingiva layer.

For instance, the collar C of the implant may be placed in a cleansable area of an upper-most periosteal layer of the bone/gingiva interface. In this manner, the implant can be accessed and engaged by the abutments when installing the dental bridge 100, without the need for a connecting part or similar component protruding from a gingival side of the bridge. By comparison, angulated implants used for the All on 4 method or similar locate the collar of the implant entirely within the bone.

Tooth or socket sized implants are placed into a necessary number and location of sockets (as can be seen visually by the dimples in the gum line) to secure the dental bridge to the preserved ridge. For instance, in the example shown in FIG. 11, four implants are placed into four corresponding sockets for each upper and lower arch for a full mouth replacement (see also FIG. 8C). Specifically, for the upper jaw UJ on a first side, an anterior tooth-sized implant AI is secured in the canine tooth socket, and a posterior tooth-sized implant PI is secured in the first molar tooth socket. Similarly, an anterior tooth-sized implant AI is secured in the canine tooth socket on a second side of the upper jaw UJ, and a posterior tooth-sized implant PI is secured in the first molar tooth socket on the second side of the upper jaw UJ. A similar implant arrangement may be used for the lower jaw LJ.

Generally, such implant placement provides sufficient canine to molar spread (e.g., good anterior-posterior distance), which provides good retention and stability for the dental bridge 100. In some cases, there may be insufficient bone in one or more of the above-noted locations. In such an instance, the placement of the implant can be moved one tooth (socket) mesially (e.g., placing a posterior tooth-sized implant in the upper second bicuspid tooth socket rather than in the first molar tooth socket) and/or an additional implant may be placed in the respective quadrant of the jaw.

Implants may be placed into the former tooth sockets (root sockets) free-handed, with the aid of a surgical guide, or a combination thereof. If placed free-handed, the root socket longitudinal axis may be determined using, for instance, a CBCT scan optionally with an intraoral scan. In that regard, the straight, longitudinal axis of the implant may be substantially aligned with the root socket longitudinal axis, and the implant may be drilled into the bone of the root socket along that axis. For instance, if the root socket longitudinal axis extends buccally/labially from an apex of the root to the gingiva at an angle of substantially 5 degrees from vertical, the implant may be arranged such that its straight, longitudinal axis is substantially 5 degrees from vertical and then drilled into the root socket at that angle. If the root socket longitudinal axis also flares distally and/or mesially from vertical, the implant may likewise be arranged such that the implant axis also flares distally and/or mesially from vertical.

The straight, longitudinal axis of the implant may be substantially aligned with the root socket longitudinal axis using visual markers, cues, etc., such as the root socket dimple defined in the gums, the notable flare of the patient's arch, an x-ray of the patient's arch relative to a marker, a laser extending from the drill, etc. The implant can be driven into the socket at the desired angle until the collar C of the implant is located generally above the outer cortex layer of the bone at least partially in the gingiva layer.

In the alternative or in addition, a surgical guide may be used to substantially align the straight, longitudinal axis of the implant with the root socket longitudinal axis and/or define a depth limitation of the implant. As noted above, the full arch dental restoration device arch preparation system and method may incorporate aspects of a design and use of a surgical guide configured to aid in implant placement.

A surgical guide is a physical device that is placed into the patient's mouth that provides indicators specifying the location of implant placement, assisting to drill implants into the bone with optimal accuracy. A surgical guide is typically designed with suitable software tools by digitally defining optimal implant positions according to the dental bridge design, accounting for any limitations related to bone density and locations of important structures in the bone. The surgical guide is used to transfer the digital design during the procedure, allowing a practitioner to place implants with precision. In some examples, a surgical guide made in accordance with the systems and methods shown and described in inventor's co-pending U.S. patent application Ser. No. 18/632,185, entitled "Arch Preparation System And Method For Receiving A Full Arch Dental Restoration Device" filed on Apr. 10, 2024, incorporated herein in, may be used.

A dental bridge 100 made in accordance with exemplary systems and methods described herein may be substantially the same as the dental restoration device or dental bridge shown and described in inventor's co-pending U.S. patent application Ser. No. 18/162,497 filed on Jan. 31, 2023, Ser. No. 18/593,793 filed Mar. 1, 2024, Ser. No. 18/535,699 filed Dec. 11, 2023, Ser. No. 18/535,800 filed on Dec. 11, 2023, incorporated herein. In that regard, only a brief overview of a dental restoration device ("dental bridge 100") designed and made in accordance with exemplary systems and methods described herein will now be described with reference to FIGS. 11-16. Generally, as noted above, the dental bridge 100 is configured to be secured against a patient's preserved, natural ridge or bone/gum line using socket sized, non-angulated implants.

Figure 11:
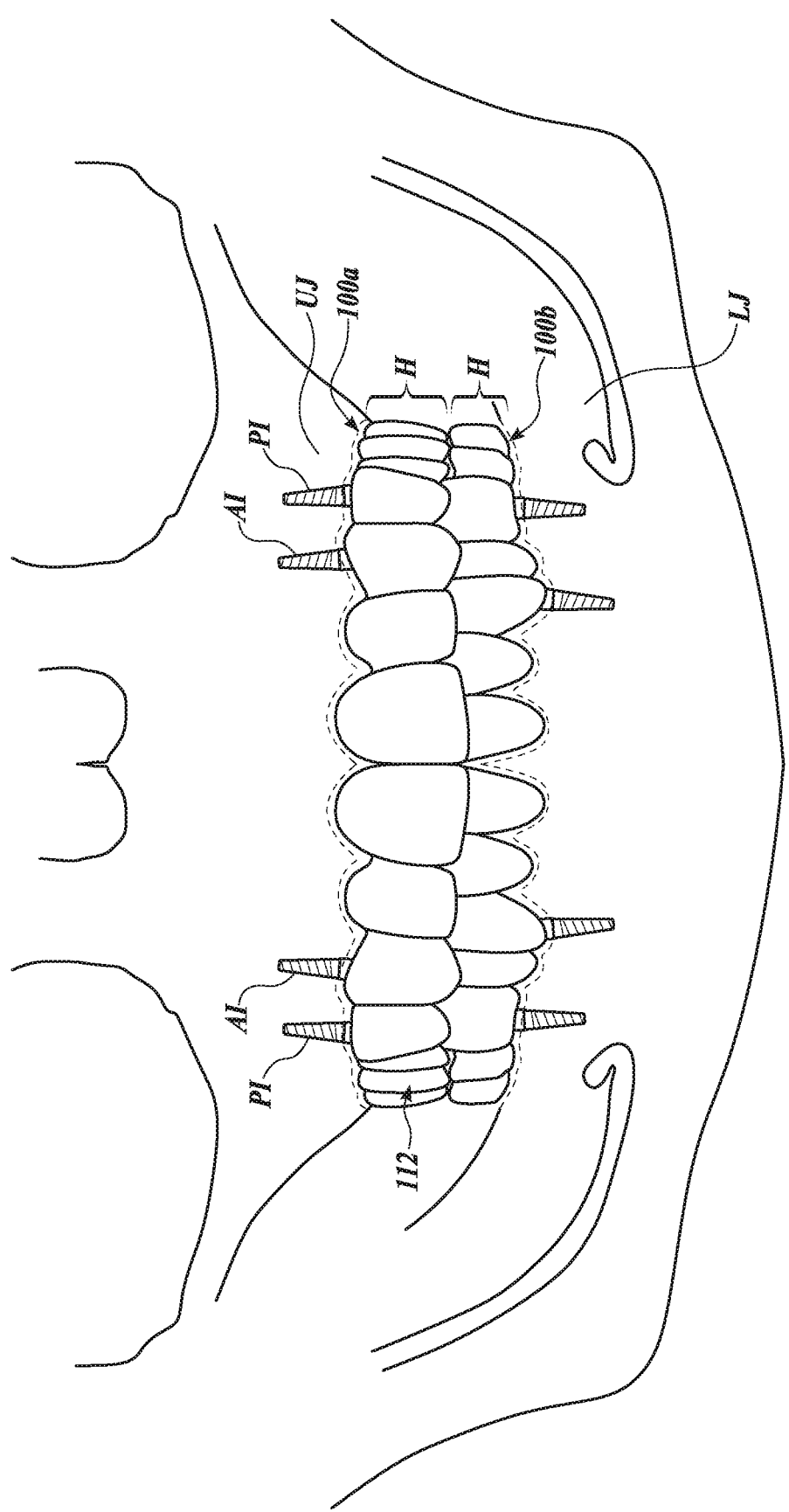
FIG. 11 depicts a front view of first and second dental bridges formed in accordance with exemplary aspects of the present disclosure secured to upper and lower jaws of a patient, respectively, using a plurality of implants placed within tooth sockets of the upper and lower jaws of a patient, wherein the tooth sockets were preserved in accordance with exemplary aspects of the pre-prosthetic ridge preservation process of FIGS. 8A-8C.

Referring first to FIG. 11, a first dental restoration device is shown as a first dental bridge 100a for an upper jaw and a second dental restoration device is shown as second dental bridge 100b for a lower jaw. The first and second dental bridges 100a and 100b may hereinafter be simply referred to as "dental bridge 100" for simplicity.

The dental bridge 100 is generally a full-arch teeth replacement device for an upper and/or lower jaw that is without artificial gingiva (e.g., includes only artificial teeth), that can seat directly against a patient's natural gum line, and that can attach to socket-based implants without the need for a connecting part or the like. The dental bridge 100 is denoted as "full arch" because it is generally designed to include the same number of teeth as the patient's original arch, such as fourteen teeth, twelve teeth, or ten teeth. In some instances, the dental bridge 100 may have less teeth than the original arch if needed for dental/medical reasons. For instance, if a patient's original arch included significant crowding, the bridge may be designed to include fewer teeth to better accommodate the size of the patient's jaw, for instance. In any case, the dental bridge 100 is considered a full arch bridge device in that fewer teeth are not needed for the bridge to fit within a patient's mouth, as in the prior art method (see FIG. 4C where the prosthetic includes only ten teeth, whereas the patient originally had fourteen teeth, as shown in FIG. 4A).

Referring additionally to FIGS. 12-16, the dental bridge 100 includes a light-weight, homogenous, generally arc-shaped body 104 made from zirconia or a similarly strong, non-porous (e.g., non-staining after curing), hygienic material to provide the strength of natural teeth. Along its height, the body 104 extends between a gingival side 106 and an incisal/occlusal side 108 to generally define a height H of the body 104 that is a height of natural teeth protruding from a gingival ridge. When seated against a patient's gums, the height H of the body 104 is about one-eight inch in height (⅛"), compared to the prosthetic P shown in FIGS. 2-4 that is about one-half to one inch in height (½"-1").

The body 104 defines a plurality of integrally formed teeth portions 112 extending along its arced length that are shaped and sized to generally mimic the teeth required for a full mouth teeth replacement. Each of the teeth portions has a tooth axis (see tooth axis TA shown in FIG. 14) extending between the gingival side and the incisal/occlusal side that is offset from vertical. The tooth axis TA is generally the same as the longitudinal axis of the original teeth, and therefore, the tooth axis TA is generally the same as the longitudinal axis of the preserved tooth sockets and the implants placed into the sockets. The tooth axis TA is typically offset from a vertical axis by a flare angle FA. Generally, the flare angle is between 1-20° from a vertical axis, such as between 10-15° from a vertical axis, but it varies based on patient's palate and alveolar ridge shape.

The gingival side 106 of the dental bridge 100 is configured to seat directly against a patient's gums G, which are left intact during the pre-prosthetic ridge preservation process, and which follow the contour of the patient's original bony ridge. In that regard, the dental bridge 100 is custom-made to fit the unique shape and contours of the patient's gum line defined by the preserved tooth sockets.

Generally, the gingival side 106 of the dental bridge 100 has an ovate pontic contour that generally follows the gingival contour of the patient (e.g., the unique shape and contours of the patient's gum line defined by the preserved tooth sockets). In other words, the ovate pontic contour of the gingival side 106 of the bridge 100 is designed to substantially mate with the correspondingly-shaped residual tissue ridge of the gums G preserved during the pre-prosthetic ridge preservation process. In that regard, each tooth portion 112 is generally of an ovate pontic shape to define an ovate pontic contour on its gingival side 106. As can be appreciated, the ovate pontic shape of each tooth portion 112 substantially mimics the shape of the natural root and crown for that tooth.

Each tooth portion of a bridge, as is well known in the industry, has a middle section, a gingival section extending from the middle section to the gingival side of the body (e.g., gingival side 106), and an incisal/occlusal section extending from the middle section to the incisal/occlusal side of the body (e.g., incisal/occlusal side 108). The ovate pontic portion is defined on each tooth portion on the gingival section of the body.

The ovate pontic portion of each tooth portion substantially conforms in shape to the corresponding post-extraction tooth socket defined by keratinized gingiva covered interdental and interseptal bone of the patient after a tooth is extracted. In that regard, the ovate pontic portion is configured to seal against the keratinized gingiva when the ovate pontic portion is engaged with the corresponding post-extraction tooth socket.

FIGS. 13A-13C depict exemplary generally ovate pontic portions on the gingival side 106 of teeth portions 112 of a dental bridge 100. The ovate pontic portion of each teeth portion 112 is generally an ovate pontic contour such that each teeth portion is designed to substantially mate with the gums G of a correspondingly shaped post-extraction root socket in the preserved ridge.

Specifically, FIG. 13A depicts a front planar view of a dental bridge 100 showing an ovate pontic contour of an ovate pontic portion on a gingival side 106 of the bridge body 104. As can be seen, the ovate pontic portion on the gingival side 106 of each tooth portion 112 of the bridge body 104 has an ovate pontic contour or a generally ovate pontic shape that generally corresponds to the shapes of the depressions left in the residual tissue ridge of the gums G. FIG. 13B shows a side (lateral) view of an incisor tooth portion 112, and FIG. 13C shows a side (lateral) view of a molar tooth portion 112, each having an ovate pontic portion on its gingival side 106 with an ovate pontic shape/contour that substantially matches the contour of the residual tissue ridge of the gums G.

The ovate pontic shapes of each tooth portion may be either generally convex, concave, or a combination thereof to substantially match the bumps, valleys, and contours of the residual tissue ridge. For instance, FIG. 12 shows a bridge 100 having an ovate pontic shape/contour on the ovate pontic portion on the gingival side 106 of its body 104, with a first molar tooth portion 112 generally having a convex ovate shaped gingival section 126 and a second molar tooth portion having a generally concave ovate shaped gingival section 128.

Figure 14:
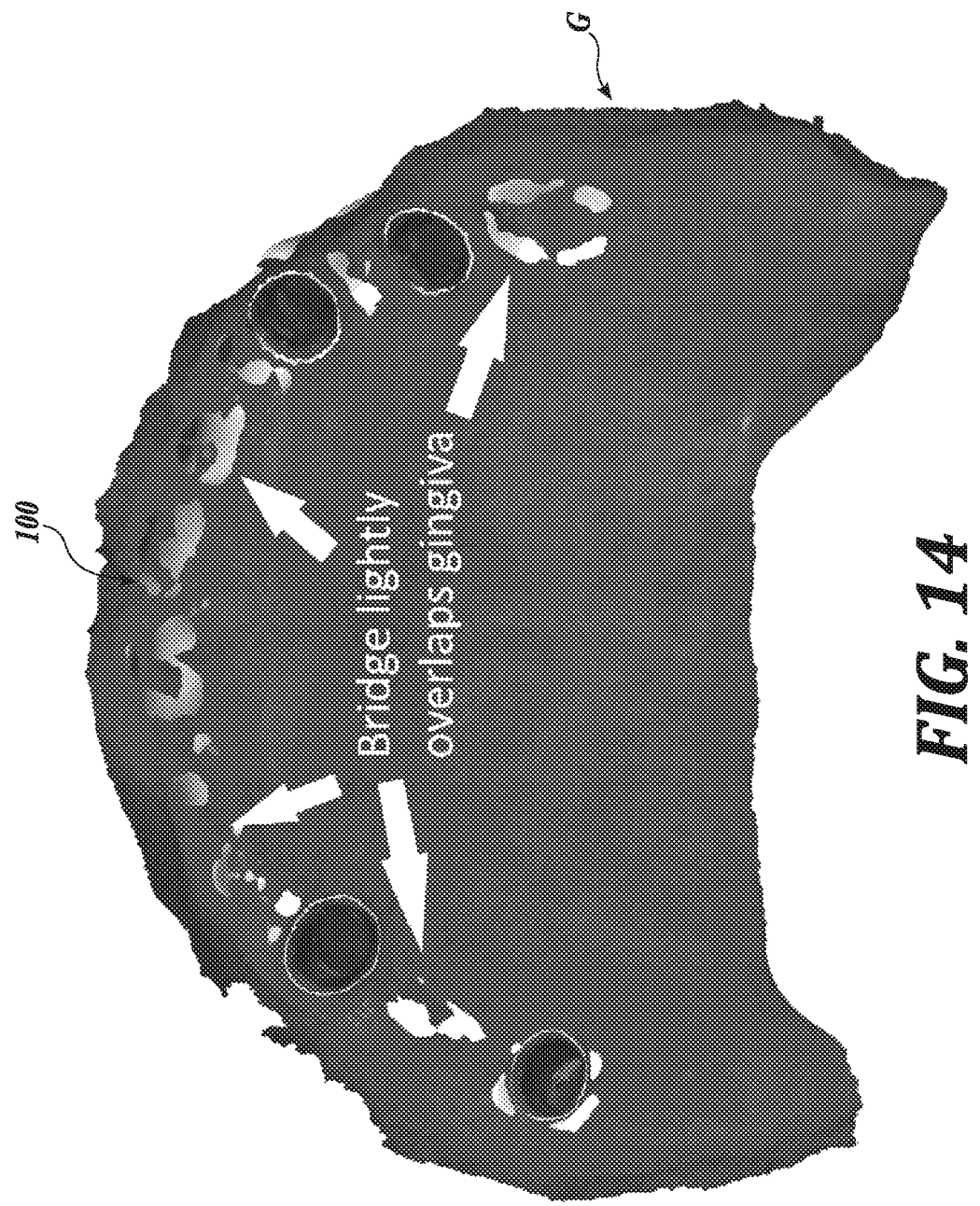
FIG. 14 depicts a bottom scan view of an upper jaw of a patient showing portions of a dental bridge formed in accordance with exemplary aspects of the present disclosure at least partially overlapping the gingiva of the patient.
Figure 15:
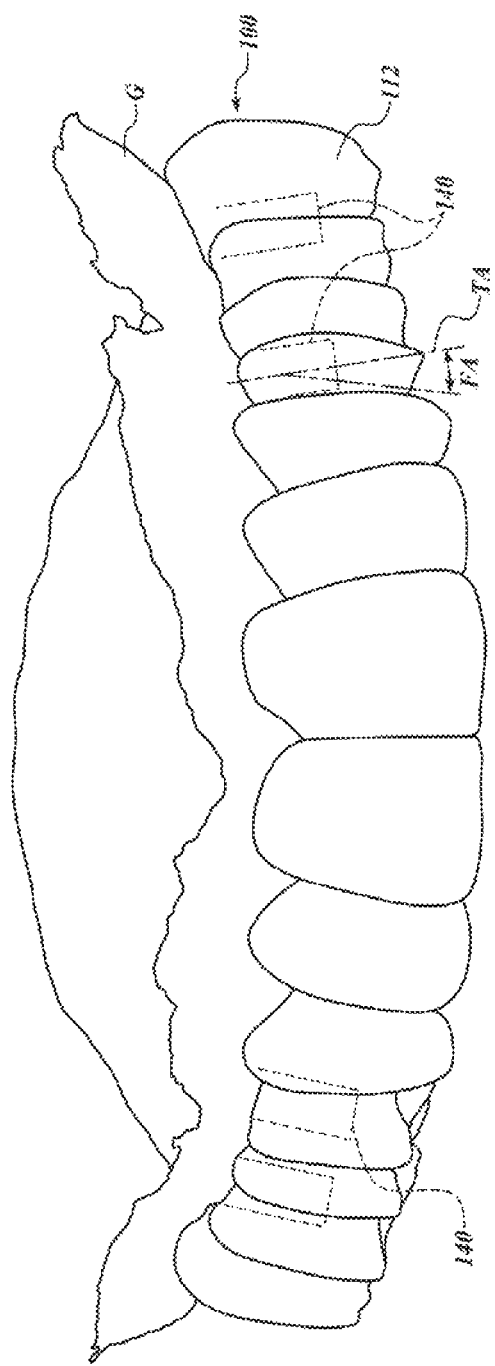
FIG. 15 depicts a front view of an exemplary embodiment of a fourteen teeth dental bridge formed in accordance with exemplary aspects of the present disclosure shown seated against a ridge/gingiva of a patient's preserved upper jaw.

Referring to FIG. 14, the ovate pontic shape/contour of the gingival side of bridge 100 defines a gingival interface that is configured to slightly overlap with or penetrate with the gingival surface of the gum G. Gum tissue is organic and can generally conform to the shape of a similarly-shaped gingival section of a tooth portion. Thus, slight penetration with the gums enables the gums to conform to the ovate pontic shape/contour of the gingival side of bridge 100. Such penetration ensures a tight fit, with substantially no gap defined between the ovate pontic gingival interface of the dental bridge 100 and the gum G. As can be appreciated, any gaps or irregular surfaces would be difficult to clean. At the same time, only a minimal amount of penetration of the teeth portions 112 with the gums is generally used to avoid causing discomfort to the patient.

Figure 12:
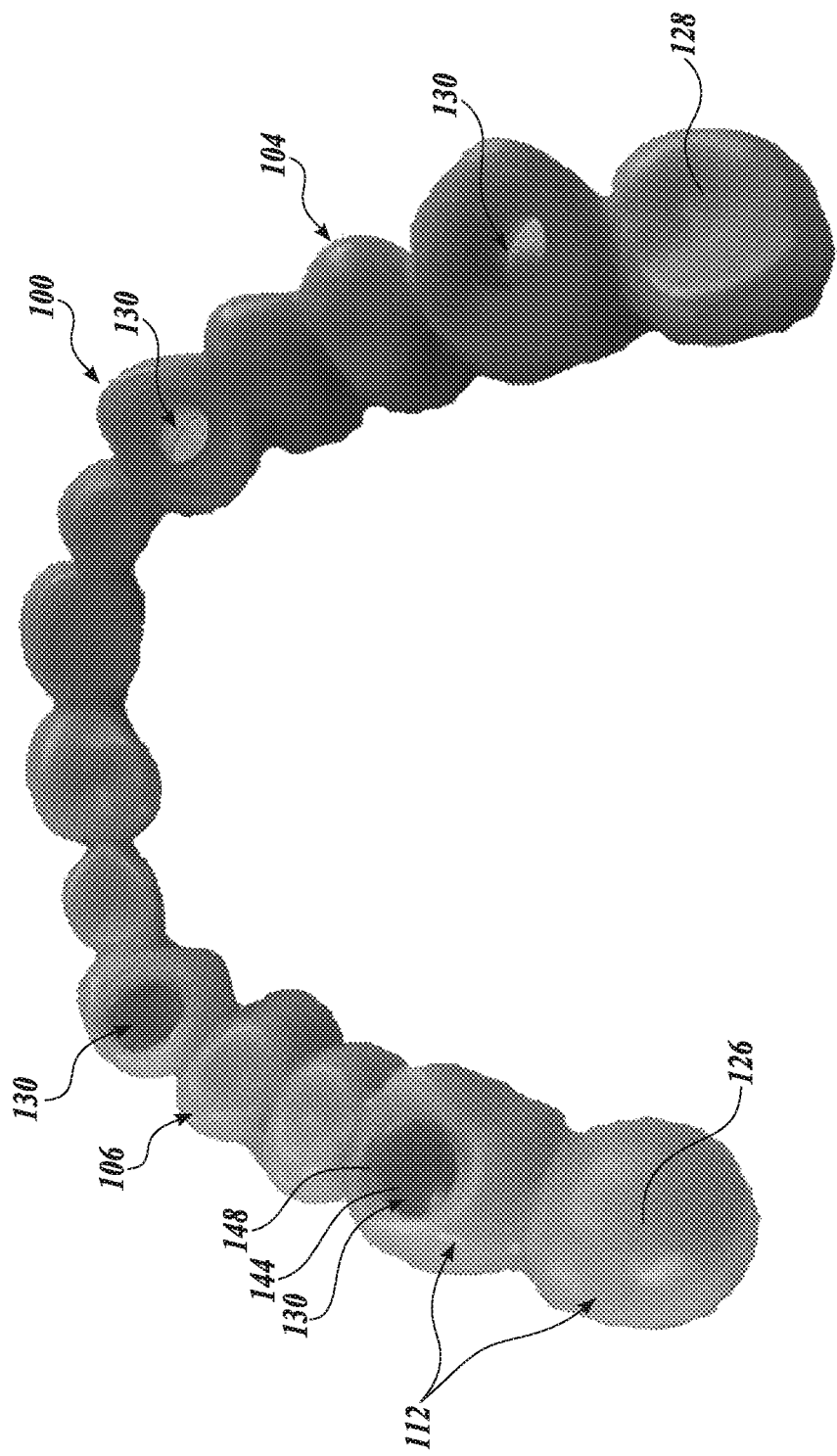
FIG. 12 depicts a bottom view of an exemplary embodiment of a fourteen teeth, gingiva-free dental bridge formed in accordance with exemplary aspects of the present disclosure.
Figure 16:
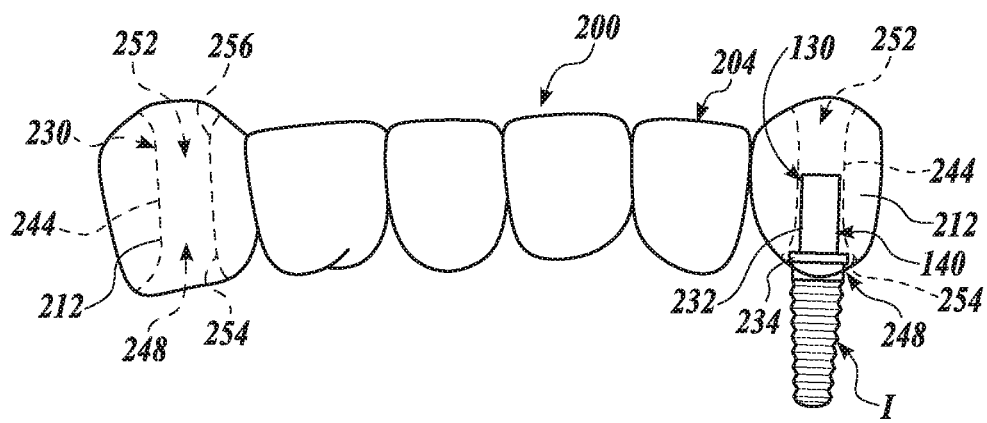
FIG. 16 depicts a front view of a dental bridge formed in accordance with exemplary aspects of the present disclosure, showing a cross-sectional shape of hidden abutment holes of the dental bridge.

Referring to FIGS. 12 and 16, the dental bridge 100 includes a plurality of abutment holes 130 for receiving abutments/screws for mating to implants. Each abutment hole 130 is formed in a tooth portion 112 of the dental bridge 100 corresponding to a location of an implant. For instance, for the dental bridge 100 shown in FIG. 12, an abutment hole 130 is defined in the following tooth portions of the dental bridge 100: tooth #3 (upper right first molar), tooth #6 (upper right canine), tooth #11 (upper left canine), and tooth #14 (upper left first molar). However, it should be appreciated that the abutment holes 130 may of course be defined in other tooth portions depending on the socket location of the implants.

In general, each abutment hole 130 is defined by a generally cylindrical through-hole 144 formed in a tooth portion 112 of the dental bridge 100 that extends between a gingival opening 148 and an incisal/occlusal opening 152. In some examples, the abutment hole 130 flares outwardly as it extends from an interior surface of the through-hole 144 toward the gingival or incisal/occlusal outer surface to define a gradually widened gingival opening 148 and a gradually widened incisal/occlusal opening 152. In this manner, sharp edges, which can cause tissue irritation and/or susceptibility to breakage and/or compromise fit or sealing against the gingiva, may be avoided.

The abutment holes 130 may also be suitably shaped, sized, and contoured to mate with or otherwise receive abutments 140 and to allow for securing the abutments to the corresponding implants. For instance, the abutment hole through-hole 144, which is generally an elongated cylindrical shape, may have a diameter that is substantially the same size or slightly larger than a diameter of an abutment body 132 of the abutment 140. In this manner, the abutment body 132 may extend into the tooth portion 112 for securing the abutment to the bridge 100, as shown in FIG. 16.

At the same time, the through-hole 144 may have a diameter that is smaller than a diameter of a ring or skirt 134 of the abutment 140. In that regard, the abutment skirt 134 rests against the gingival opening 148, with the abutment body 132 extending into the abutment hole 130. The abutment skirt 134 may rest inside a gradually widened gingival opening 148 such that the skirt may be at least somewhat nested within the gingival side 106 of the bridge 100. In this manner, the abutment skirt 134 is substantially flush with the gingival side 106 of the bridge 100 when mated against the gingival opening 148.

However, as can be appreciated, the size (e.g., diameter), shape, and contour of each gingival opening 148 may differ based on the shape of the individual teeth portion 112. Accordingly, it should be appreciated that the abutment skirt 134 may be slightly recessed within the bridge body 104 or instead protrude slightly from the gingival side 106 of the bridge body to accommodate the contours of the bridge. Thus, when generally stating that the abutment skirt 134 is substantially flush with the gingival side 106 of the bridge 100, it includes any suitable location of the abutment skirt 134 relative to the gingival side 106 of the bridge 100 to accommodate mating of the abutments and implants (and therefore direct engagement and sealing of the bridge with the patient's preserved ridge) in the manners described herein.

Each cylindrical through-hole 144 is substantially coaxially aligned with the tooth axis TA of its tooth portion 112 (see FIG. 14), which is substantially aligned with the tooth socket axis of the corresponding post-extraction tooth socket, to enable the abutments 140 to be aligned with and mated with the corresponding implants extending along the tooth axis TA. Substantial axial alignment of the abutment through-hole 144 with the longitudinal axis of the implant allows a straight or non-angulated abutment 140 to be received within the abutment hole 130 and secured to a socket-sized implant. In that regard, the abutment holes 130, the abutments 140, and the corresponding implants have a longitudinal axis that substantially matches the tooth axis TA to accommodate the flare of the patient's palette. Substantially axial alignment of the abutment holes 130, the abutments 140, and the corresponding implants with the tooth axis TA of the tooth portion 112 allows for optimal occlusal forces (chewing forces) to be transmitted from the tooth portions to the socket-placed implants.

Further details of a dental restoration device or a full arch, teeth-only dental bridge that can be designed and made in accordance with the systems and methods described herein are shown and described in inventor's co-pending U.S. patent application Ser. No. 18/162,497 filed on Jan. 31, 2023, Ser. No. 18/593,793 filed Mar. 1, 2024, Ser. No. 18/535,699 filed Dec. 11, 2023, Ser. No. 18/535,800 filed on Dec. 11, 2023, incorporated by reference in their entirety.

Detailed aspects of the systems and methods for designing and fabricating a full arch, teeth-only bridge that is configured to be secured to a patient's preserved, natural ridge or bone/gum line will now be described with reference to FIGS. 17-60.

Figure 17:
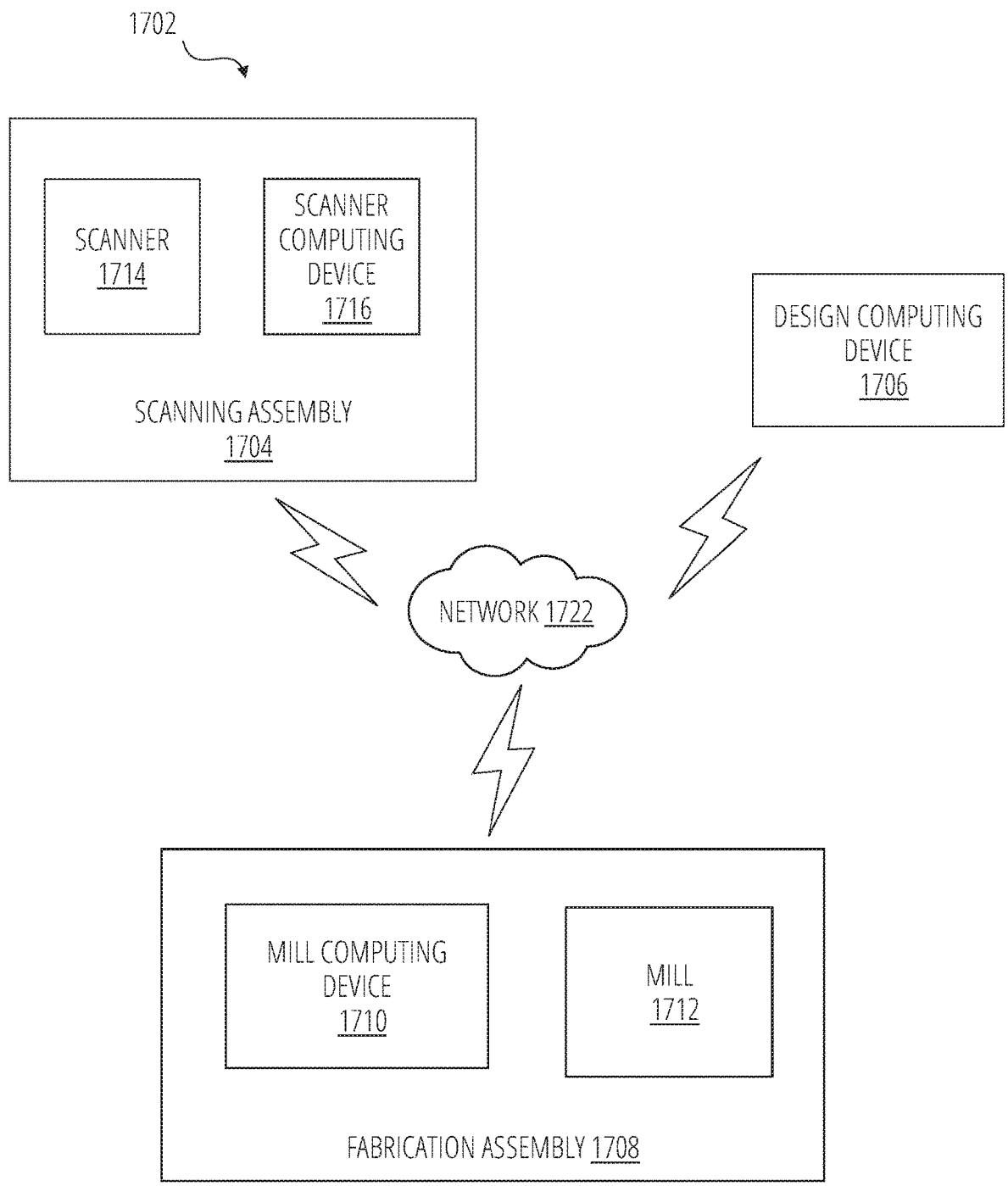
FIG. 17 shows a schematic illustration of a non-limiting example of a teeth-only bridge design and fabrication system 1702 according to various aspects of the present disclosure.

Referring to FIG. 17, an exemplary schematic view of a full arch, teeth-only bridge design and fabrication system 1702 is depicted. The teeth-only bridge design and fabrication system 1702 may include a scanning assembly 1704, a design computing device 1706, and a fabrication assembly 1708. The scanning assembly 1704 may be generally configured to generate 3D scan data of a patient's arch, such as before and after the teeth of the arch are extracted atraumatically as described above. The design computing device 1706 may be generally configured to receive and process scan data from the scanning assembly 1704 and provide a software platform for designing a full arch, teeth-only bridge that is custom to a patient using the scan data. The fabrication assembly 1708 may be configured to receive and process custom full arch, teeth-only bridge design instructions from the design computing device 1706 for carrying out a fabrication process for the bridge.

The bridge design and fabrication system 1702 may instead include any other computing device(s) (such as a cloud-based computing device(s)), and/or aspects of the bridge design and fabrication system may be carried out by more than one device or less than the devices shown and described. Further, if an operation, task, etc., is described with reference to one device, it should be appreciated that such an operation, task, etc., may instead be carried out by another computing device described herein or not shown.

Exemplary aspects of the scanning assembly 1704 will first be described. The scanning assembly 1704 may include a scanner 1714 that is suitable for generating scan data of a patient's arch(es) for use in generating a 3D model of the arch(es). For instance, the scanning assembly 1704 may include a cone beam computer tomography scanner ("CBCT scanner") and an intraoral scanner. CBCT and intraoral scanners are well known in the art.

The scanner 1714 may be used to scan the replacement and antagonist arch, including the occlusal surface, medial surface, buccal surface, etc., of each arch. For instance, the scanner 1714 may be used to scan the patient's replacement arch before teeth extraction to assess a patient's overall candidacy for teeth replacement and/or to determine any unique aspects of a tooth that may affect the technique used for tooth removal and/or the expected result of the tooth removal, such as its root system and surrounding alveolar bone structure. As noted above, a CBCT/intraoral scan taken before teeth extraction may also be used to determine the root socket longitudinal axis for substantial alignment with an axis of an implant when placed. Such a scan of the original teeth in the arch may also be used when designing the bridge with the design computing device 1706, such as for defining the tooth axis of each tooth portion, defining the general shape and size of each tooth portion, etc.

The scanner 1714 may also be used to scan the patient's replacement arch after extraction of the teeth and healing and/or after placement of the implants to capture the patient's preserved bone/gum line. Scan bodies may be secured to the implants received in post-extraction root sockets, as discussed in U.S. patent application Ser. No. 18/162,497 filed on Jan. 31, 2023, Ser. No. 18/593,793 filed Mar. 1, 2024, Ser. No. 18/535,699 filed Dec. 11, 2023, Ser. No. 18/535,800 filed on Dec. 11, 2023, and application Ser. No. 18/632,185, entitled "Arch Preparation System And Method For Receiving A Full Arch Dental Restoration Device" filed on Apr. 10, 2024, incorporated herein. The scan bodies may be coated with a matte substance to prevent reflection of light during scanning and ensure visibility in the scan data. When represented in a 3D model, as will be discussed below, the scan bodies may be used to define the longitudinal axis, shape, and/or size of the abutment holes in the corresponding tooth portions of the bridge.

The scanner 1714 may also be used to scan the patient's antagonist arch, including the gums and any teeth (original or replacement). Scan data of the antagonist arch may be used to generate a 3D model of the antagonist arch, which may be used when designing the bridge to ensure proper a proper bite or a proper incisal/occlusal alignment of the antagonist arch with the replacement arch.

The scanning assembly 1704 may also include a scanner computing device 1716 communicatively coupled to the scanner 1714 that is configured to process and output the CBCT/intraoral scan data (hereinafter simply "scan data"), such as to the design computing device 1706. For instance, the scanner computing device 1716 may perform at least one of compiling, formatting, organizing, etc., of the scan data for sending to the design computing device 1706, such that the design computing device 1706 may generate a 3D model with the scan data. In other instances, the scanner computing device 1716 may generate a 3D model(s) with the scan data, and the scanner computing device 1716 may, after any compiling, formatting, organizing, etc., send the generated 3D model(s) to the design computing device 1706. In one example, the scanner computing device 1716 may incorporate aspects of the 3Shape™ TRIOS™ scanning system or a similar platform. Exemplary aspects of the design computing device 1706 will now be described.

Figure 18:
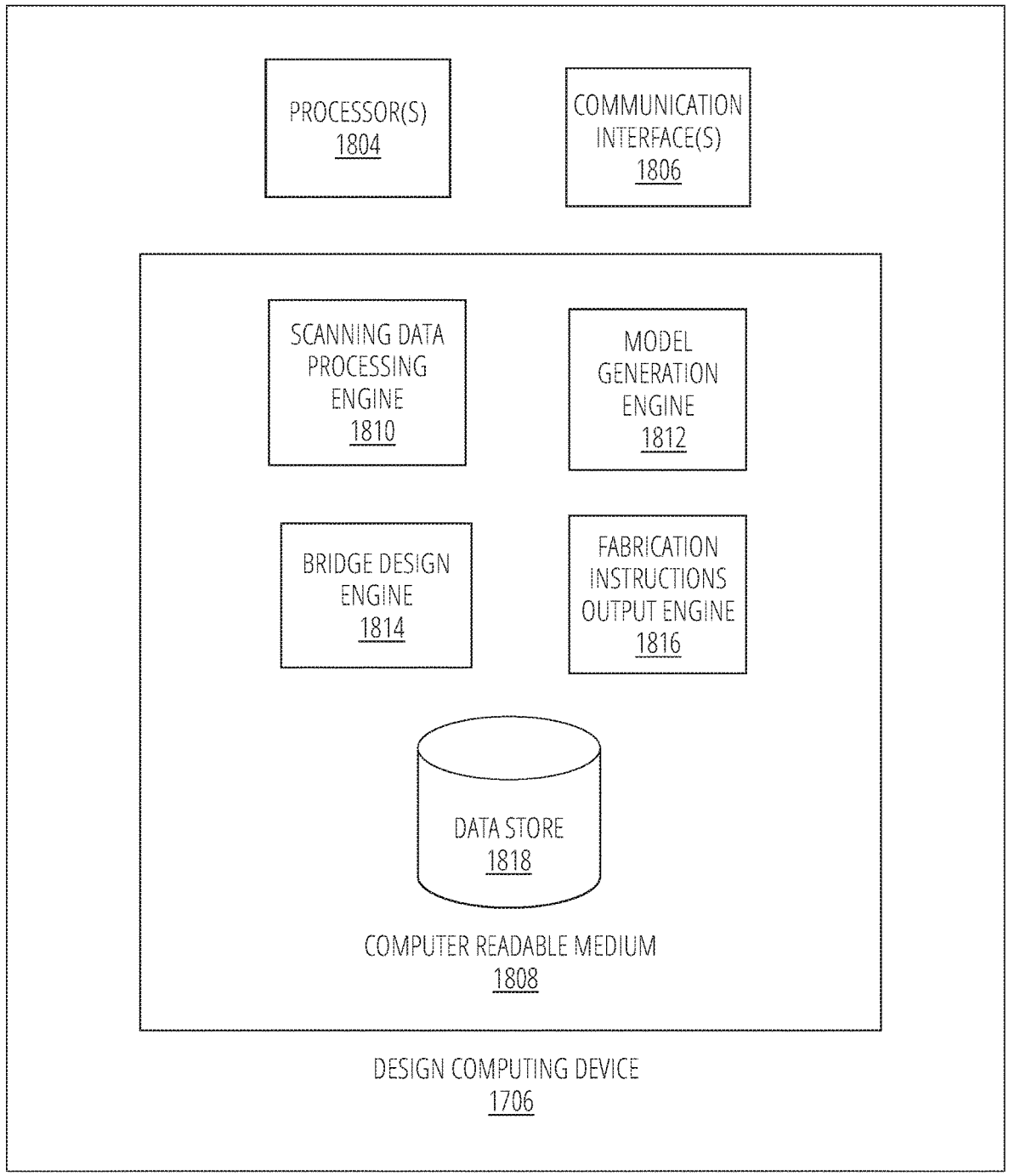
FIG. 18 shows a schematic illustration of a non-limiting example of a design computing device according to various aspects of the present disclosure.

FIG. 18 depicts an exemplary schematic view of the design computing device 1706. As noted above, the design computing device 1706 is generally configured to receive and process 3D scan data from the scanning assembly 1704 and provide a software platform for designing a full arch, teeth-only bridge for a replacement arch that is custom to a patient. The design computing device 1706 is also configured to create and send instructions to the fabrication assembly 1708 for fabrication of the custom bridge.

In that regard, the design computing device 1706 may include a processor(s) 1804, a communication interface(s) 1806, a computer readable medium 1808, and one or more data stores 1818. The computer-readable medium 1808 has stored thereon logic that, in response to execution by the one or more processor(s) 1804, cause the design computing device 1706 to provide a scanning data processing engine 1810, a model generation engine 1812, a bridge design engine 1814, and a fabrication instructions output engine 1816.

The design computing device 1706 may be implemented by any computing device or collection of computing devices, including but not limited to a desktop computing device, a laptop computing device, a mobile computing device, a server computing device, a computing device of a cloud computing system, and/or combinations thereof. In some embodiments, the processor(s) 1804 may include any suitable type of general-purpose computer processor. In some embodiments, the processor(s) 1804 may include one or more special-purpose computer processors or AI accelerators optimized for specific computing tasks, including but not limited to graphical processing units (GPUs), vision processing units (VPTs), and tensor processing units (TPUs).

In some embodiments, the communication interface(s) 1806 include one or more hardware and or software interfaces suitable for providing communication links between components. The communication interface(s) 1806 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As used herein, "engine" refers to logic embodied in hardware or software instructions, which can be written in one or more programming languages, including but not limited to C, C++, C #, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

In one example, the scanning data processing engine 1810 is configured to process scan data received/retrieved from the scanner computing device 1716. Processing of the scan data may include at least one of reformatting the scan data received from the scanning assembly 1704 for access by the model generation engine 1812, saving the original and/or formatted scan data in the one or more data stores 1818, etc. The scanning data processing engine 1810 may output one or more signals indicative of the processed scan data to the model generation engine 1812, and the model generation engine 1812 may retrieve/receive processed scan data from the scanning data processing engine 1810 and/or the one or more data stores 1818.

The model generation engine 1812, after receiving/retrieving processed scan data, is configured to generate a 3D model of the scanned arch. The 3D model may include any portion of the patient's gums, teeth, implants, scan bodies, etc., that were captured by a scanner(s), as discussed above. The 3D model may be generated using known techniques, such as with the software platform available with the 3Shape™ TRIOS™ scanning system. In that regard, aspects of the model generation engine 1812 may be incorporated into the scanner computing device 1716, and aspects of any software platforms/modules/engines of the scanner computing device 1716 may be incorporated into the model generation engine 1812 or another engine of the design computing device 1706. Moreover, any other computing device(s) may be used in combination with the scanner computing device 1716 and/or the design computing device 1706, such as a cloud-based computing device(s).

A 3D model may be generated for one or more of the replacement arch before teeth are extracted, the antagonist arch before teeth are extracted, the replacement arch after teeth are extracted and before placement of implants, the replacement arch after teeth are extracted and implants are placed (such as after healing has occurred such that the preserved ridge is ready for bridge placement), the antagonist arch after receiving a teeth-only bridge, etc.

Figure 19:
FIG. 19 shows a scan image depicting a replacement arch before teeth are extracted.

For instance, FIG. 19 shows a scan image generated for a replacement arch before teeth are extracted. Such an image generated may be used for patient evaluation for dental restoration, reviewing any pathologies of the teeth, etc. Such an image may also be used for determining the root axis of the socket for implant placement and bridge design. As noted above, the bridge is designed such that the tooth axis of each tooth portion substantially aligned the root socket axis. 3D models generated for one or more of the replacement arch after teeth are extracted and the antagonist arch will be described further below.

The scan data and/or 3D models of the replacement/antagonist arch may be retrieved by and/or sent to the bridge design engine 1814 for designing the bridge for the replacement arch. In that regard, the bridge design engine 1814 may provide a computer-aided design interface for designing the teeth-only, gingiva-free, full arch dental bridge for the replacement arch. It should be appreciated that aspects of the bridge design engine 1814 may be carried out by the scanner computing device 1716 or another computing device (e.g., a cloud-based computing device) in communication with the scanner computing device 1716 and/or the design computing device 1706.

Figure 20:
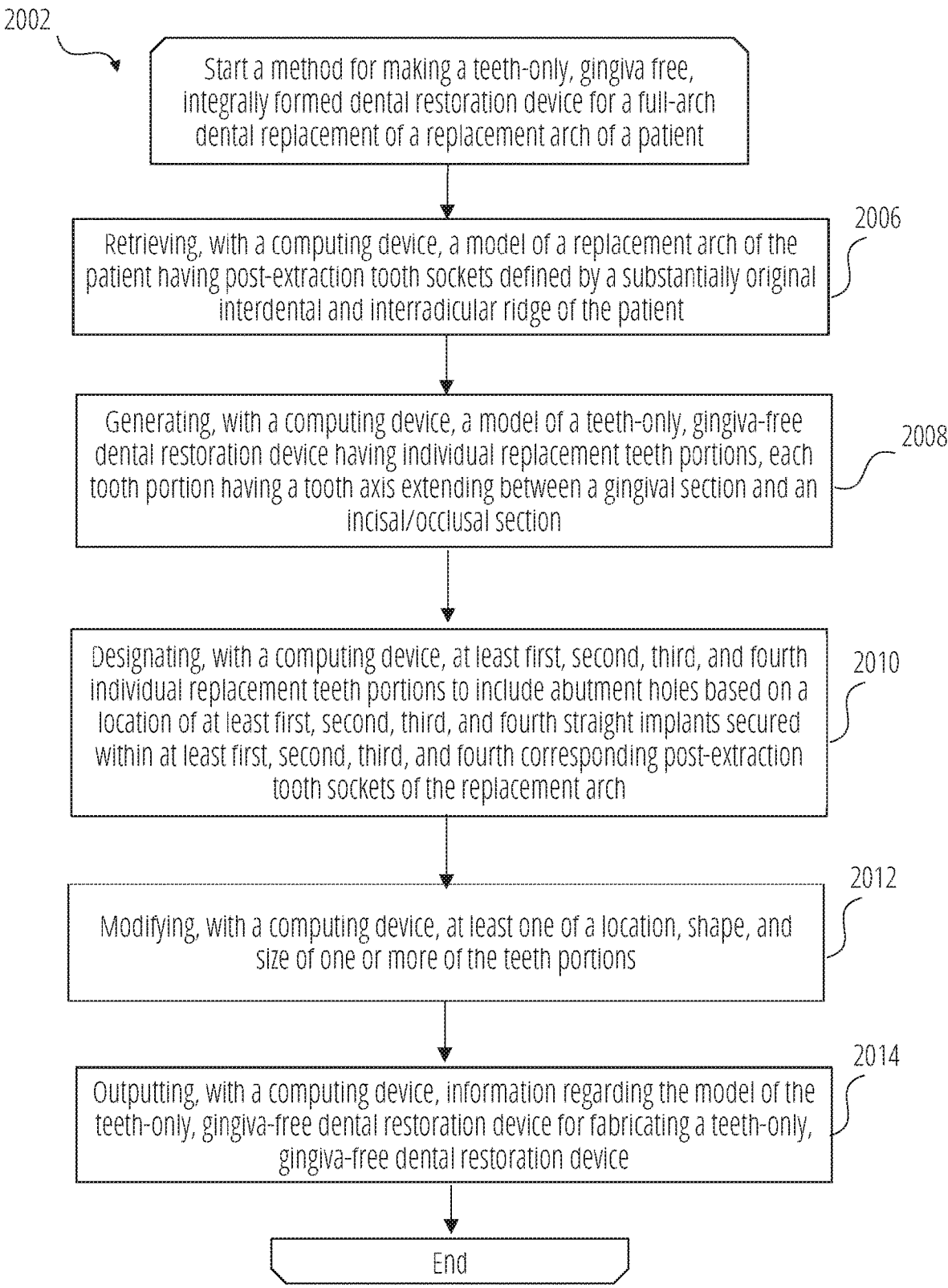
FIG. 20 is a flowchart that illustrates an exemplary method for making a teeth-only, gingiva-free dental restoration device for a full-arch dental replacement of a replacement arch of a patient.

FIG. 20 depicts an exemplary method 2002 for making a teeth-only, gingiva-free, dental restoration device for a full-arch dental replacement of a replacement arch, such as the dental bridge 100 described above. In that regard, aspects of the method 2002 will be described with reference to the dental bridge 100, and features of the dental bridge represented in the 3D models used in describing the method 2002 will include the same reference numbers as those used for describing the dental bridge 100. It should be appreciated that the method 2002 may be adapted to make any custom or suitable dental bridge for a full mouth arch replacement. The method 2002 may be carried out at least in part by one or more of the scanning data processing engine 1810, the model generation engine 1812, the bridge design engine 1814, and the fabrication instructions output engine 1816 of the design computing device 1706, the scanner computing device 1716, and/or any other engine or computing device in communication with the design computing device 1706 and the scanner computing device 1716.

From a start block, the method 2002 may proceed to block 2006, where a computing device (such as the design computing device 1706) may be used to generate, receive, and/or retrieve a model (e.g., a 3D model) of the replacement arch of the patient having post-extraction tooth sockets defined by a substantially original interdental and interradicular ridge of the patient.

Figure 21:
FIG. 21 shows a 3D model generated from a scan of a replacement arch after teeth are extracted, implants are placed with scan bodies, and healing has occurred.

FIG. 21 shows a 3D model generated from a scan of a replacement arch after teeth are extracted, implants are placed, and suitable healing has occurred. The 3D model shows the preserved, natural bone/gum line G of the replacement arch or upper jaw UJ. The threaded bodies extending from the patient's bone/gum line G are scan bodies SB attached to the implants (not visible). The scan bodies SB extend along the longitudinal axis of the implants; and therefore, each scan body longitudinal axis is substantially coaxially aligned with the corresponding tooth axis/root socket axis. The scan bodies SB may therefore be used to define the longitudinal axis of the abutment holes in the corresponding tooth portions of the bridge, as discussed above.

The scan bodies SB may also have a shape and circumference representative of the shape and circumference of the abutments to be used with the bridge. In that regard, the scan/3D generated model showing the scan bodies SB may be used to generally define the shape and size of the corresponding bridge abutment holes. For instance, the scan bodies SB may be substantially cylindrical in shape and may have a height that extends along a height of the corresponding tooth portion of the bridge. The abutment holes may be sized and shaped to receive the scan bodies SB. In this manner, the abutment holes may receive correspondingly sized/shaped abutments. The abutment hole design may incorporate procedures typically used when designing a custom crown for a patient, wherein a trimmed tooth defines an interior cavity in the crown for fitting/placing the crown onto the trimmed tooth.

Figure 22:
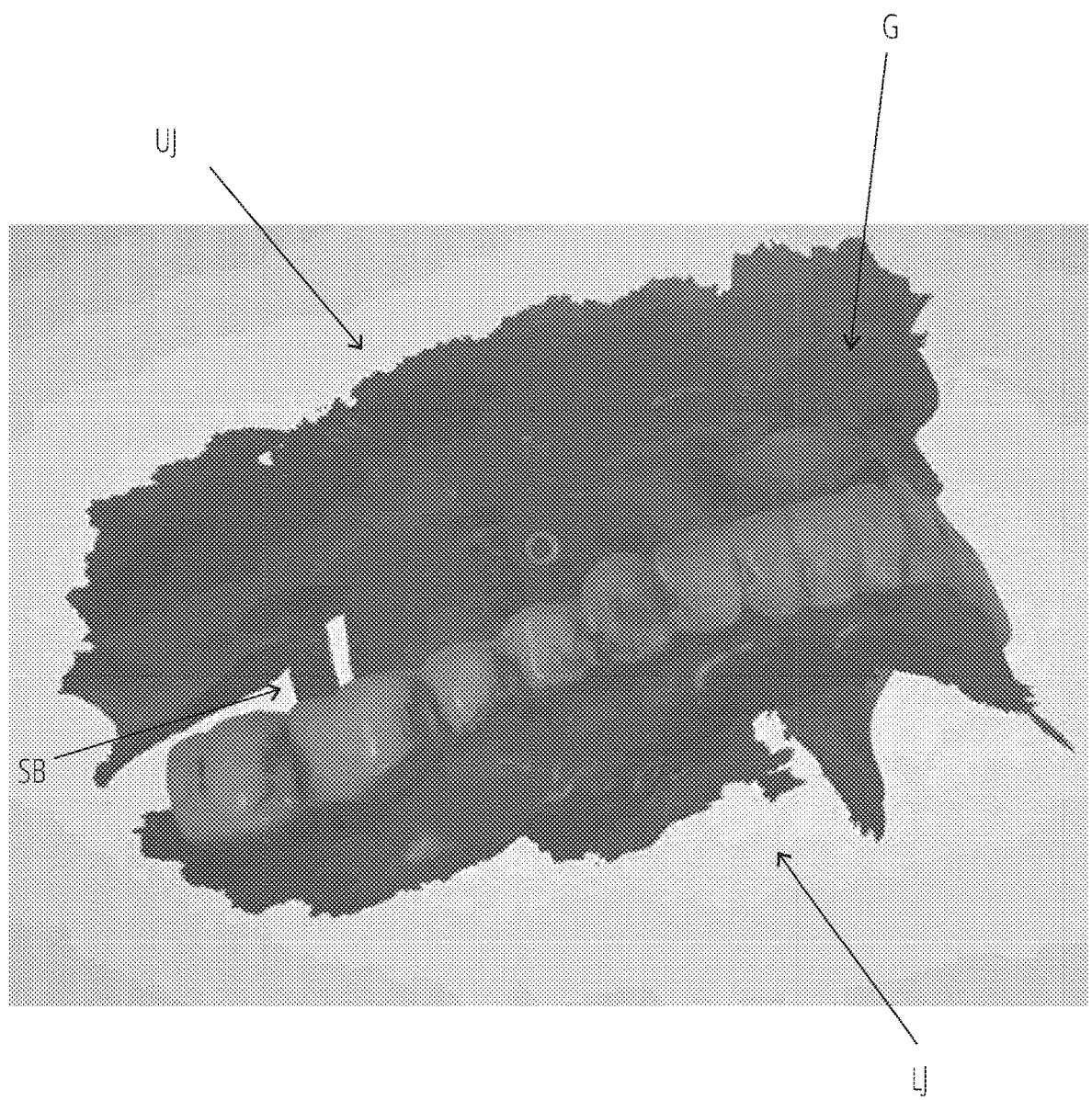
FIG. 22 shows a 3D model generated from a scan of a replacement arch after teeth are extracted, implants are placed with scan bodies, and healing has occurred, and further showing an antagonist arch.

FIG. 22 shows a 3D model generated from a scan of a replacement arch or upper jaw UJ after teeth are extracted, implants and scan bodies SB are placed, and suitable healing has occurred. The 3D model further shows a corresponding antagonist arch or lower jaw LJ. In the example shown, the antagonist arch has already been restored with a dental bridge. As noted above, a 3D model of the antagonist arch may be used when designing the dental bridge for the replacement arch, such as to define a proper bite.

The scan data and/or the 3D models may be refined as needed to clean up any rough edges, unnecessary data, etc., before proceeding to design the dental bridge and/or during the design process. For instance, the extended gum area shown in the antagonist arch in FIG. 21B can be removed (such as with a computer-aided trimming tool presented by a module or sub-engine of the bridge design engine 1814) such that the 3D model data file is smaller in size. Refining/cleaning up the scan data and/or the 3D model can increase the processing speed when designing the dental bridge. The generated/refined 3D models of the replacement/antagonist arch may be retrieved by and/or sent to the bridge design engine 1814 for designing the bridge for the replacement arch.

The method 2002 may proceed to block 2008, where a computing device (such as the design computing device 1706) may be used to generate, receive, and/or retrieve a model (e.g., a 3D model) of a teeth-only, gingiva-free dental restoration device having individual replacement teeth portions, each tooth portion having a tooth axis extending between a gingival section and an incisal/occlusal section of the tooth portion. For instance, the bridge design engine 1814 of the design computing device 1706 may generate a model showing proposed individual replacement teeth portions for a dental bridge for a replacement arch. The model of the individual teeth portions for a dental bridge may include the number/type of teeth portions needed for the replacement arch, such as ten or twelve teeth portions for a small arch (e.g., with perhaps the pre-molars and/or a back molar removed), 14 teeth portions for a full arch, etc.

Figure 23:
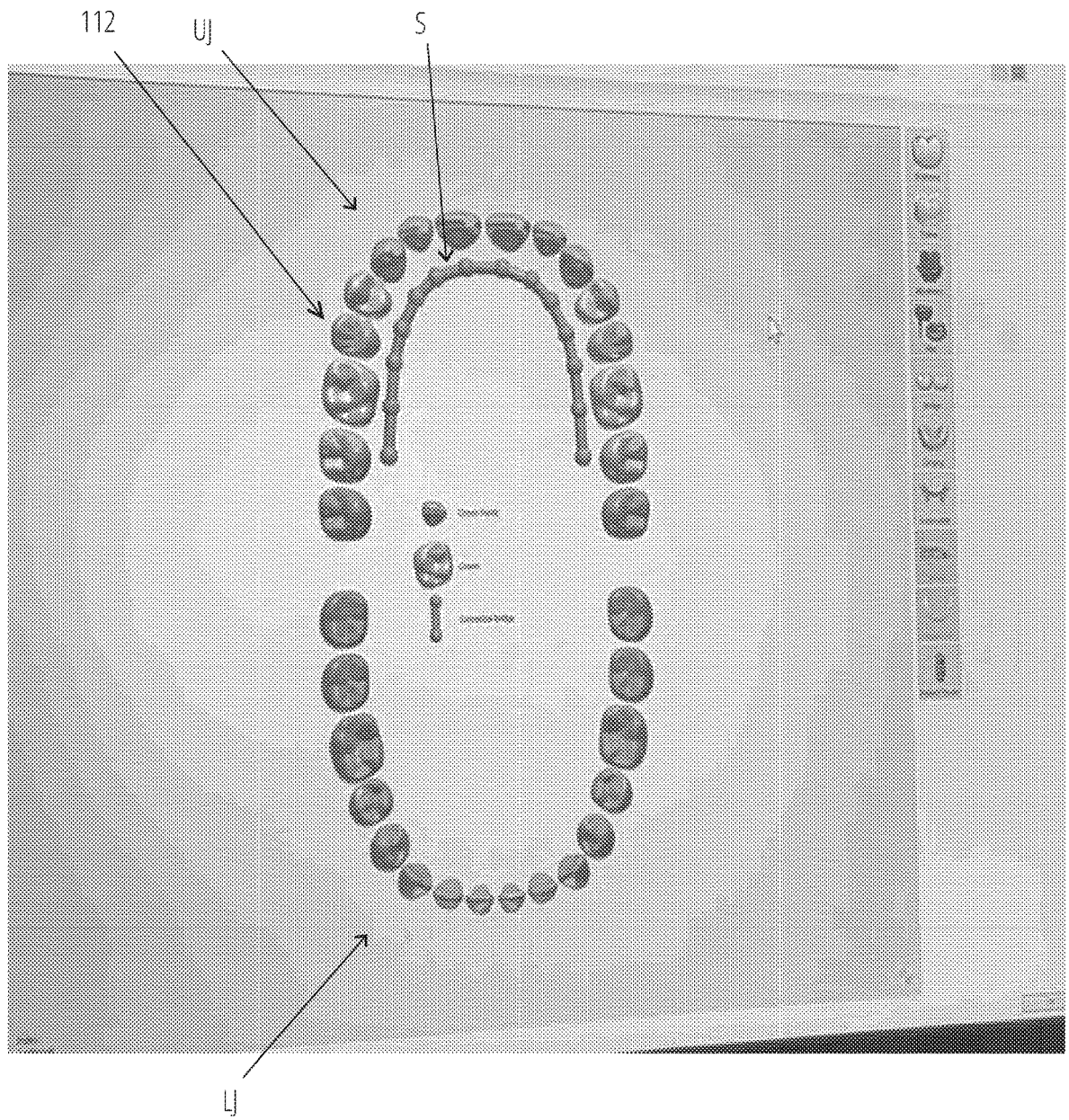
FIG. 23 shows an exemplary 3D model of proposed individual replacement teeth portions for generating a dental bridge for a replacement arch.

FIG. 23 shows an exemplary 3D model of proposed individual replacement teeth portions 112 for generating a dental bridge (such as dental bridge 100 described above) for a replacement arch or upper jaw UJ. Representative teeth for an antagonist arch or lower jaw LJ are also shown. The 3D model may be displayed on a graphical user interface (GUI) of a display coupled to the design computing device 1706 through the communication interface(s) 1806. In that regard, any of the models or other interfaces for software carried out by or accessed by a computing device of the teeth-only bridge design and fabrication system 1702 may be shown in a GUI on a connected display for carrying out aspects of the method 2002.

The 3D model of the individual replacement teeth portions 112 may include a proposed number of replacement teeth portions for the dental bridge based on at least one of the scan data, user (e.g., dentist) input, or other relevant factors. For instance, the number of teeth portions needed for the dental bridge may be determined by a dental professional during an initial assessment of the replacement arch of the patient before extraction, an assessment of the arch after teeth are extracted, etc., and such information may be inputted into the design computing device 1706 for use by the bridge design engine 1814 or another engine. The number of teeth portions needed for the dental bridge may also/instead be determined by the bridge design engine 1814 or another computing device/module in communication therewith, such as based on the scan data. As discussed above, if the entire replacement arch is scanned, the scan data will show a length of the replacement arch, dimples representing post-extraction tooth sockets, etc., which may be used by the bridge design engine 1814 to propose a number of teeth portions for the dental bridge for the replacement arch. In further examples, a scan of the entire replacement arch (and/or antagonist arch) before teeth extractions may be used by the bridge design engine 1814 to propose a number of teeth portions for the dental bridge for the replacement arch.

In the exemplary 3D model of FIG. 23, the proposed individual replacement teeth portions 112 are shown in their location in the replacement arch UJ, and a connection symbol S is shown along a length of the arch representing the teeth to be connected in the dental bridge. In the example shown, representative wisdom teeth are included in the model but would not be included in the dental bridge and are therefore not part of the connection.

The method 2002 may proceed to block 2010, where a computing device (such as the design computing device 1706) may be used to designate at least first, second, third, and fourth individual replacement teeth portions to include abutment holes based on a location of at least first, second, third, and fourth straight implants secured within at least first, second, third, and fourth corresponding post-extraction tooth sockets of the replacement arch.

For instance, the 3D model of the proposed individual replacement teeth portions 112 for the dental bridge, as shown in FIG. 23, may be used to designate a location of crowns and pontics for the dental bridge. A "crown" may be considered an individual replacement tooth portion for the dental bridge that will include an abutment hole to receive an abutment that will be secured to an implant. A "pontic" may be considered an individual replacement tooth portion for the dental bridge that will not be secured to an implant and therefore will not include an abutment hole. As noted in the above description of the dental bridge 100, the implant location may be based on a variety of factors, including locations that will provide sufficient canine to molar spread for good retention and stability for the dental bridge, locations where sufficient bone is present to osseointegrate with an implant, etc.

In some instances, the location of crowns and pontics for the dental bridge may be proposed by the bridge design engine 1814 based on a known optimal location of the crowns and pontics for a bridge having the designated number of teeth portions. For instance, the crowns may at least initially be designated by the bridge design engine 1814 in the canine and first molar teeth portions on each side of the arch. In other instances, the location of crowns and pontics for the dental bridge may be proposed by the bridge design engine 1814 based on a machine learning algorithm that receives at least one of scan data of the replacement arch before extraction, scan data of the replacement arch after extraction and before implant placement, scan data of the replacement arch after extraction and after implant placement (optionally with the scan bodies), data regarding a users' past selection of crown tooth portion placement and any corresponding scan data for that past patient, data science, etc., as input. In yet other instances, the user may designate the crown locations through a user interface, such as by clicking on the teeth shown in the 3D model after selecting "crown" or "pontic" for a tooth portion selection.

At the same or at a subsequent step, the material and color/shade may be designated for each proposed individual replacement tooth portion of the dental bridge. For instance, the user may designate the material zirconia and the required shade (such as based on an original tooth color) through a user interface, such as by clicking on the teeth shown in the 3D model and then selecting the material and shade.

In some examples, the method may include using a computing device (such as the design computing device 1706) to define at least a preliminary biting plane for the dental bridge for the replacement arch. The preliminary biting plane may be used to set an initial location, height, etc., of the teeth portions of the dental bridge, such as relative to the gums of the replacement arch.

Figure 24A:
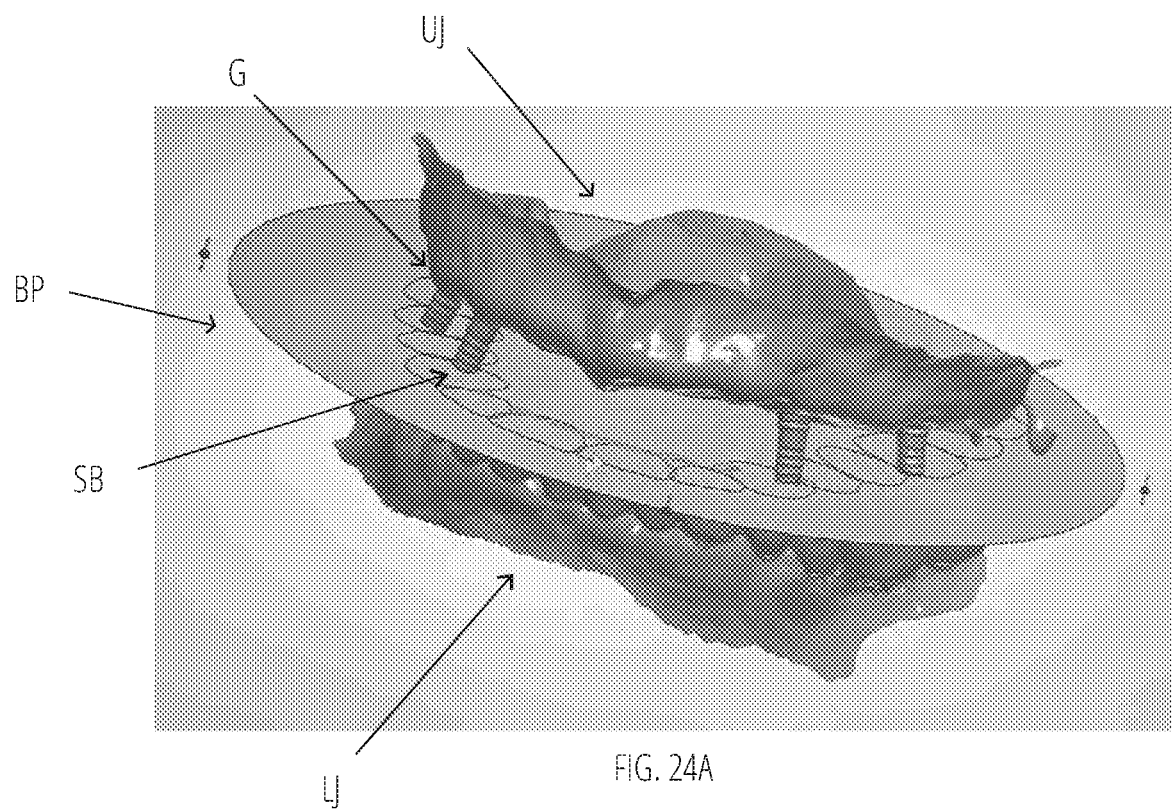
FIGS. 24A-24B and 25A-25B show 3D models of a replacement arch with scan bodies and an antagonist arch wherein a preliminary biting plane of a dental bridge is being defined/adjusted relative to the replacement arch and antagonist arch.
Figure 24B:
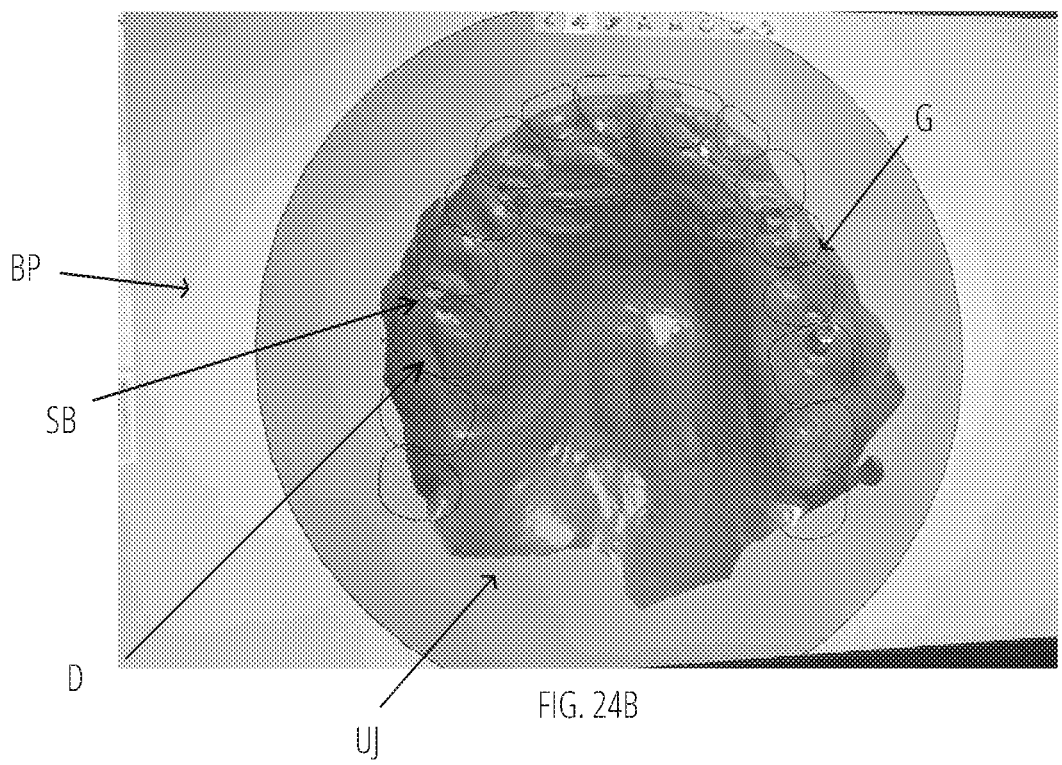

For instance, referring to FIGS. 24A and 24B, the bridge design engine 1814 of the design computing device 1706 may generate a preliminary biting plane BP of the dental bridge relative to a 3D model of the replacement arch UJ (along with optionally the antagonist arch LJ). The biting plane BP helps establish at least an initial placement of the individual teeth portions of the dental bridge for the replacement arch relative to the teeth of the antagonist arch for a proper bite. The biting plane may be adjusted as needed later in the design process.

The biting plane BP, which may be represented in the GUI as a translucent/transparent plane, may be initially placed by the bridge design engine 1814 at location relative to features of the replacement arch UJ, such as at a distal nominal end of the scan bodies SB, as shown. The biting plane may include an outline shape (e.g., a top or bottom view) of the individual teeth portions of the dental bridge taken from the teeth portions shown in the 3D model (see FIG. 23), which may be substantially aligned with dimple areas D and/or the scan bodies SB of the replacement arch UJ.

Figure 25A:
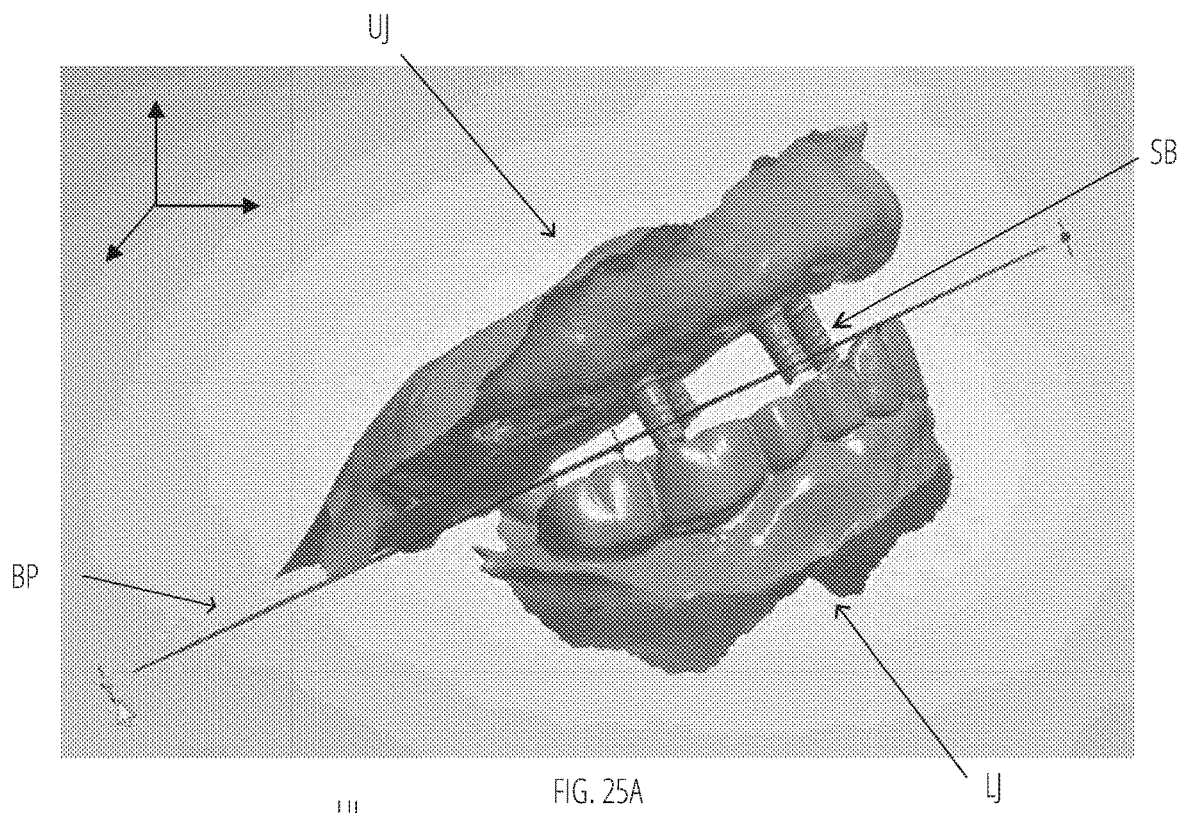
Figure 25B:
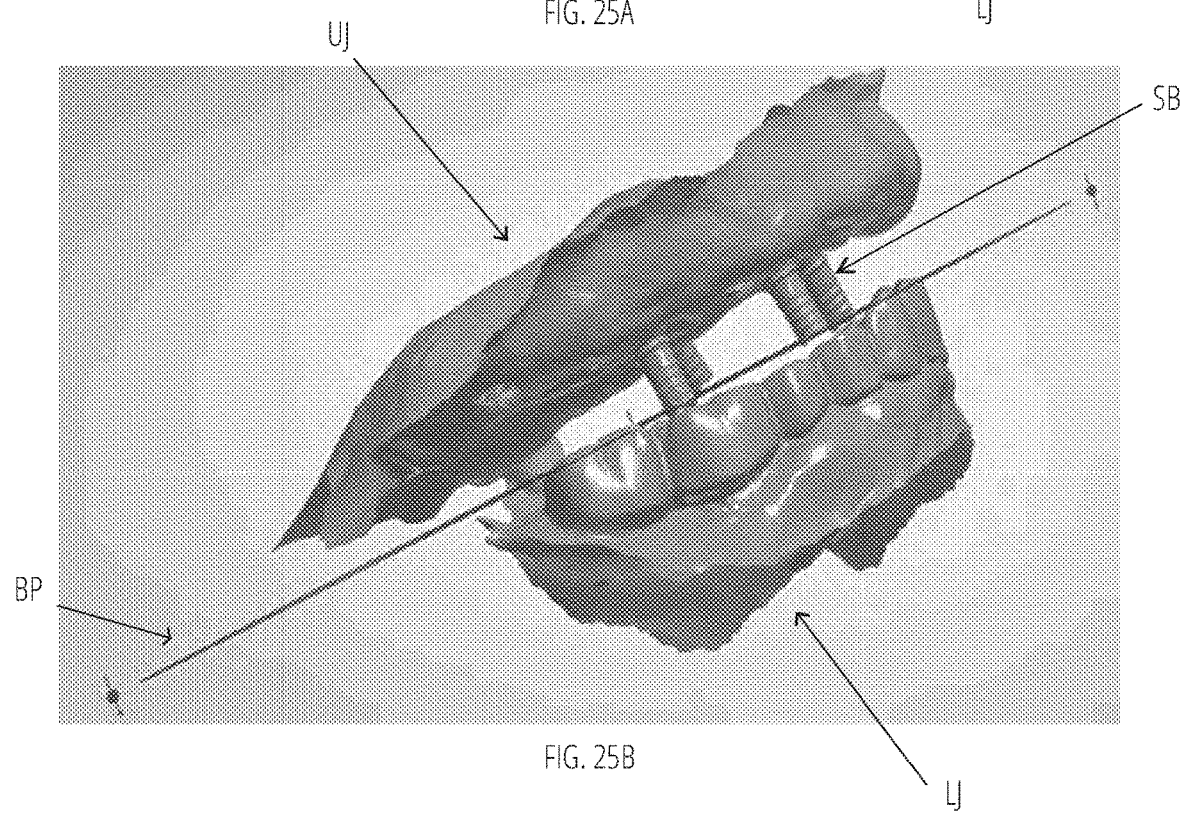

Referring to FIGS. 25A and 25B, a user may interact with the bridge design engine 1814 to move the biting plane BP relative to the gums/scan bodies of the replacement arch UJ and/or the antagonist arch LJ. For instance, the user may move the biting plane BP relative to an x-, y-, and/or z-axis defined relative to a plane of the gums G of the replacement arch UJ. In the example shown, the user tilts the biting plane BP toward the back teeth of the antagonist arch LJ, and then the user lowers the biting plane towards the teeth of the antagonist arch LJ. Such movement is shown in the transition of the biting plane BP location from FIG. 24C to 24D.

In some examples, the method may include using a computing device (such as the design computing device 1706) to define abutment holes in the corresponding crown tooth portions of the dental bridge for the replacement arch. As noted above, the scan bodies SB shown in the models may be used to define the longitudinal axis and shape of the abutment holes in the corresponding crown tooth portions of the bridge. More specifically, the abutment holes may be designed to receive the scan bodies, which are representative of the shape, size, and longitudinal axis of the abutments.

For ease of description, the process of defining the abutment holes and any other aspects of the dental bridge design and fabrication may hereinafter reference the components of the dental bridge 100 described above.

Figure 26A:
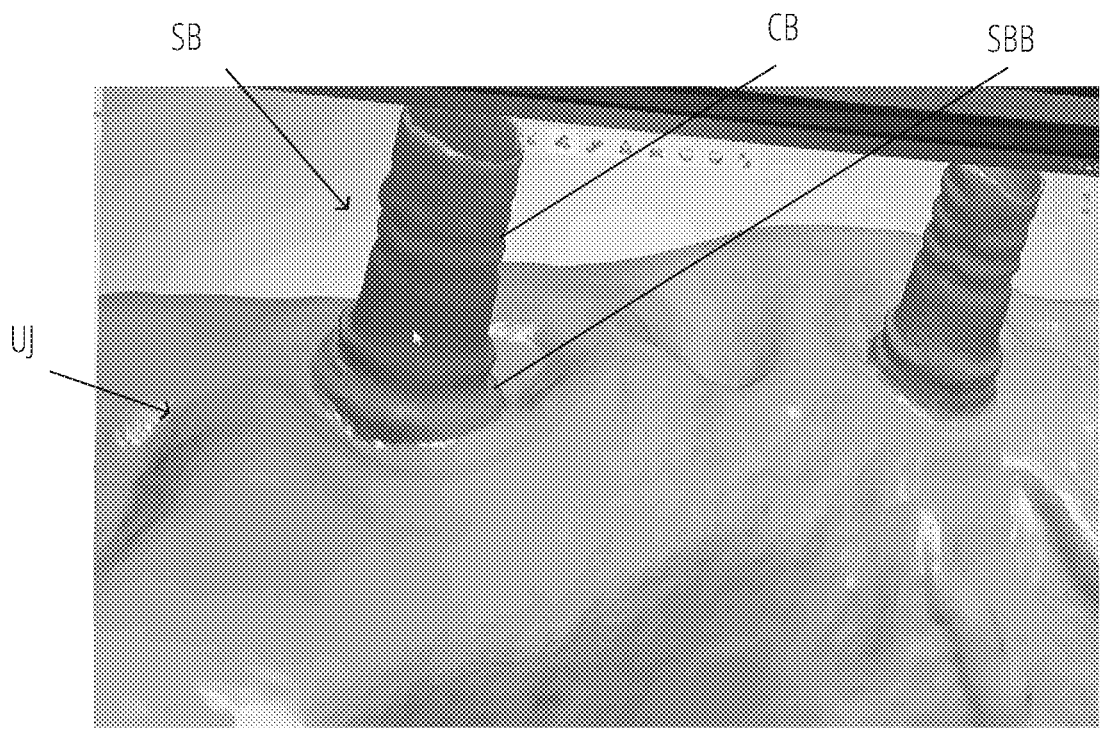
FIGS. 26A-26B show 3D models of a replacement arch with scan bodies wherein abutment holes for individual replacement teeth portions are being defined.
Figure 26B:
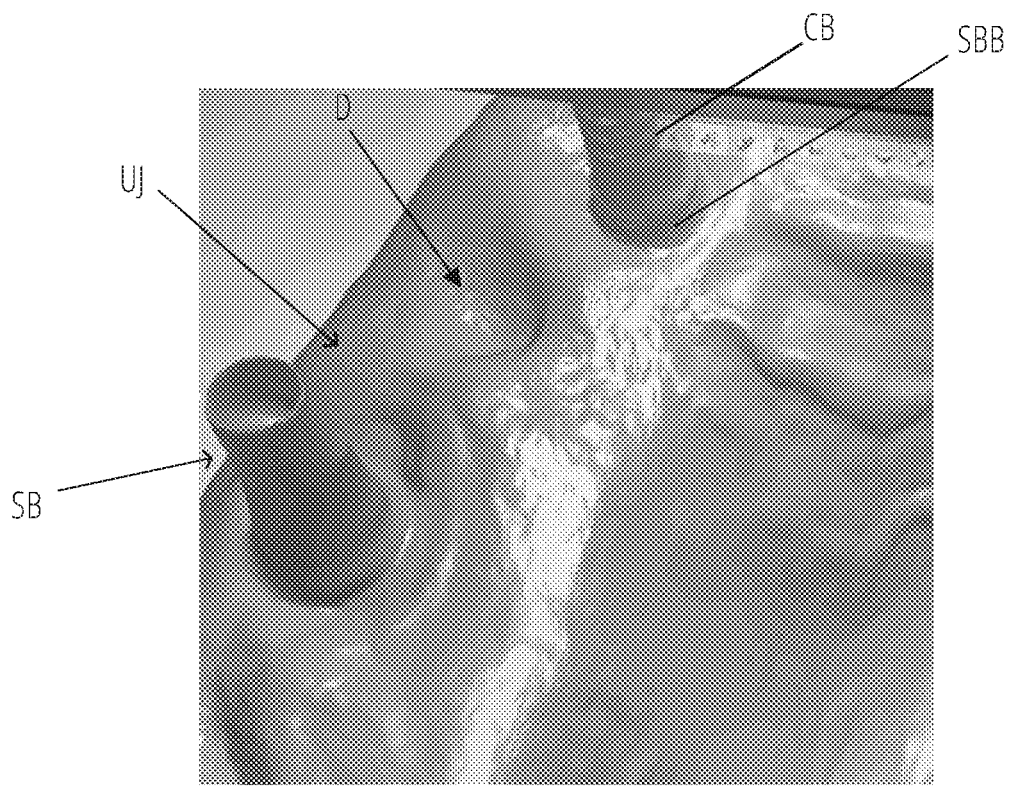

Referring to FIGS. 26A and 26B, the scan bodies SB may have a generally cylindrical body CB, which corresponds to the shape of the generally cylindrical through-hole 144 of the abutment hole 130 (see FIG. 16). However, the cylindrical body CB of the scan bodies may have a generally uneven exterior surface. In that regard, a user may interact with the bridge design engine 1814 to smooth the cylindrical bodies CB of the scan bodies SB of the replacement arch UJ to define the desired shape of the corresponding abutment holes. Smoothing of the cylindrical bodies CB of the scan bodies SB also minimizes any issues during milling of the dental bridge that would typically occur when trying to mill an uneven surface inside a small opening.

A computer-aided smoothing tool presented by a module or sub-engine of the bridge design engine 1814 can be used to gradually smooth any ridged or uneven exterior surface of each of the scan bodies, as shown. For instance, a user may click on an area indicating an exterior surface of the cylindrical bodies CB of a scan body SB and move the cursor around the area to be smoothed out. Computer-aided smoothing tools are known in the art, such as the tool available in the 3Shape™ TRIOS™ software platform.

A user may also interact with the bridge design engine 1814 to enlarge the cylindrical bodies CB of the scan bodies SB to define the desired diameter of the generally cylindrical through-hole 144 of the abutment hole 130. In some examples, an abutment hole 130 having a generally cylindrical through-hole 144 with an inner diameter that is slightly larger than an outer diameter of the cylindrical body CB of the scan body SB (e.g., 1.00 mm) is beneficial to allow for ease of installation of the abutments.

A computer-aided enlarging tool presented by a module or sub-engine of the bridge design engine 1814 can be used to gradually enlarge the outer diameter of each of the cylindrical bodies CB of the scan bodies SB, as shown. For instance, a user may click on an area indicating an exterior surface of a cylindrical body CB of a scan body and move the cursor around in that area to enlarge the area. Computer-aided enlarging tools are known in the art, such as the tool available in the 3Shape™ TRIOS™ software platform.

In some cases, the user may interact with the bridge design engine 1814 to "fill in" the recess/cavity defined in an upper end of the cylindrical bodies CB of the scan bodies SB. As shown in FIGS. 25 and 26, the scan bodies SB may include a recess in an upper end, and/or the scan bodies SB may be hollow. In that regard, the scan bodies SB must be filled in to define a solid structure so that the abutment hole 130 will be appropriately defined as an uninterrupted through-hole. If the scan body SB is sufficiently long/tall such that the solid portion of the scan body SB extends through the entire height of the corresponding tooth portion, the step of filling in the recess/hollow interior of the scan body SB is not necessary. The step of filling in the recess/hollow interior of the scan bodies SB may be done manually by the user, such as with the enlarging tool.

It should be appreciated that the smoothing/enlarging/filling in may be done simultaneously. Moreover, in some examples, the scan bodies may be automatically smoothed/enlarged/filled in by the bridge design engine 1814 based on a machine learning algorithm that receives at least one of scan data of the replacement arch before extraction, scan data of the replacement arch after extraction and before implant placement, scan data of the replacement arch after extraction and after implant placement, data regarding the scan body size and shape, data regarding an abutment size and shape, data regarding the corresponding crown tooth portion size and shape, historical data regarding manual smoothing/enlarging/filling in of scan bodies in a model of a replacement arch, data science, etc., as input.

Moreover, in some examples, scan bodies are not used, and the bridge design engine 1814 can define the abutment holes in the required teeth portions based on a machine learning algorithm that receives at least one of scan data of the replacement arch before extraction, scan data of the replacement arch after extraction and before implant placement, scan data of the replacement arch after extraction and after implant placement, data regarding an abutment size and shape, data regarding the corresponding crown tooth portion size and shape, data regarding past abutment holes sizes/shape designated for a corresponding model/crown tooth portion, data science, etc., as input. Further details of an exemplary system that uses at least one machine learning model to generate a dental bridge design for fabrication will be described further below.

Figure 27:
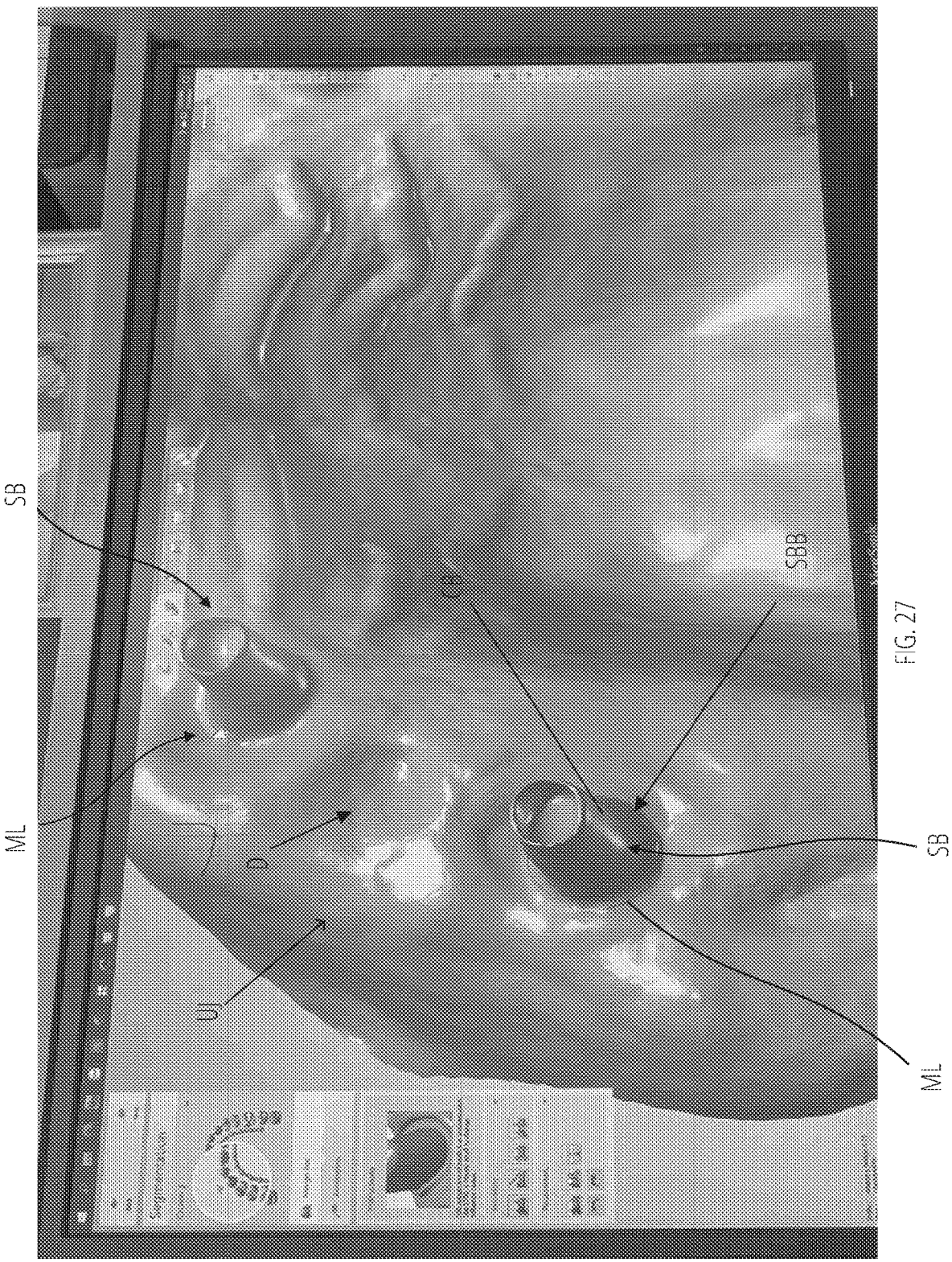
FIG. 27 shows a 3D model of a replacement arch with scan bodies wherein margin lines of abutment holes for individual replacement teeth portions are being defined.

Referring to FIG. 27, defining abutment holes 130 for the dental bridge 100 may include defining margin lines for the gradually widened gingival and incisal/occlusal openings 148 and 152. As noted above with reference to FIG. 17, the abutment hole 130 may flare outwardly as it extends from an interior surface of the generally cylindrical through-hole 144 toward the gingival or incisal/occlusal outer surface to allow the abutment skirt 134 to rest against the gingival opening 148, with the abutment body 132 extending into the abutment hole 130. Accordingly, the abutment hole 130 may include a gradually widened gingival opening 148 and a gradually widened incisal/occlusal opening 152.

As shown in FIG. 27, margin lines ML may be defined (e.g., drawn) around a base SBB of the scan bodies SB, such as in a deepest portion of the dimple D in the surrounding gum tissue of the model. The margin lines ML may define the maximum diameter of the widened gingival and/or openings 148 and 152 in the crown tooth portion. For instance, the margin lines ML may define the diameter of the widened gingival and incisal/occlusal openings 148 and 152 at the intersection of the generally cylindrical through-hole 144 with the gingival side 106 and the incisal/occlusal side 108, respectively, of the body 104 of the dental bridge 100.

The margin lines ML may be drawn by a user interacting with the bridge design engine 1814, such as using a drawing tool presented by a module or sub-engine of the bridge design engine 1814. In some examples, the margin lines ML may be automatically defined by the bridge design engine 1814 based on a machine learning algorithm that receives at least one of scan data of the replacement arch before extraction, scan data of the replacement arch after extraction and before implant placement, scan data of the replacement arch after extraction and after implant placement, data regarding the abutment size and shape, data regarding the corresponding crown tooth portion size and shape, historical data regarding margin lines ML defined in a model of a replacement arch, data science, etc., as input.

In some examples, the method may include using a computing device (such as the design computing device 1706) to annotate the bridge, such as by designating tooth portion locations for each tooth portion 112 of the dental bridge 100. The tooth portion locations may be initially designated in block 2008 as described above, where the bridge design engine 1814 may propose a location of crowns and pontics for the dental bridge 100 when generating a 3D model of the proposed individual replacement teeth portions 112 for the dental bridge. In a subsequent step, the user may identify more precise placement of the crowns and pontics relative to the post-extraction gum line of the replacement arch.

Figure 28:
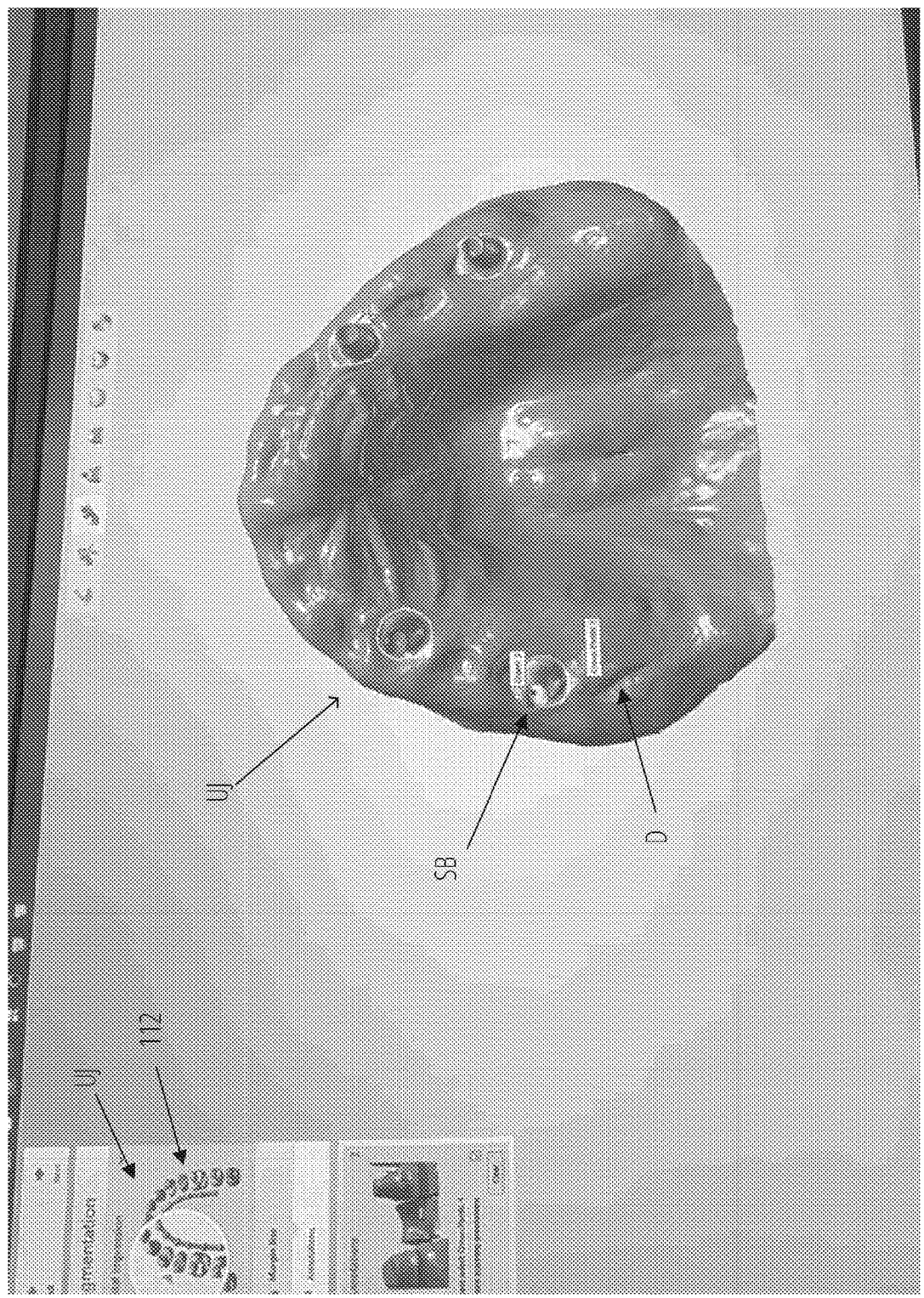
FIG. 28 shows a 3D model of a replacement arch with scan bodies wherein individual replacement teeth portion locations are being designated.

Referring to FIG. 28, the user may designate tooth portion locations in an annotations tab of the GUI presented by the bridge design engine 1814. For instance, the 3D model of the proposed individual replacement teeth portions 112 for the dental bridge may be shown in a side window, and the 3D model of the post-extraction replacement arch may be shown in the main window. A user may click on the tooth portion shown in the 3D model of the proposed individual replacement teeth portions 112, and subsequently the user may click on an area of the 3D model of the post-extraction replacement arch where the tooth portion should be placed in the dental bridge.

For instance, the user may click on a pontic tooth portion in the 3D model of the proposed individual replacement teeth portions 112, and then the user may click on a dimple D in the corresponding location for the pontic tooth portion in the 3D model of the post-extraction replacement arch, such as in a central area of the dimple D. Similarly, the user may click on a crown tooth portion in the 3D model of the proposed individual replacement teeth portions 112, and then the user may click on a scan body in the corresponding location for the crown tooth portion in the 3D model of the post-extraction replacement arch.

As noted above, the 3D model of the proposed individual replacement teeth portions 112 for the dental bridge may initially designate the crowns and pontics for the dental bridge. If, when designating tooth portion locations for each tooth portion 112 of the dental bridge 100 the crown and pontic designations are incorrect, the user may return to block 2010 to correct the designation of crowns and pontics.

In some examples, the method may include using a computing device (such as the design computing device 1706) to define an insertion angle for the abutment holes 130. The insertion angle may be used to provide cut path instructions to a mill for cutting/milling the abutment holes, such as along a longitudinal axis of the abutment holes. In that regard, the insertion angle may be generally defined by a longitudinal axis of the scan bodies SB, which is substantially aligned with the longitudinal axes of the implant and the root socket.

Figure 29A:
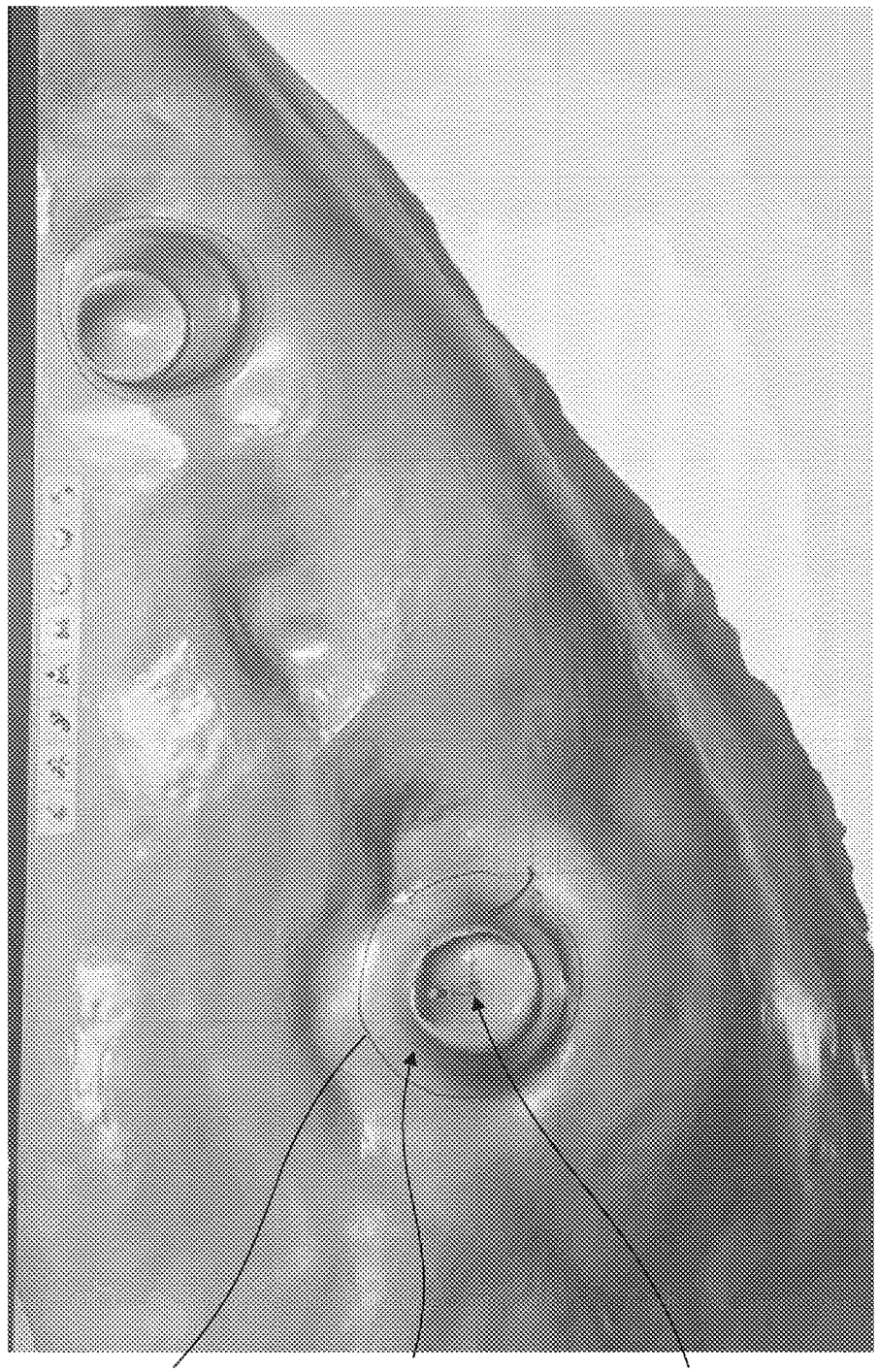
FIGS. 29A-29B show 3D models of a replacement arch with scan bodies wherein the insertion angle of abutment holes for individual replacement teeth portions are being defined.
Figure 29B:
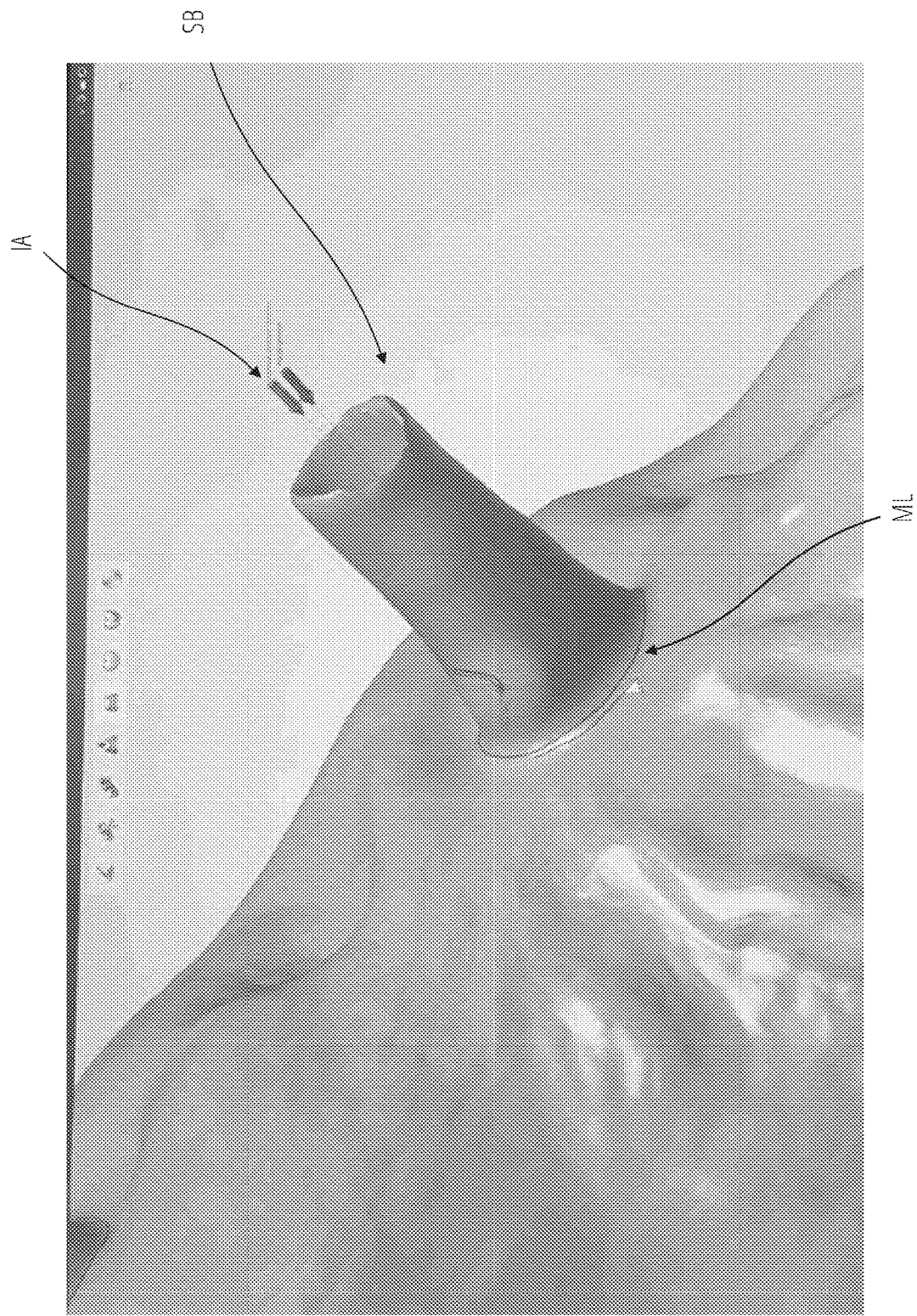

Referring to FIGS. 29A and 29B, the insertion angle may be defined by a user after orienting the 3D model of the replacement arch in predetermined orientation. For instance, the 3D model may be oriented such that an insertion axis IA of an abutment hole is defined transversely to the replacement arch when, for instance, clicking on the corresponding scan body center. As shown in FIG. 29A, the 3D model of the replacement arch is oriented in a top, plan view (e.g., with the user viewing the 3D model looking straight down at the arch). With the model oriented in a top plan view, the user may click on substantially a center of a scan body SB to define an insertion axis IA that is transverse to the top of the scan body. A perspective view showing the defined insertion axis IA is shown in FIG. 29B. When defining the insertion axis, the user may also adjust the margin lines ML around the scan body SB, as shown.

Any other suitable steps for orienting the model and/or defining an insertion axis of an abutment hole may instead be used. For instance, in some examples, the insertion axis IA may be automatically defined by the bridge design engine 1814 based on a machine learning algorithm that receives at least one of scan data of the replacement arch before extraction, scan data of the replacement arch after extraction and before implant placement, scan data of the replacement arch after extraction and after implant placement, data regarding the abutment size and shape, data regarding the corresponding crown tooth portion size and shape, historical data regarding insertion axes defined in a model of a replacement arch, data science, etc., as input.

In some examples, the method may include using a computing device (such as the design computing device 1706) to place teeth portions 112 in the 3D model relative to the post-extraction gums of the replacement arch for designing/customizing the dental bridge 100. In some examples, the teeth portions 112 are placed in the 3D model relative to the post-extraction gums of the replacement arch in block 2008 described above.

Figure 30:
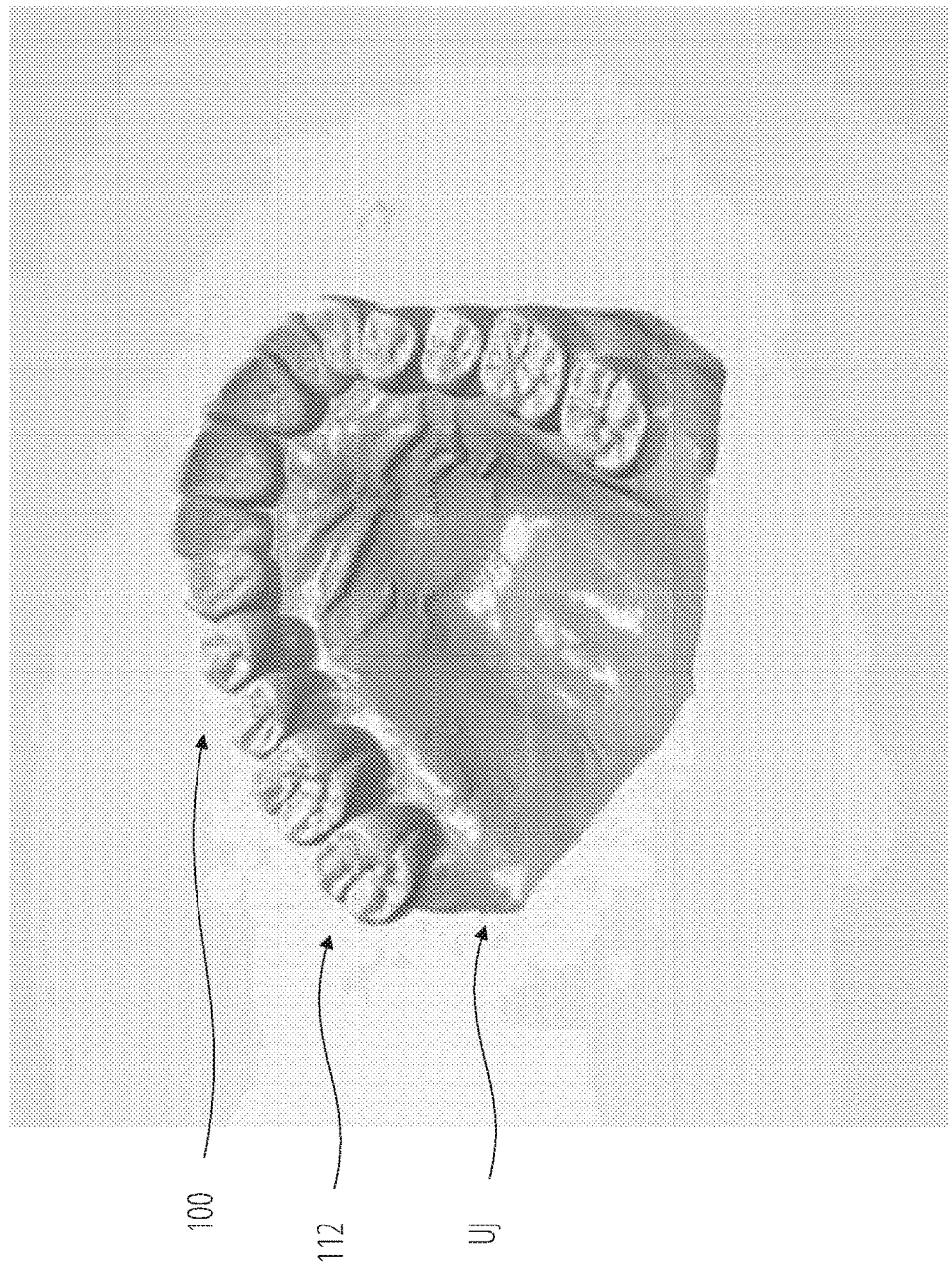
FIG. 30 shows a generated 3D model with teeth portions generally located in desired locations relative to the post-extraction gums of the replacement arch.

FIG. 30 shows a generated 3D model, such as by the bridge design engine 1814, with teeth portions 112 generally located in desired locations relative to the post-extraction gums of the replacement arch. For instance, the teeth portions 112 are placed such that a gingival section of the tooth portion is located generally adjacent to the corresponding dimple D or designated area of the gums, and the incisal/occlusal section of the tooth portion is located opposite the gingival section.

The method 2002 may proceed to block 2012, where a computing device (such as the design computing device 1706) may be used to modify at least one of a location, shape, and size of one or more of the teeth portions 112 to customize the dental bridge 100 for the replacement arch, such as for mating with the post-extraction tooth sockets of the replacement arch, ensuring a proper bite with the antagonist arch, etc. In that regard, the method may include performing at least one of rearranging the teeth portions 112, moving the teeth portions, rotating the teeth portions, shear tilting the teeth portions, distorting the teeth portions, reshaping the teeth portions, transforming the teeth portions, morphing the teeth portions, contouring the teeth portions, resizing the teeth portions, scaling the teeth portions, etc. In other words, after the teeth portions 112 are initially placed in a location of the 3D model, one or more of the teeth portions may be rearranged, moved, tilted, distorted, transformed, morphed, reshaped, contoured, resized, scaled, etc., to design a dental bridge 100 suitable for the replacement arch.

For instance, one or more of the teeth portions 112 may be adjusted in location relative to the post-extraction tooth sockets of the model of the replacement arch. As noted above, the dental bridge 100 includes teeth portions 112 having a tooth axis that is substantially alignable with the root socket axis of the post-extraction root socket (and alignable with the implant axis if a crown tooth portion). The location of one or more of the teeth portions 112 may be adjusted such that the tooth axis is substantially coaxially aligned with a longitudinal root socket axis of a corresponding post-extraction tooth socket of the model of the replacement arch.

In further aspects, one or more of the teeth portions 112 may be adjusted in location such that the ovate pontic portion on the gingival section of each teeth portion is configured to seal against the corresponding post-extraction tooth socket. Adjusting the location of a tooth portion 112 may include at least one of shifting the tooth portion, rotating the tooth portion, tilting the tooth portion, etc.

In further aspects, one or more of the teeth portions 112 may be adjusted in shape. For instance, one or more of the teeth portions 112 may be distorted in shear to alter the overall shape of the tooth portion. As another example, one or more of the teeth portions 112 may be transformed, morphed, reshaped or contoured, such as to ensure a proper bite with the teeth of the antagonist arch and/or to ensure a proper fit with the post-extraction root socket (e.g., so that the teeth portions 112 "come out of" the post-extraction root sockets). For instance, aspects of one or more of the teeth portions 112 may be shaved down, smoothed out, enlarged, made convex or concave, flattened, textured, etc.

In further aspects, one or more of the teeth portions 112 may be adjusted in size. For instance, one or more of the teeth portions 112 may be increased/decreased or adjusted in height, depth, width, etc. One or more of the teeth portions 112 may be scaled in size such that all the dimensional aspects of the tooth portion are adjusted at the same rate (e.g., increasing the overall size by 10%). Instead, or in addition, less than all the dimensions of the one or more teeth portions 112 may be adjusted in size. For instance, one or more of the teeth portions 112 may be adjusted in height only to ensure a proper bite with the teeth of the antagonist arch. As another example, one or more of the teeth portions 112 may be adjusted in height in less than an entire cross-sectional area of the teeth portions 112 (e.g., in only a mesial section) to ensure a proper bite. As yet another example, one or more of the teeth portions 112 may be adjusted in height to ensure a proper fit (sealing) with the post-extraction root socket.

As yet another example, one or more of the teeth portions 112 may be adjusted in height, width, and/or depth such that adjacent teeth portions are connected or joined together to define the integrally formed body 104 of the bridge 100. In other examples, one or more of the teeth portions 112 may be adjusted in size between a buccal and lingual side of the tooth portion and/or between a distal and mesial side of the tooth portion. The thickness may be adjusted across the height of the tooth portion(s), or across one or more sections of the tooth portion(s) (e.g., one or more of the gingival, middle, and incisal/occlusal sections). As yet another example, one or more of the teeth portions 112 may be adjusted in height, width, and/or depth in the gingival section and/or the incisal/occlusal section to alter the shape of the tooth portion. In that regard, adjusting a size or dimension of a tooth portion may also alter the shape of the tooth portion. However, it can be appreciated that a shape of a tooth portion may be modified without adjusting a size or any dimensions of the tooth portion.

The above examples of how one or more of the teeth portions 112 may be modified in at least one of a location, shape, and size to customize the dental bridge 100 for mating with the post-extraction tooth sockets of the replacement arch should not be seen as limiting. Rather, any combination of location, size, and shape modifications may be made to one or more of the teeth portions 112. Further, the teeth portions 112 may be modified in location, shape, and/or size individually, all at once, or as a group of more than one tooth portion.

FIGS. 31A-55B each depict an exemplary GUI generated by a computing device that may be used for carrying out various dental bridge design steps for a replacement arch. For instance, through a GUI generated by the bridge design engine 1814, the teeth portions 112 may be modified in location, shape, and/or size with a design tool presented by a module or sub-engine of the bridge design engine 1814. In other examples, the teeth portions 112 may be modified in location, shape, and/or size with the aid of one or more machine learning algorithms that produces a customized bridge design based on at least one of scan data of the replacement arch before extraction, scan data of the replacement arch after extraction and before implant placement, scan data of the replacement arch after extraction and after implant placement, data regarding the abutment size and shape, data regarding the corresponding crown tooth portion size and shape, historical data regarding bridge customization for a replacement arch, data science, etc., as input.

It should be appreciated that the exemplary 3D models of the replacement arch shown in each GUI of FIGS. 31-55 are provided for illustrating various design steps that may be used, but other steps may additionally or instead be used to customize the dental bridge 100. Moreover, design steps may occur in any order and are not limited to the sequence as shown. Finally, as noted above, if a customization step is described with respect to a single tooth portion, the customization step may also be carried out for some or all of the teeth portions.

To aid in designing/customizing the dental bridge 100, the 3D model of the opposite, antagonist arch, including its teeth, may also be shown in the GUI. In this manner, the teeth portions 112 of the replacement arch may be adjusted in size, location, etc., relative to the teeth portions of the antagonist arch. Moreover, the antagonist arch may be turned on and off in the GUI (shown or not shown) as needed for locating, reshaping, and/or resizing the teeth portions 112 of the replacement arch. Further, the gums of the replacement arch and/or antagonist arch may be turned on and off in the GUI (e.g., shown or not shown), made translucent, etc., as needed for locating, reshaping, and/or resizing the teeth portions 112 of the replacement arch.

Figure 31A:
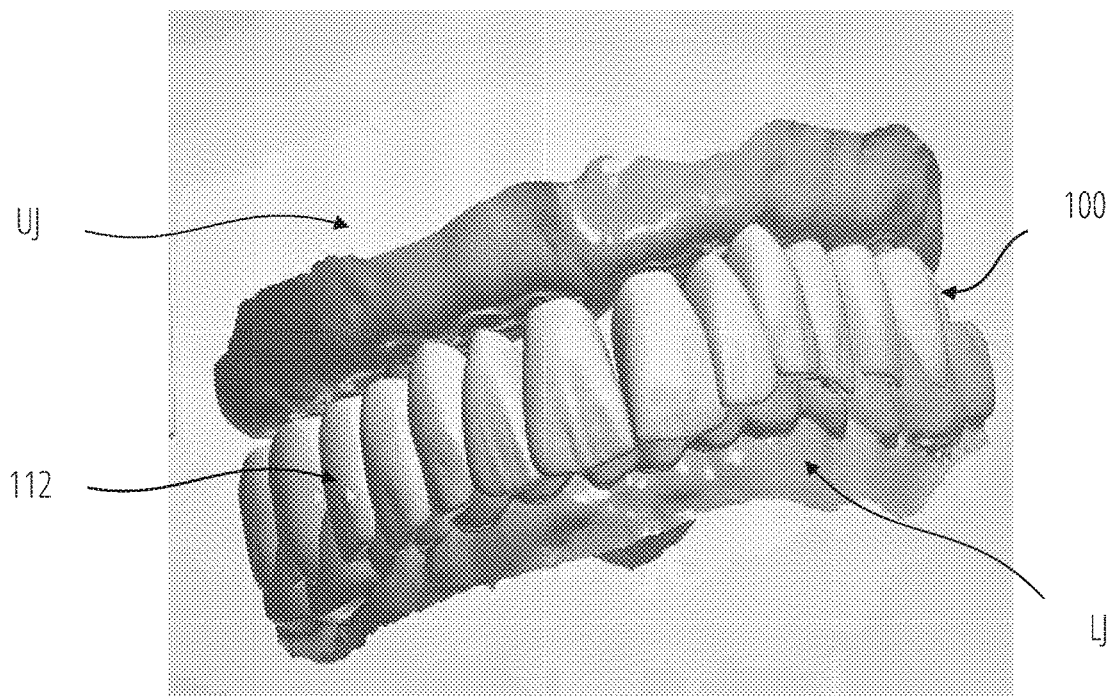
FIGS. 31A-55B each depict an exemplary graphical user interface (GUI) generated by a computing device that may be used for carrying out various dental bridge design steps for a replacement arch.

FIG. 31A shows a 3D model of a dental bridge 100 with its teeth portions 112 placed relative to an antagonist arch having teeth. As can be seen, the teeth portions 112 of the replacement arch are so large or tall that the teeth portions 112 extend well past the incisal/occlusal sections of the teeth of the antagonist arch. The teeth portions 112 of the replacement arch may therefore be reduced in height between its gingival side and incisal/occlusal side to appropriately engage the teeth of the antagonist arch.

Figure 31B:
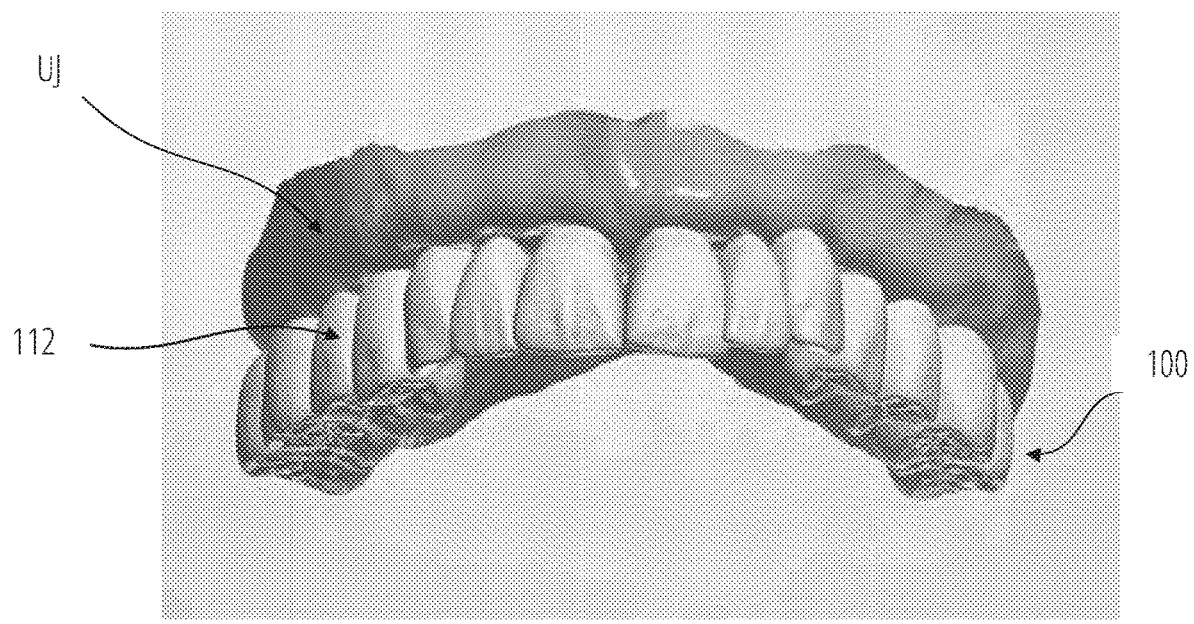

As shown in FIG. 31B, all of the teeth portions 112 of the replacement arch have been reduced in height between its gingival side and incisal/occlusal side. The teeth portions 112 may be reduced in height all at once and/or individually, such as by clicking on a horizontal plane/marker of the arch and moving the plane/marker upwards or away from the antagonist arch. As such, the incisal/occlusal side of the teeth portions 112 can appropriately engage the teeth of the antagonist arch.

Figure 32:
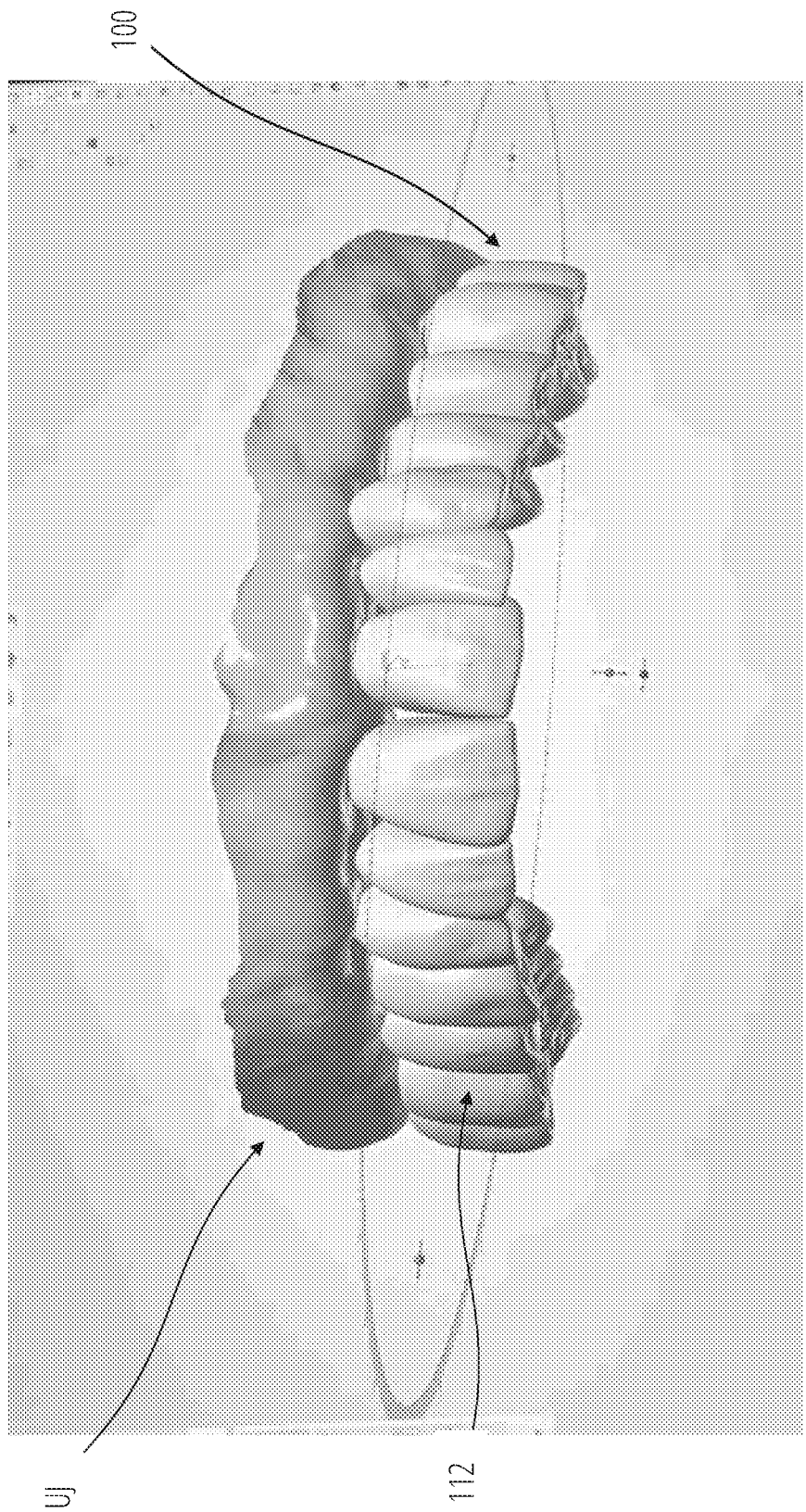

FIG. 32 shows a 3D model of a dental bridge 100 with all its teeth portions 112 being moved together as a group along a circular path or arch of the replacement arch. For instance, the teeth portions 112, together as a group, can be rotated about a vertical axis extending through substantially the center of a circle encircling the replacement arch UJ. In this manner, the entire arch of teeth portions 112 can be shifted in its position along the arced length of the replacement arch UJ.

Figure 33:
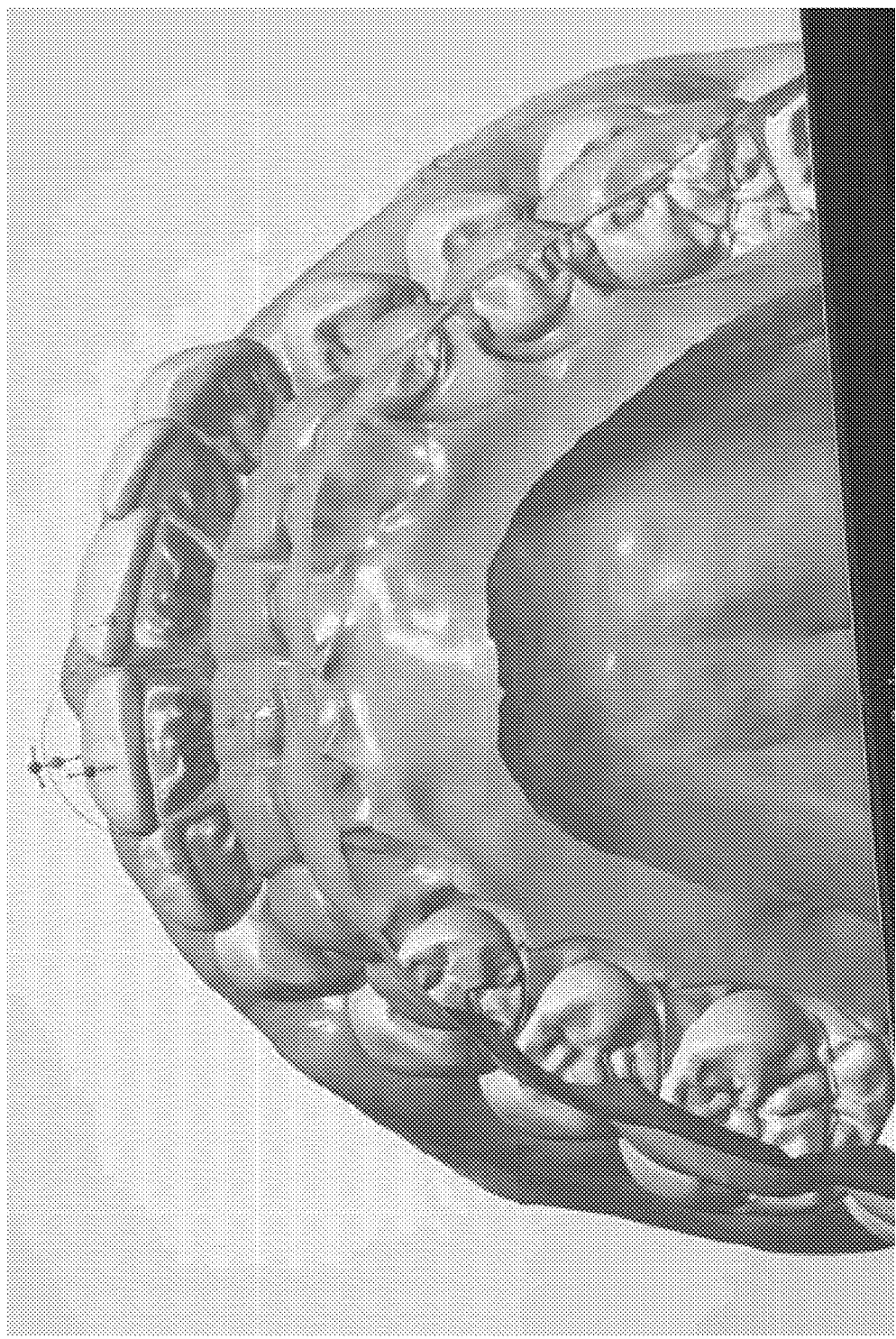
Figure 34:
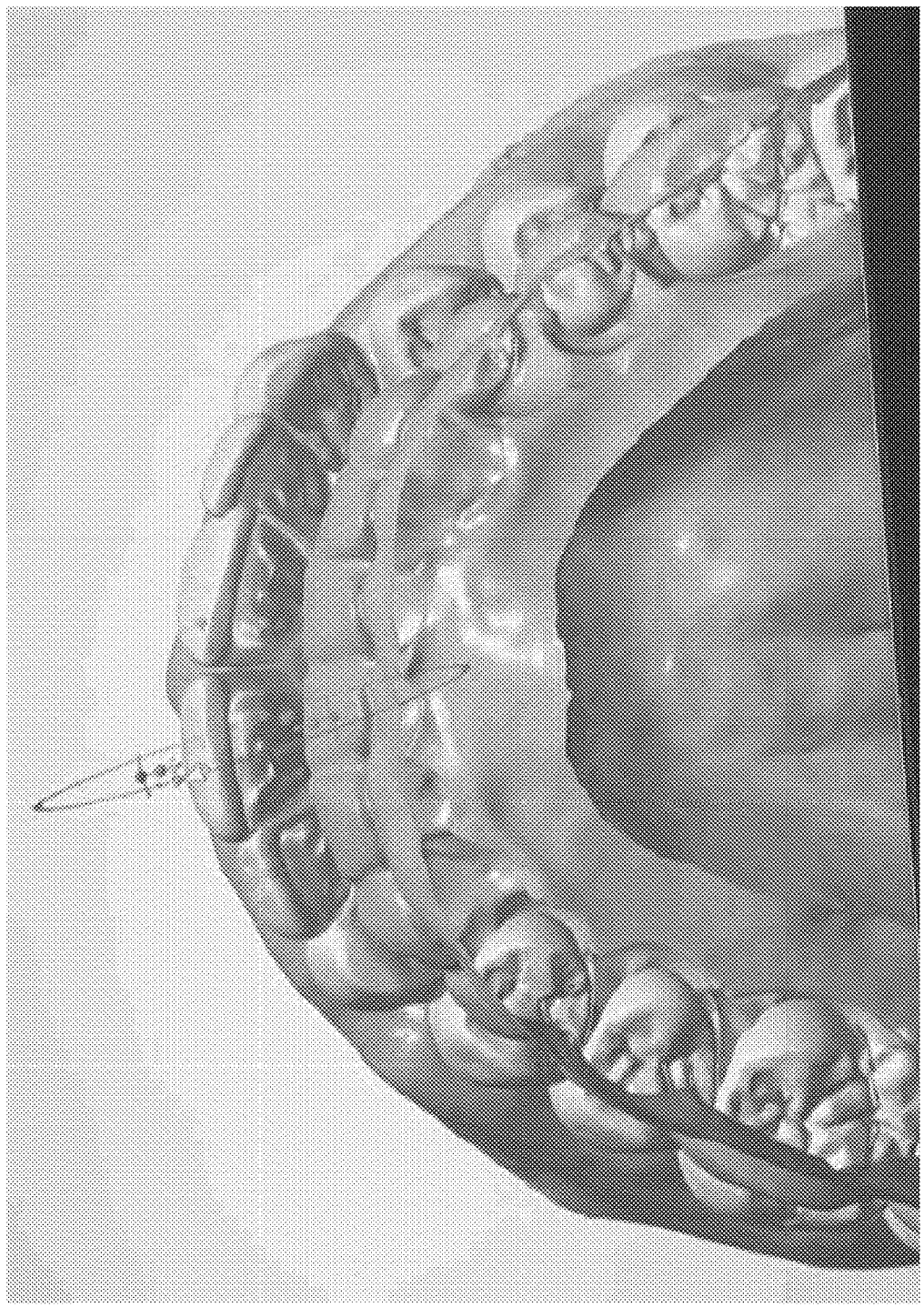

FIG. 33 shows a 3D model of a dental bridge 100 with a tooth portion 112, and specifically, the central incisor, being tilted or rotated about a vertical axis extending substantially through the center of the tooth portion. In some examples, a tooth portion 112 may be tilted or rotated about its tooth axis. FIG. 34 shows a 3D model of a dental bridge 100 with a tooth portion 112, and specifically, the central incisor, being tilted or rotated about a horizontal axis extending through the tooth portion. Each tooth portion 112 may be rotated about one or more axes to appropriately locate the tooth portion relative to the replacement arch UJ and/or the antagonist arch.

Figure 35A:
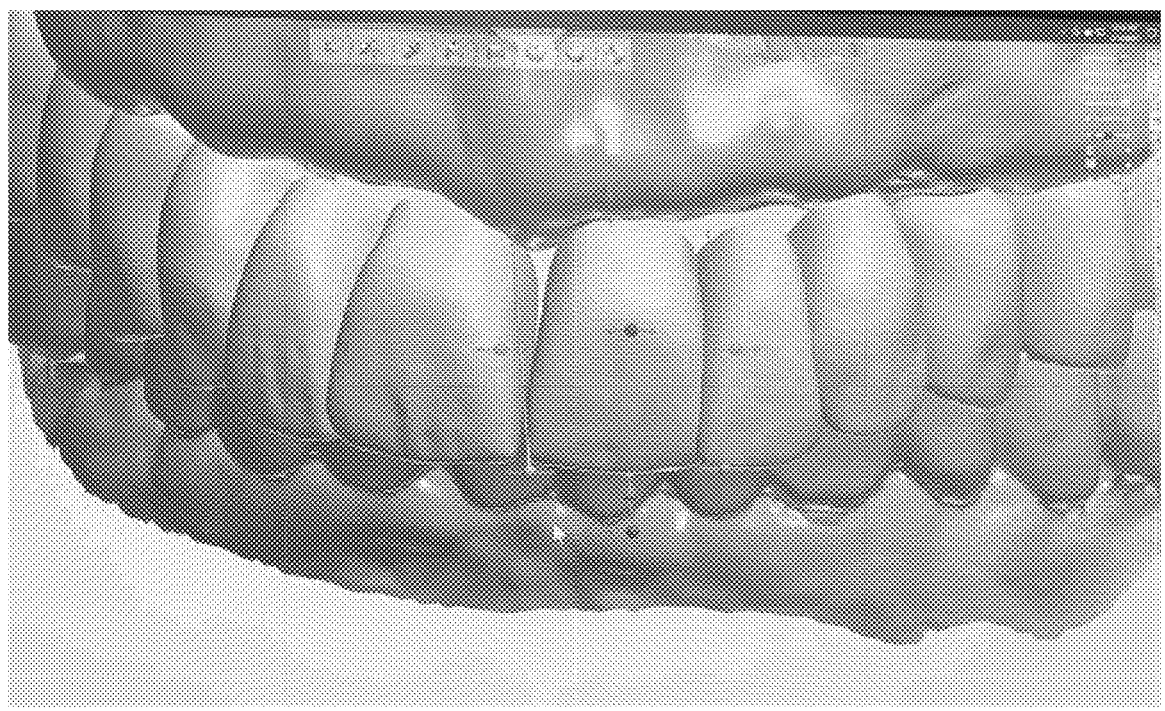
Figure 35B:
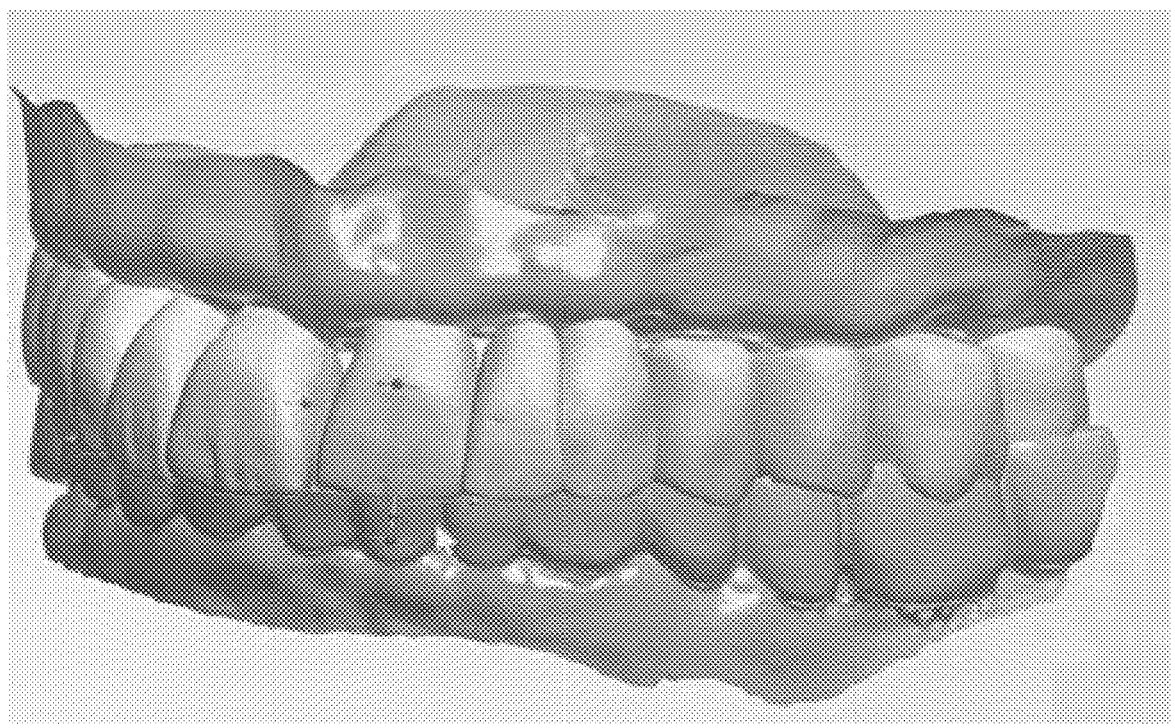

FIGS. 35A and 35B show 3D models of a dental bridge 100 with teeth portions 112, and specifically, the central and lateral incisors and the cuspid, moved from a first location separated from the gum into engagement with the gum.

Figure 36A:
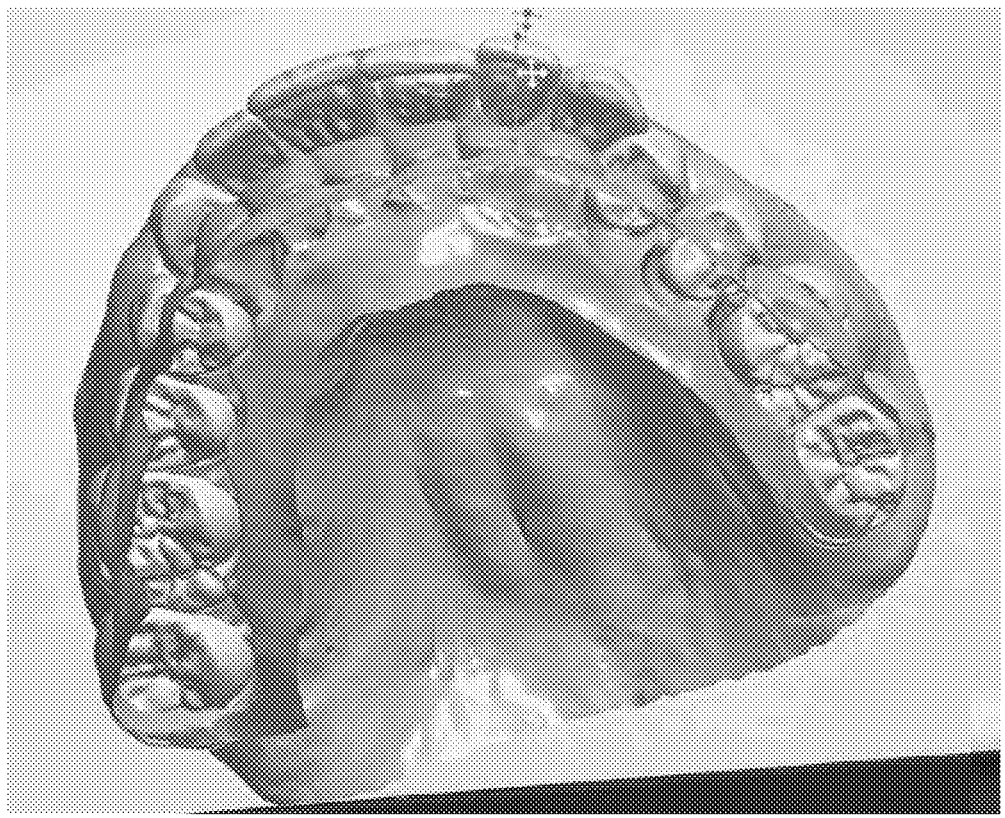
Figure 36B:
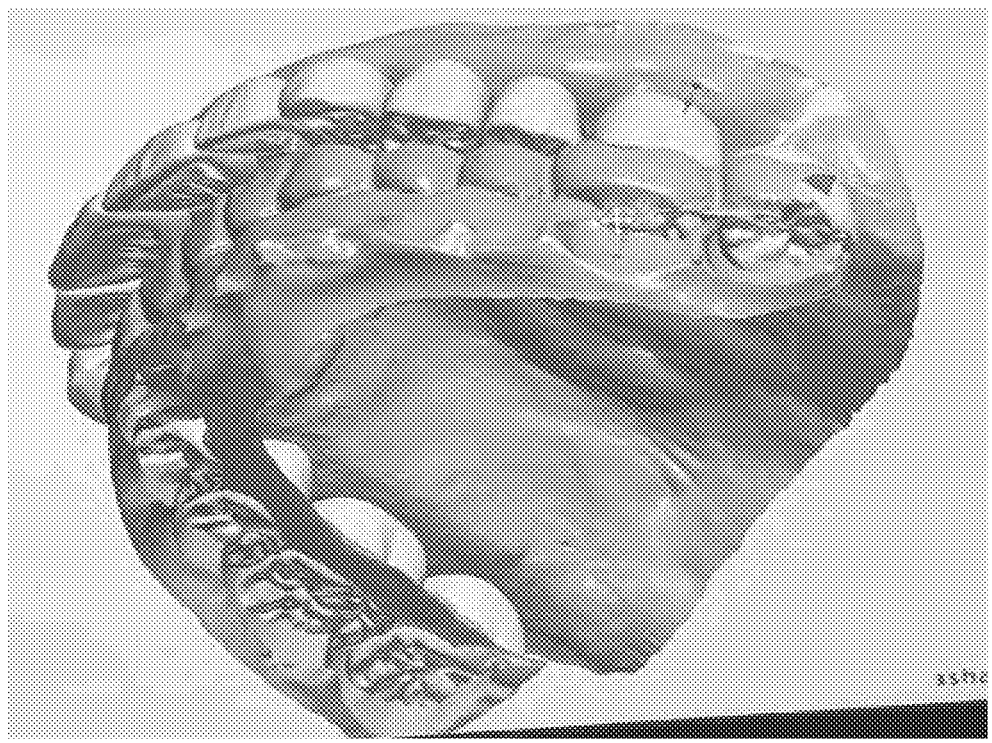
Figure 37:
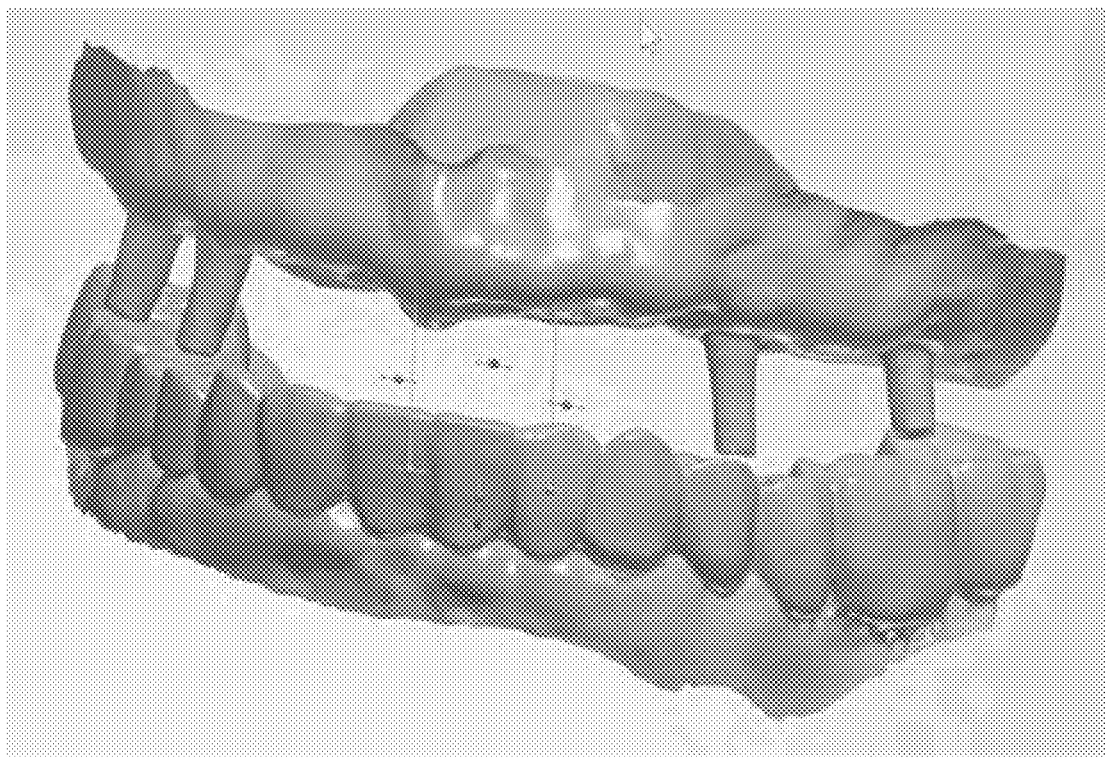

FIGS. 36A and 36B show 3D models of a dental bridge 100 with teeth portions 112, and specifically, the second bicuspid and molar teeth portions, moved from a first location out of alignment with the other teeth portions into with better alignment with the other teeth portions and the replacement arch UJ.

FIG. 37A shows a 3D model of the replacement arch UJ and the antagonist arch, where all the teeth portions for the replacement arch UJ have been "turned off", hidden, or are otherwise not shown. However, the axes for adjusting the teeth portions may be shown. For instance, the axes for the central incisor is shown. Such a view may be used to assess and or redefine the tooth access of one or more of the teeth portions 112.

Figure 38A:
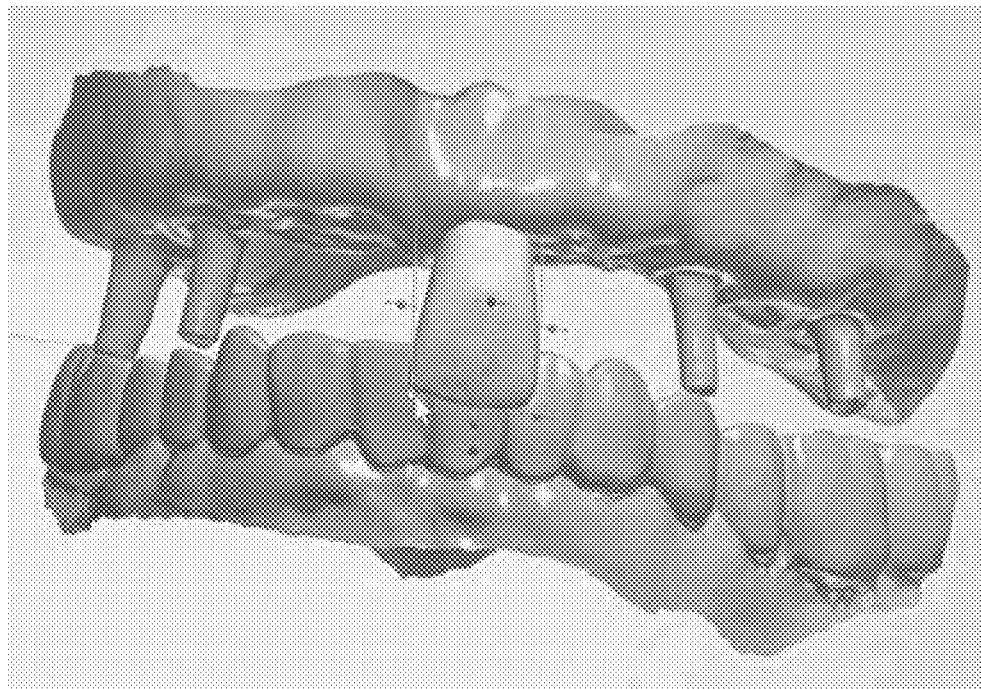
Figure 38B:
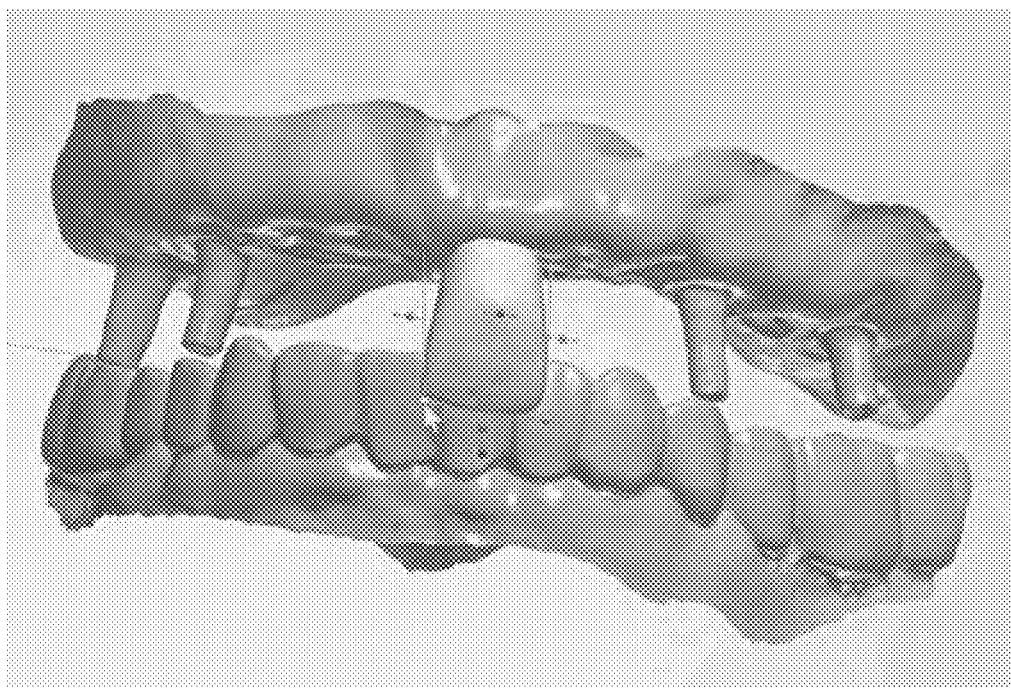

FIG. 38A shows a 3D model of the replacement arch UJ and the antagonist arch, where only one tooth portion 112 of the dental bridge 100 for the replacement arch UJ is "turned on" or otherwise shown, and specifically, the central incisor is shown. In this manner, adjustments to location, shape, and size may be easily made to the shown tooth portion(s). For instance, in FIG. 38BA, the mesial to distal width of the central incisor has been decreased in in its incisal/occlusal section.

Figure 39A:
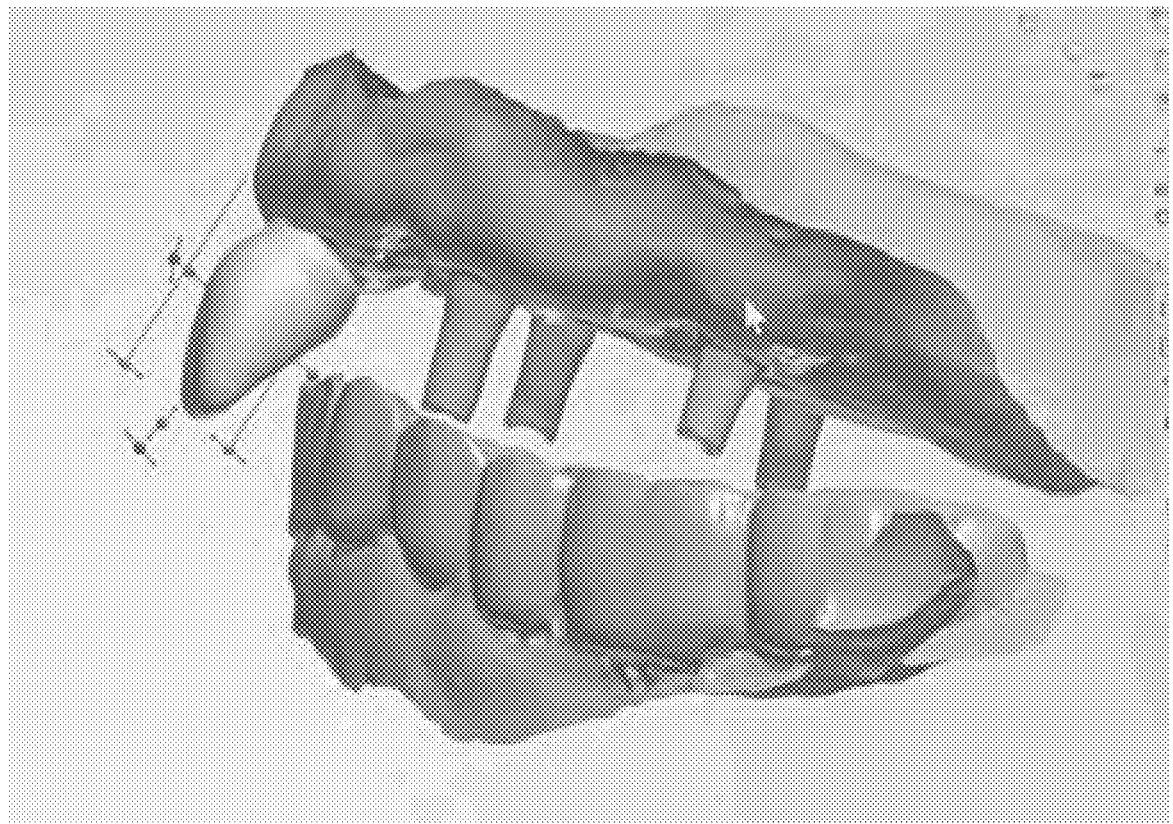
Figure 39B:
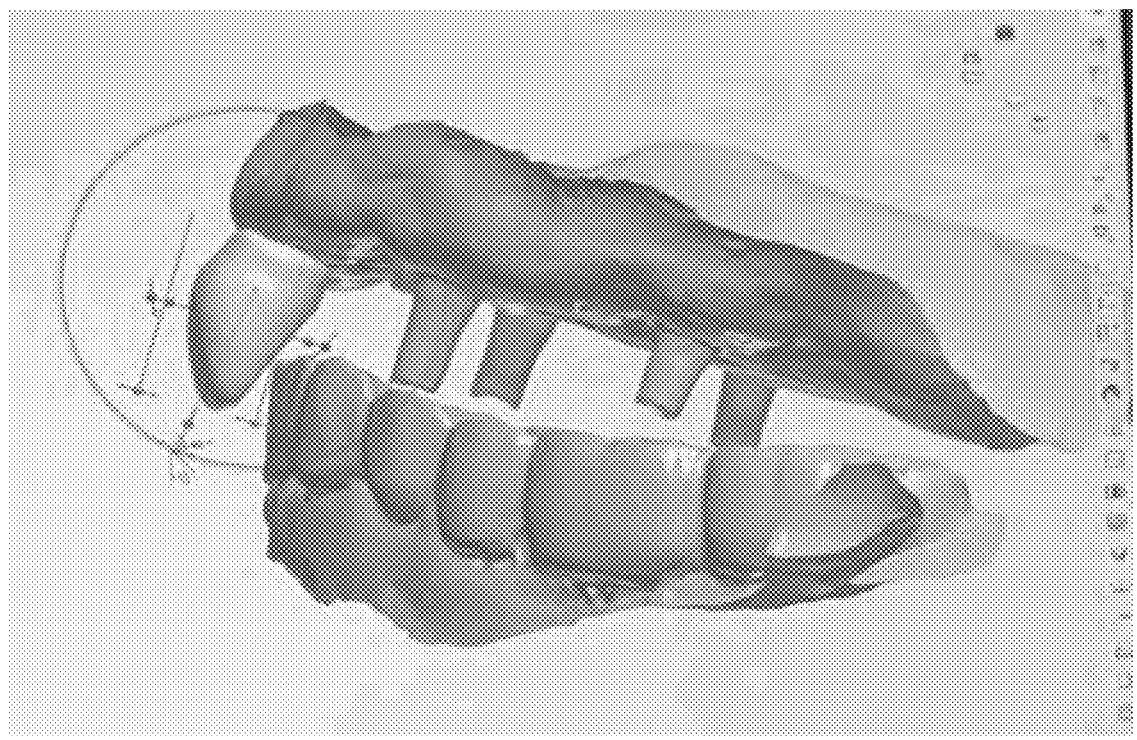

FIGS. 39A-39B continue to show a 3D model of the replacement arch UJ and the antagonist arch, where only the central incisor of the dental bridge 100 is shown. The central incisor is being tilted or otherwise rotated about a horizontal axis, as can be seen by the difference in positions between FIGS. 39A and 39B.

Figure 40A:
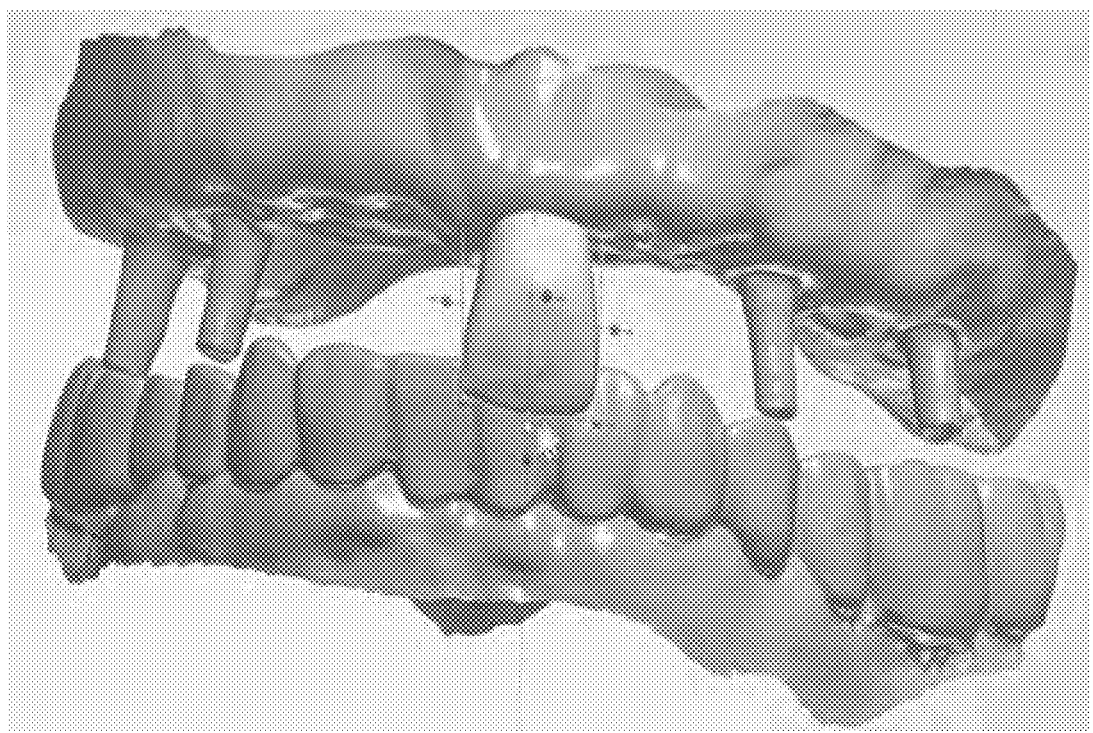
Figure 40B:
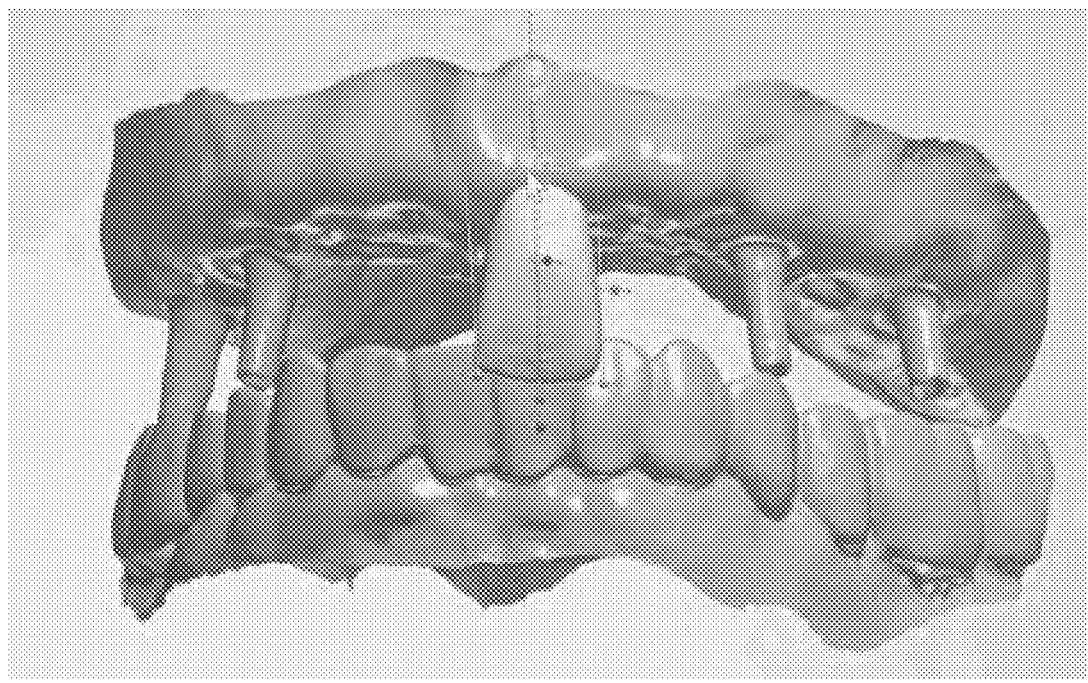

FIGS. 40A-40B continue to show a 3D model of the replacement arch UJ and the antagonist arch, where only the central incisor of the dental bridge 100 is shown. The central incisor is being increased in height in its gingival section, as can be seen by the difference in positions between FIGS. 40A and 40B. Such an increase in height in its gingival section can help ensure a slight penetration of the tooth portion with the corresponding post-extraction tooth socket or otherwise mating of the gingival side of the tooth portion with the gum tissue of the tooth socket.

Figure 41A:
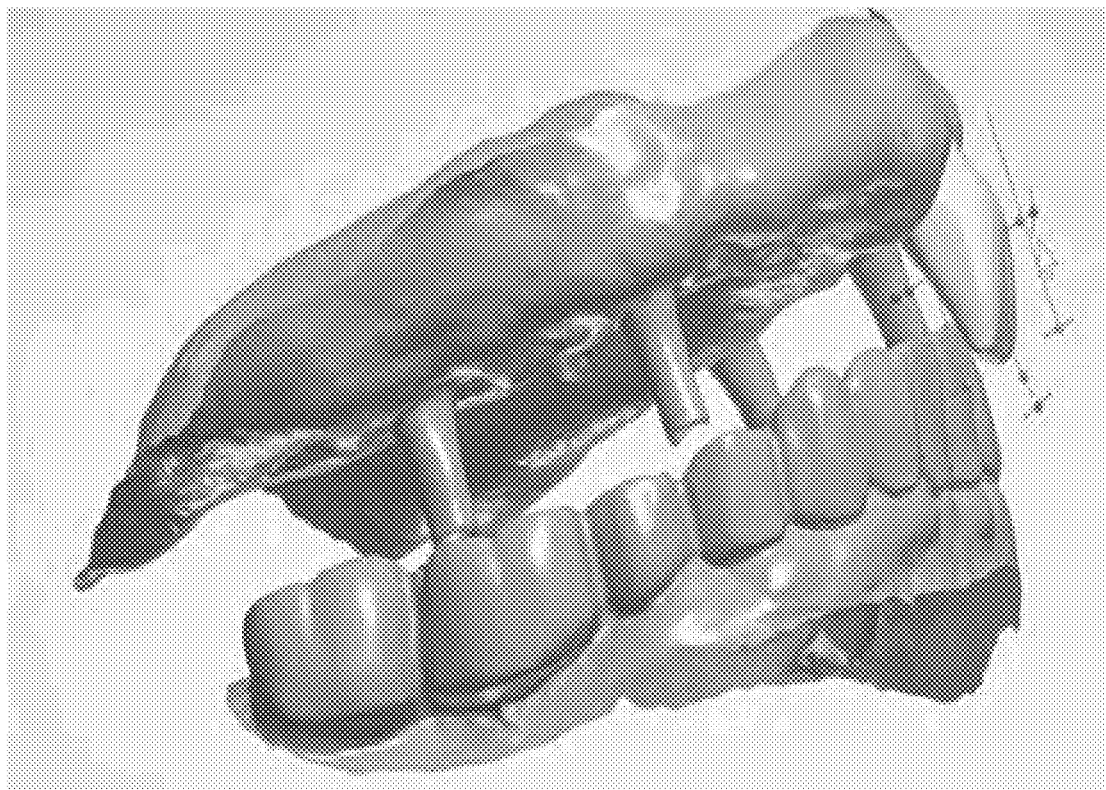
Figure 41B:
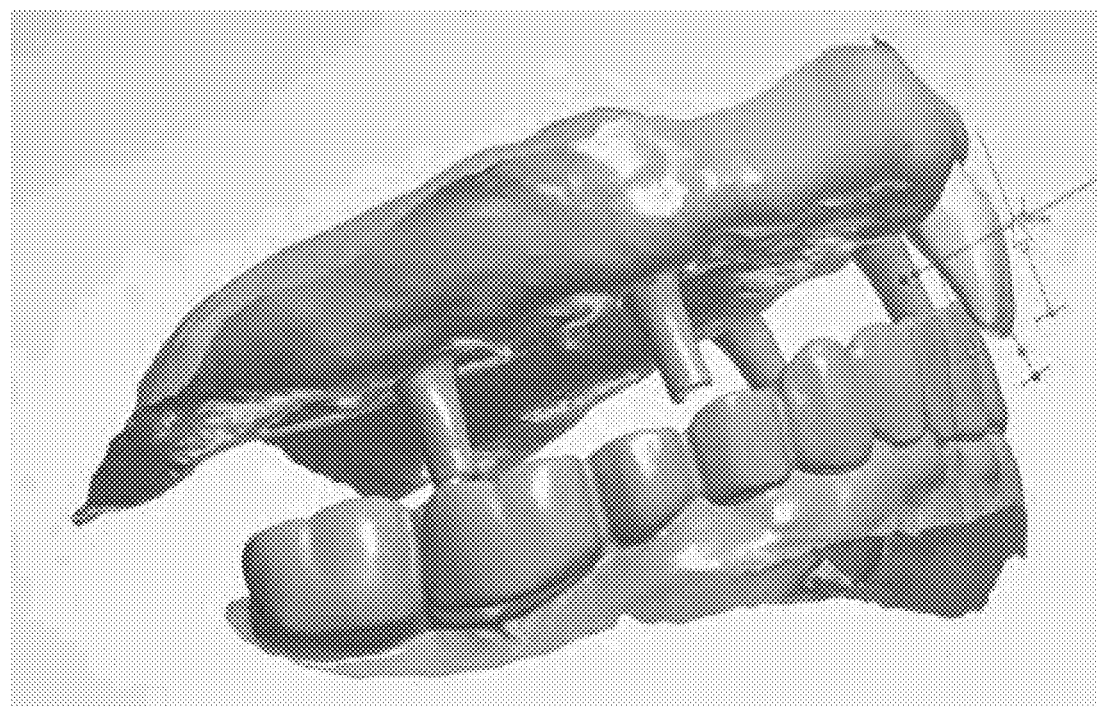

FIGS. 41A-41B continue to show a 3D model of the replacement arch UJ and the antagonist arch, where only the central incisor of the dental bridge 100 is shown. The central incisor is decreased in thickness between the buccal and lingual sides of the tooth portion, as can be seen by the difference in positions between FIGS. 41A and 41B.

Figure 42A:
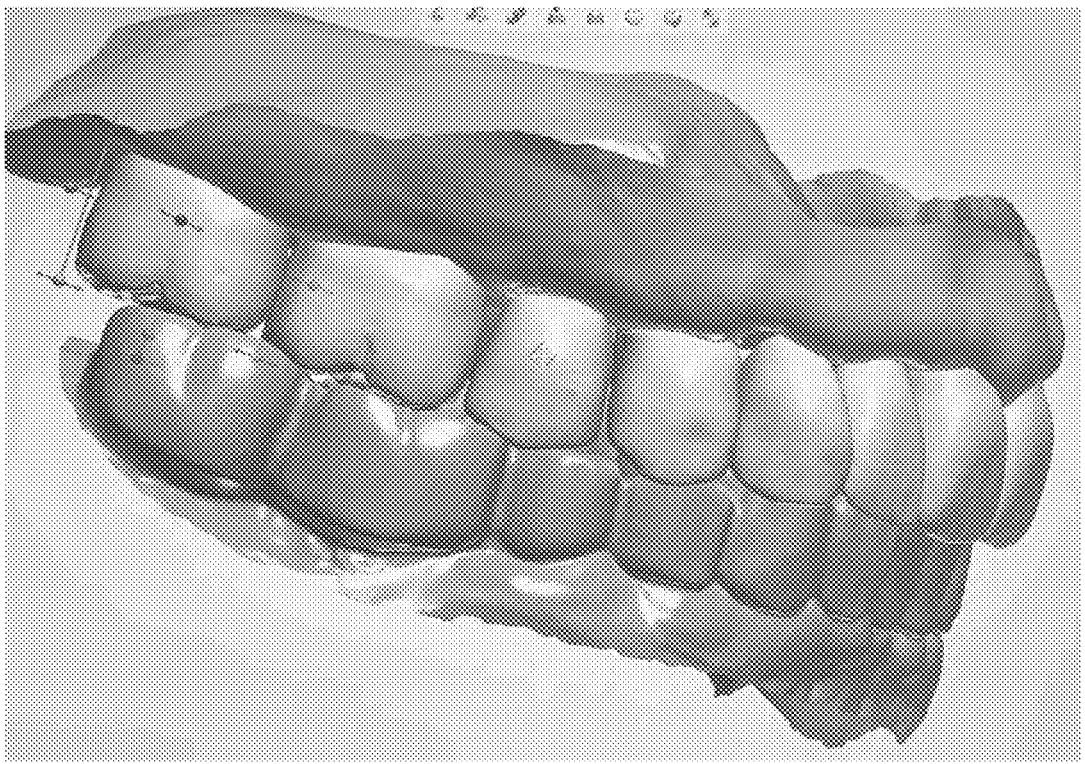
Figure 42B:
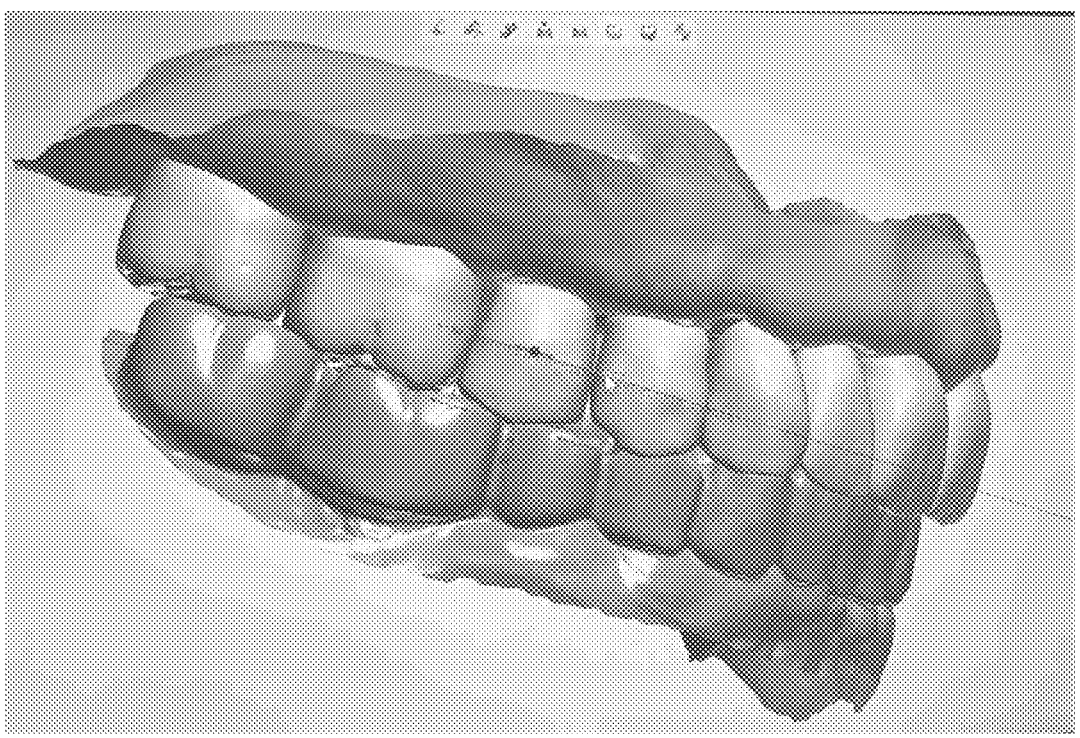

FIGS. 42A-42B show a 3D model of the dental bridge 100 for the replacement arch UJ and the antagonist arch. As can be seen in FIG. 42A, a gap exists between the right first molar tooth portion, the right second molar tooth portion, and the right second premolar/bicuspid tooth portion of the dental bridge 100. At least one of the location, shape, and size of at least one of these teeth portions may be adjusted to eliminate the gap between the adjacent teeth portions. As can be seen in FIG. 42B, the first molar tooth portion is widened or increased in width between its mesial and distal sides to decrease the gap.

Figure 43A:
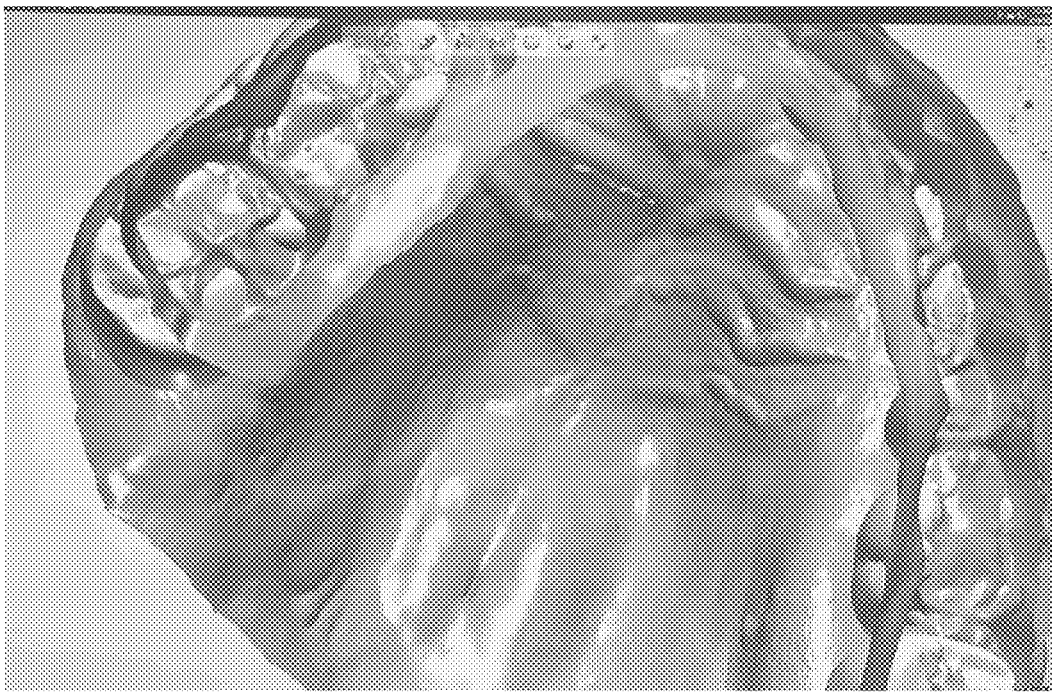
Figure 43B:
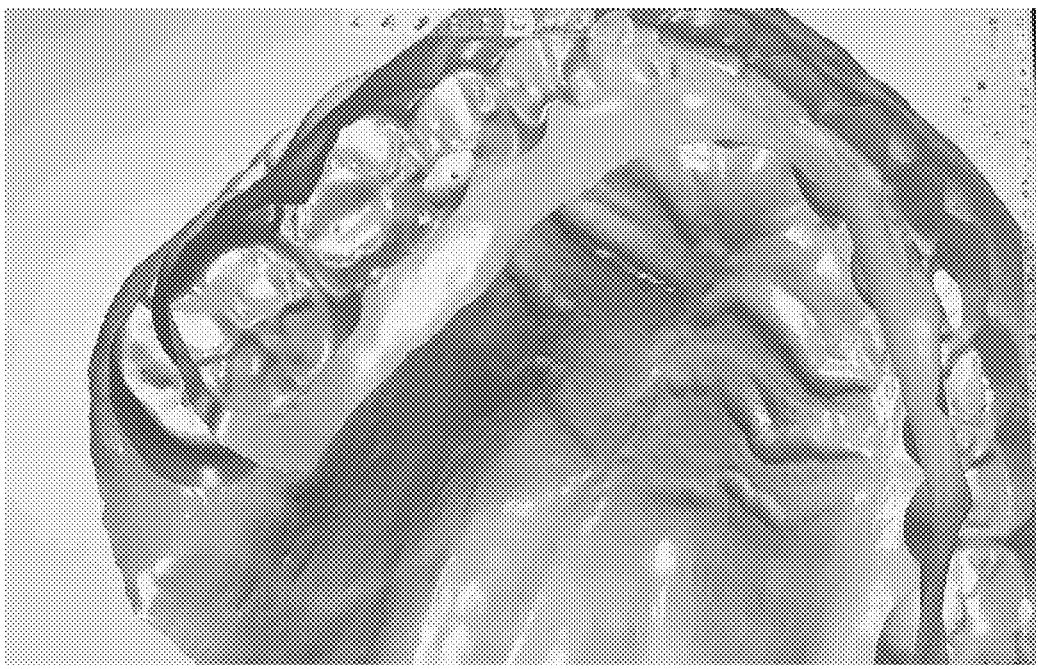

FIGS. 43A-43B show a bottom view of a 3D model the dental bridge 100 for the replacement arch UJ and the antagonist arch. As can be seen in FIG. 43A, some of the incisal/occlusal sections of the teeth portions 112 of the dental bridge 100 for the replacement arch UJ pass through or otherwise interfere with the teeth portions of the antagonist arch. In that regard, the teeth portions 112 of the dental bridge 100 may be adjusted in at least one of location, shape, and size such that substantially no overlap or interference is defined between the teeth portions of the replacement and antagonist arches. For example, as described above with respect to FIG. 31A-31B, the height of the teeth portions 112 may be decreased to better align the incisal/occlusal surfaces of the teeth portions.

In the example shown in FIG. 43A, the teeth portions 112 are generally in a proper location and only minor adjustments are needed to prevent interference. In that regard, a computer-aided design tool, such as a morphing tool, a leveling tool, etc., may be used to reduce in size, flatten, smooth out, etc., any incisal/occlusal sections of the dental bridge teeth portions 112 that protrude through the antagonist arch teeth portions. As can be seen in FIG. 43B, the incisal/occlusal sections of the third molar tooth portion of the dental bridge 100 have been reduced in sized/flattened/smoothed to eliminate interference with the corresponding third molar tooth portion of the antagonist arch.

Figure 44A:
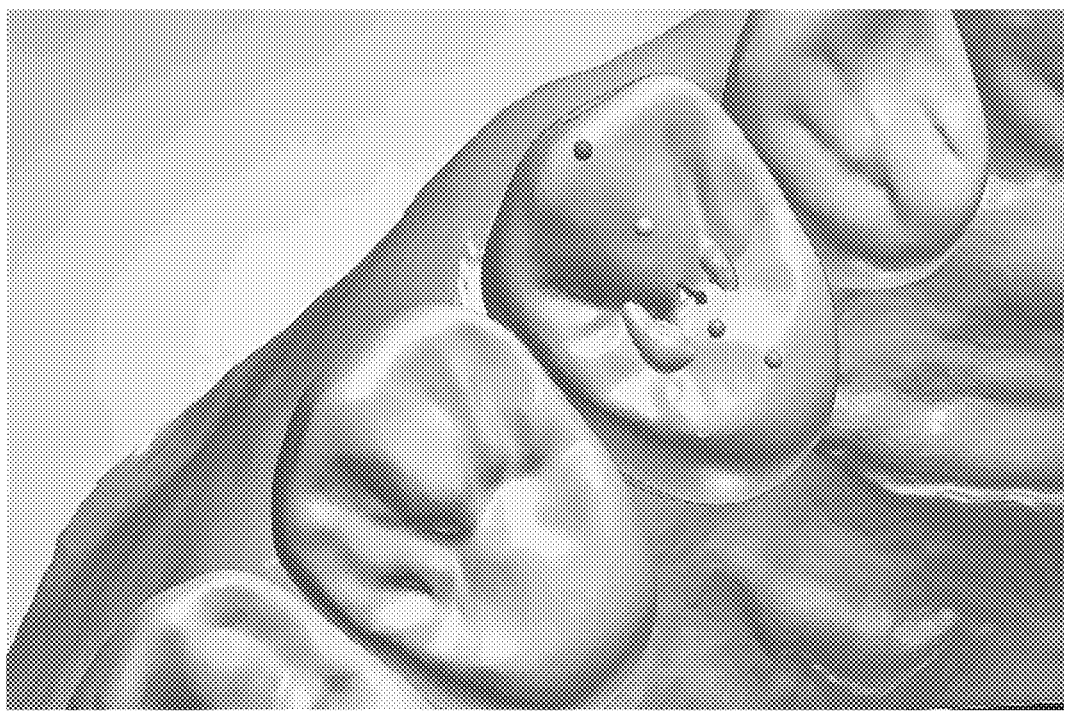
Figure 44B:
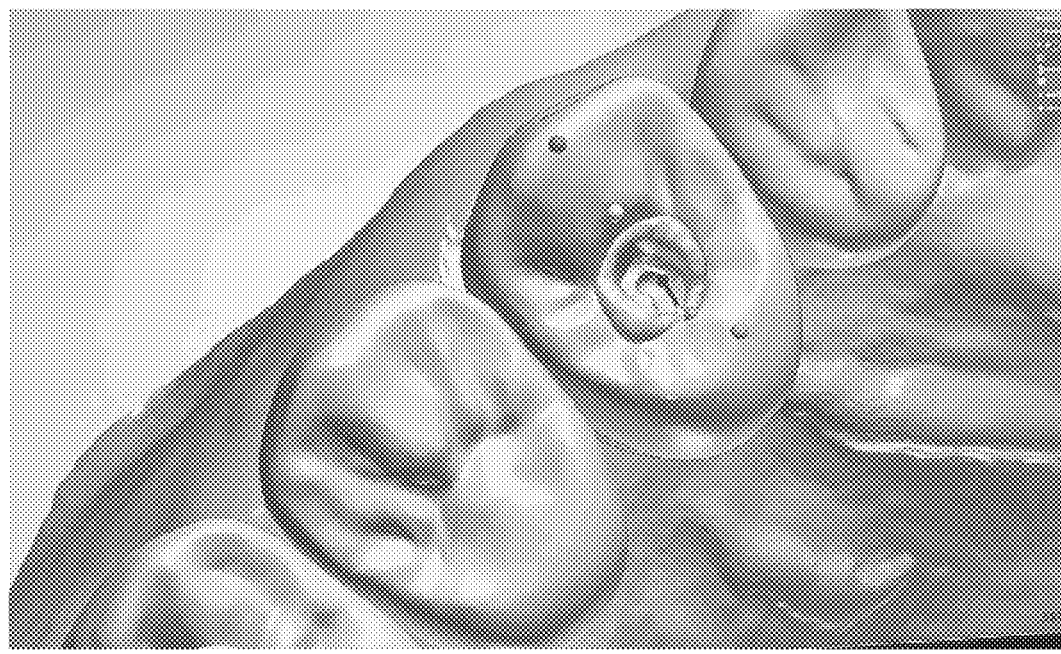

FIG. 44A shows a top view of a portion of a 3D model of the dental bridge 100 for the replacement arch UJ, wherein a scan body is shown partially protruding through one of the crown teeth portions 112 of the dental bridge 100. As noted above, it is best if the scan body protrudes all the way through the corresponding crown teeth portion in the 3D model to ensure that the abutment hole, which is defined by the scan body, will extend entirely through the tooth portion. In that regard, a computer-aided design tool, such as a brush tool, a digging tool, a spray can tool, etc., may be used to excavate tooth portion material surrounding and/or covering the scan body. FIG. 44A shows a top view of a portion of a 3D model of the replacement arch UJ, wherein a scan body is shown protruding entirely through one of the crown teeth portions 112 of the dental bridge 100 after excavating a portion of the incisal/occlusal section of the tooth portion covering the scan body.

Figure 45A:
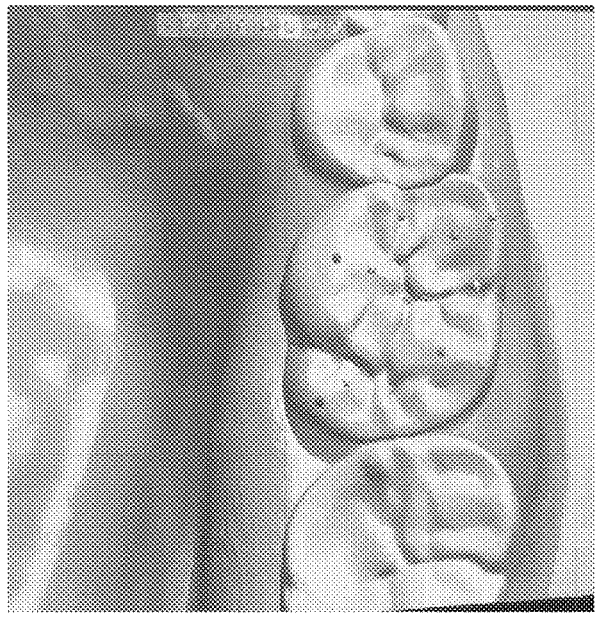
Figure 45B:
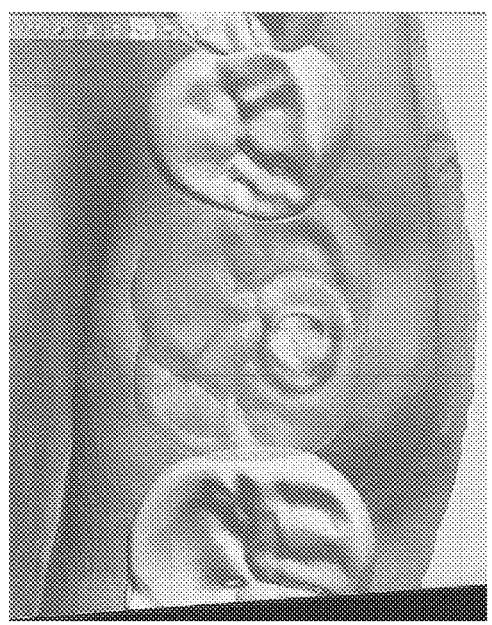
Figure 45C:
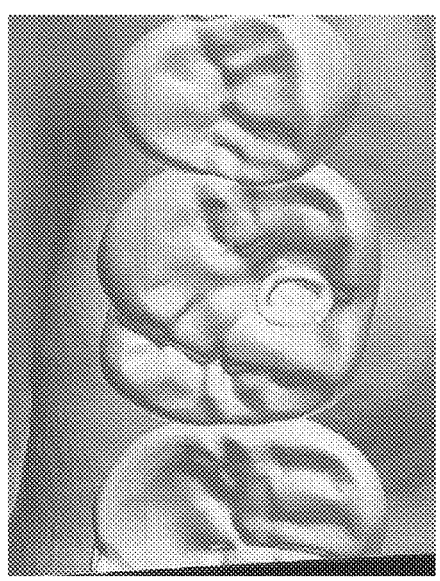

FIG. 45A shows a top view of a portion of a 3D model of the dental bridge 100 for the replacement arch UJ, wherein a crown tooth portion is shown, yet no portion of a scan body is protruding therethrough. Without the visual indicator of a scan body, the tooth portion may be identified as a crown tooth portion based on, for instance, tooth portion annotations done previously. In addition, or in the alternative, the teeth portions 112 of the dental bridge 100 may be made translucent, transparent, turned off, hidden, etc., such that the scan bodies are visible. For instance, FIG. 45B shows a top view of a portion of a 3D model of the replacement arch UJ, wherein a crown teeth portion is translucent such that a scan body beneath/inside the crown tooth portion is visible. In this translucent mode, a computer-aided tool may be used to excavate the portion of the incisal/occlusal section of the tooth portion covering the scan body. FIG. 45A shows a top view of a portion of a 3D model of the replacement arch UJ, wherein a scan body is shown protruding entirely through the crown tooth portion (now shown as a solid model) after excavating a portion of the incisal/occlusal section of the tooth portion covering the scan body.

Figure 46A:
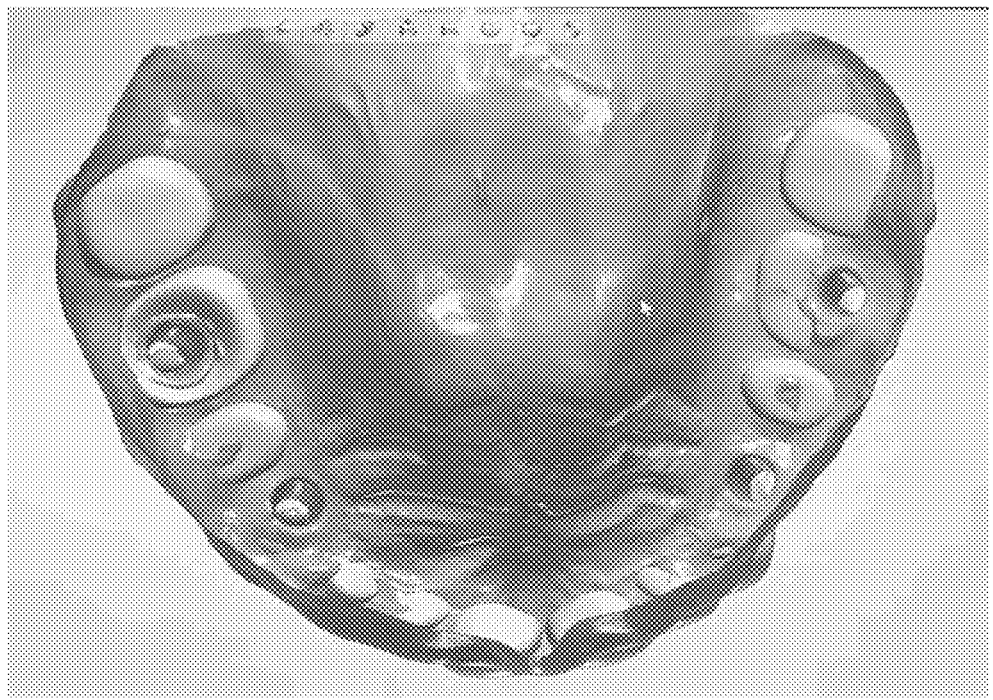

FIG. 46A shows a bottom view of a 3D model of the dental bridge 100 for the replacement arch UJ, wherein a base or gingival portion of at least some of the teeth portions 112 are shown protruding through the gums of the replacement arch UJ. One or more of the teeth portions 112 may be adjusted in location, shape, and/or size to ensure a proper fit (sealing) with the gums of the preserved natural ridge. More specifically, the teeth portions 112 may be adjusted in location, shape, and/or size such that the ovate pontic portion on the gingival section of each teeth portion is configured to seal against the correspondingly-shaped preserved gum/bony ridge.

At the same time, care is taken in designing/customizing the dental bridge 100 to ensure that the teeth portions 112 are not designed to extend unnecessarily past the outer surface of the gum tissue and into the tissue, as such interference with the tissue would cause discomfort to the patient, it would require adjustment of the tooth portion size/shape (e.g., sanding/grinding down the gingival section of the tooth portion after the bridge is fabricated), and/or it would compromise a natural fit of the bridge with the preserved ridge of the patient.

To initially set the location of the teeth portions 112 relative to the gums of the preserved ridge, as shown in FIG. 46A, the teeth portions 112 may be moved (see FIGS. 35A and 35B), tilted (see FIGS. 39A and 39B), rotated, etc., to substantially engage the gingival section of each tooth portion with the gum. With the teeth portions 112 in a substantially engaged position with the gums, adjustments may be made to optimize the interface between the gingival section of each tooth portion with the gum.

Figure 46B:
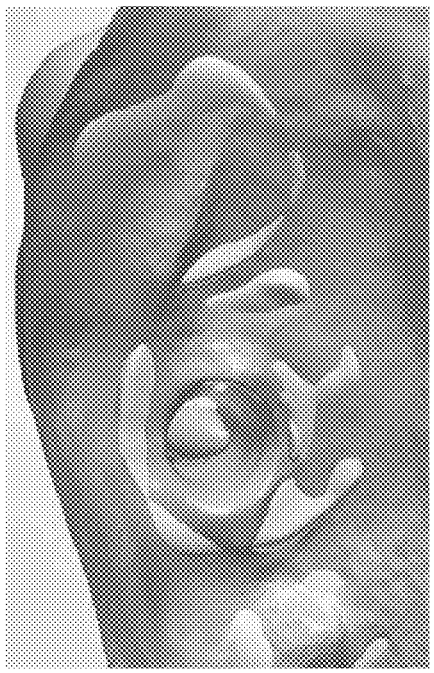
Figure 46C:

FIGS. 46B and 46C show bottom views of a portion of the 3D model of the dental bridge 100 of FIG. 46A, wherein a base or gingival portion of at least some of the teeth portions 112 has been reduced in size/height and/or the shape has been altered to lessen any protrusion through the gums of the replacement arch UJ. A computer-aided design tool, such as a brush tool, a digging tool, a spray can tool, etc., may be used to shrink/diminish/excavate/etc., the gingival section of the teeth portions 112 protruding through the gums.

Generally, the gingival section of the teeth portions 112 is tailored such that only a small area protrudes through the gums. As discussed above with respect to FIG. 16, the ovate pontic shape/contour of the gingival side of bridge 100 defines a gingival interface that is configured to slightly overlap with or penetrate with the gingival surface of the gum G such that the gums generally conform to the shape of the tooth portion. Such overlap ensures a tight fit, with substantially no gap defined between the ovate pontic gingival interface of the dental bridge 100 and the gum G. As can be appreciated, any gaps or irregular surfaces would be difficult to clean. At the same time, penetration of the teeth portions 112 with the gums is minimized to avoid causing discomfort to the patient.

As a first step shown in FIG. 46B, large portions of the protruding teeth portions 112 may be reduced using a computer-aided tool designed to alter larger surface areas of the model, such as a morphing or excavation tool. As can be seen by comparing the 3D models shown in FIGS. 46A and 46B, less gingival sections of the teeth portions 112 protrude through the gums.

As a second step shown in FIG. 46C, smaller/fine portions of the protruding teeth portions 112 may be reduced using a computer-aided tool designed to alter smaller surface areas of the model, such as a brush or spray can tool. As can be seen by comparing the 3D models shown in FIGS. 46B and 46C, even less gingival sections of the teeth portions 112 protrude through the gums. Generally, the dental bridge 100 is designed such that a small portion of the gingival section of each tooth portion 112 protrudes through the gum tissue to ensure the slight overlap with or penetration with the gingival surface of the gum G. For instance, as shown in FIG. 46C, small/thin areas extend around the opening defining the post-extraction root socket to define a slight overlap of the tooth portion with the gums when the dental bridge 100 is mated with the gums.

Figure 47:

FIG. 47 shows a bottom view of a portion of a 3D model of the replacement arch UJ, wherein an area of the gums surrounding a scan body is designed such that substantially no tooth portion of the dental bridge 100 protrudes through the gums in the area surrounding the scan body. As noted above with reference to FIG. 16, the abutment skirt 134 of an abutment 140 is configured to rest against the flared gingival opening 148 of the abutment hole 130 in the dental bridge 100, with the abutment body 132 extending into the abutment hole 130. If a tooth portion of the dental bridge 100 penetrated into the gums surrounding the implant, the penetrating tooth portion might prevent the abutment skirt 134 from engaging the implant collar.

In that regard, the area surrounding the scan bodies, which are used to define the abutment holes in the dental bridge 100 (wherein margin lines ML drawn around a base SBB of the scan bodies SB may define the flared gingival opening 148 for accepting the abutment skirt 134) may be cleared from penetration of any teeth portions 112 of the dental bridge 100, as shown in FIG. 47. Computer-aided tools may be used to substantially eliminate all protruding gingival sections of the teeth portions 112 surrounding the scan bodies, such as a brush tool, a digging tool, etc. With the area surrounding the scan bodies (and therefore, the area surrounding the abutment holes and implants) free from tooth portion penetration into the gums, the abutment skirt 134 of the abutment 140 can engage the collar of the implant (see FIG. 10B).

Figure 48A:
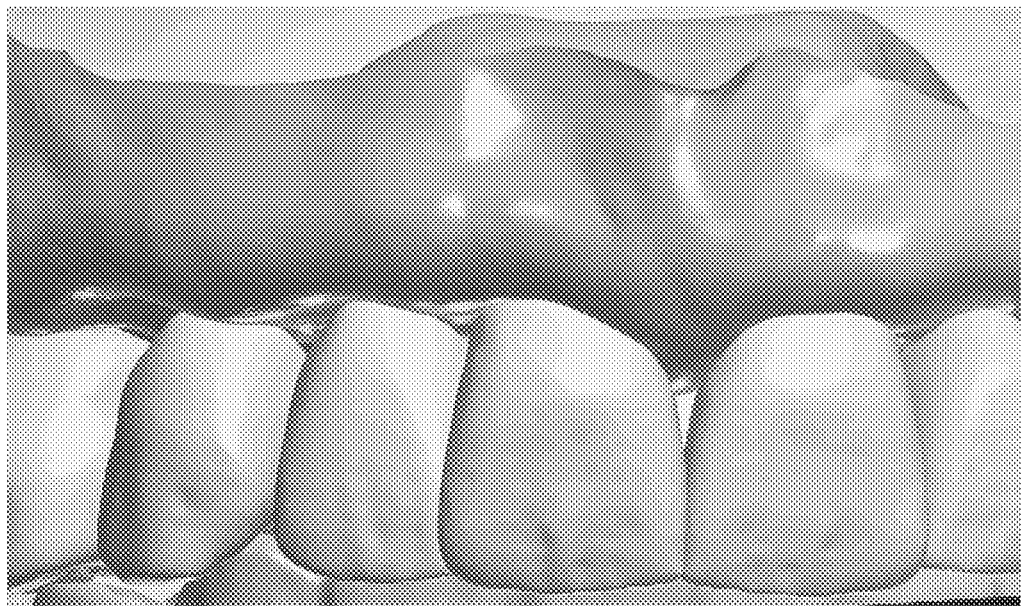

It can be appreciated that when the gingival sections of the teeth portions 112 are reduced in size/excavated near the gum interface to optimize penetration of the teeth portions with the gums, further adjustments may be necessary to ensure proper seating of the teeth portions 112 with the gums and aesthetically pleasing interface of the teeth portions 112 with the gums. As an example, FIG. 48A shows a front view of a portion of a 3D model of the replacement arch UJ, wherein the front/first incisor tooth portion is not extending all the way into proper seating with the gums. In that regard, the front/first incisor tooth portion may be increased in size/height in its gingival section, such as with a computer-aided enlargement tool.

Figure 48B:
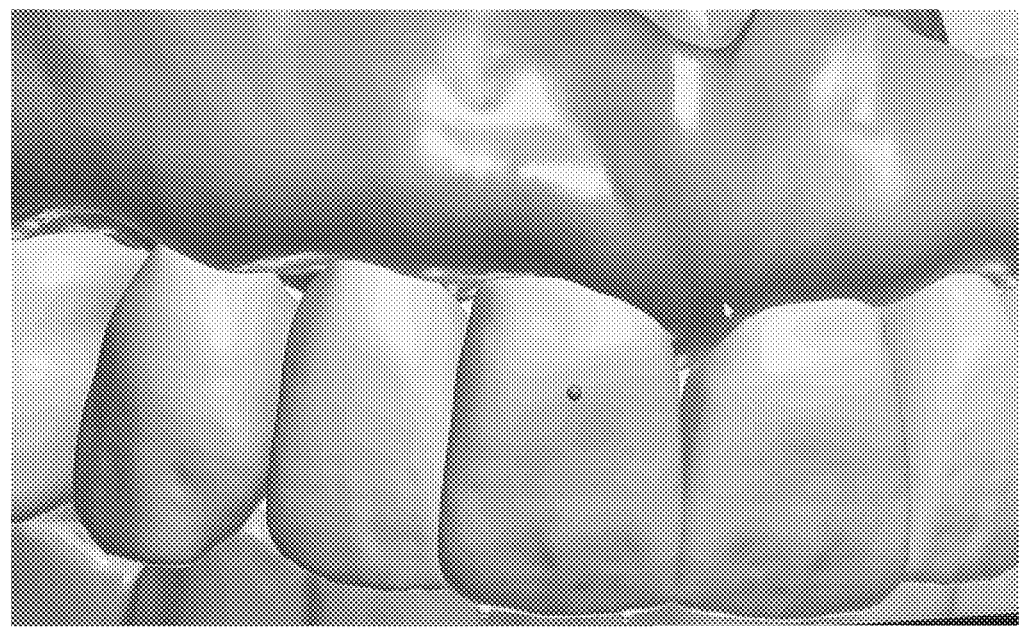

FIG. 48B shows a front view of a portion of the 3D model of the replacement arch UJ of FIG. 48A, wherein an adjustment has been made to increase the height of the front/first incisor tooth portion. As can be seen, the front/first incisor tooth portion now extends substantially all the way into engagement with the gums and defines an aesthetically pleasing interface with the gums.

Increasing the height of the front/first incisor tooth portion may cause the tooth portion to overly protrude into the gums. In that regard, as a further step, it may be beneficial to check whether further adjustments are needed to ensure proper penetration of the teeth portions 112 with the gums.

Figure 49A:
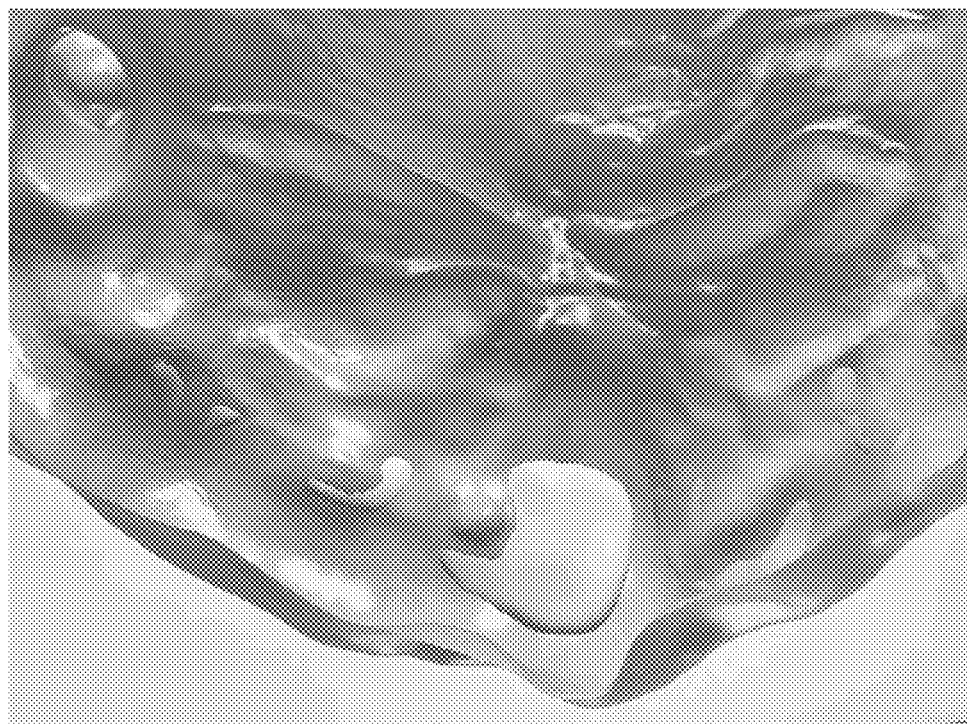
Figure 49B:
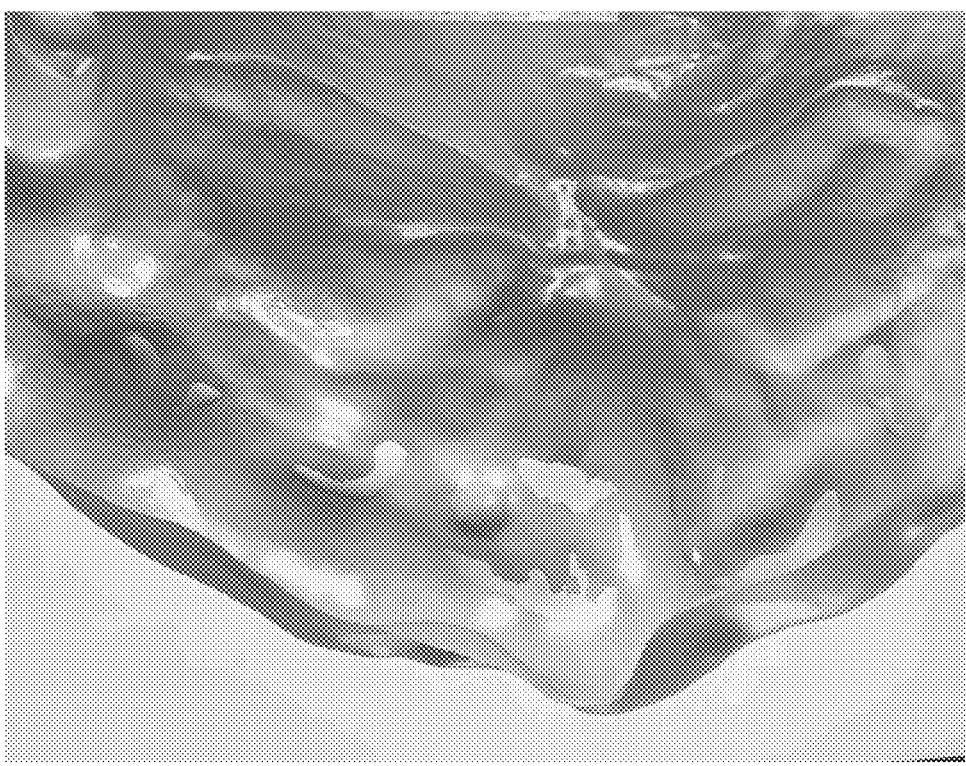

FIG. 49A shows a bottom view of a portion of a 3D model of the replacement arch UJ after adjustments have been made to increase the height of the front/first incisor tooth portion such that it extends substantially all the way into engagement with the gums, as described above with reference to FIG. 48B. As can be seen in FIG. 49A, a large area of the front/first incisor tooth portion penetrates the gums. As noted above, it is preferred that only a small amount of the gingival section of the teeth portions 112 penetrates the gums around the post-extraction root socket to avoid discomfort for the patient. In that regard, large and small portions of the gingival sections of the protruding teeth portions 112 may be reduced using computer-aided tools, such as a morphing tool, excavation tool, a brush or spray can tool, etc., as described above with respect to FIGS. 46A-46C. FIG. 49B shows a bottom view of a portion of the 3D model of the replacement arch UJ of FIG. 49A after large and small portions of the gingival sections of the protruding teeth portions 112 have been reduced.

After the large and small portions of the gingival sections of the protruding teeth portions 112 have been reduced to adjust the penetration level of the tooth portion(s), as shown in FIG. 49B, engagement/seating of the tooth portion with the gums may be re-checked and further adjusted as needed to ensure that no gap is present between the gingival section and the gums and that the interface of the teeth portions 112 with the gums is aesthetically pleasing, such in a manner similar to that described above with reference to FIGS. 48A-48B. Penetration of the teeth portions 112 with the gums may thereafter again be checked and further adjusted as needed. In that regard, optimization of the interface between the gingival section of each tooth portion with the gums of the replacement arch UJ may include performing an iterative process of adjusting the size and shape of the gingival sections of the teeth portions 112 to ensure proper seating and penetration. Special care and/or more iterations may be performed for the teeth portions that are visible when a patient smiles, such as for the incisors.

Figure 50A:
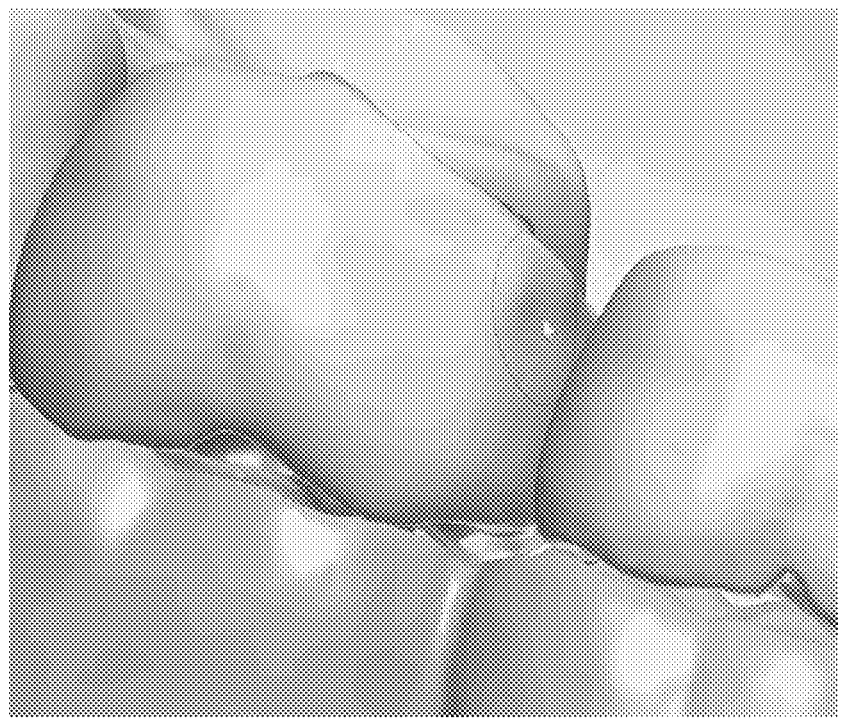
Figure 50B:
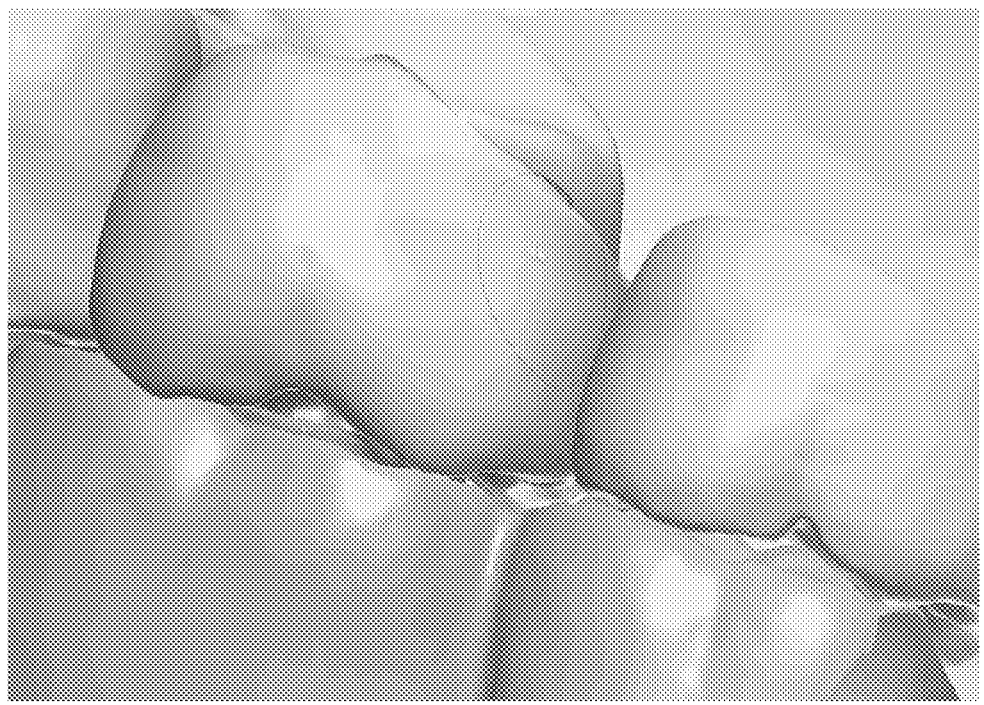

FIG. 50A shows a buccal view of a portion of a 3D model of the replacement arch UJ, wherein a molar tooth portion is shown having an irregular/unsmooth area in its incisal/occlusal section. Generally, it is preferred that buccal, lingual, mesial, and distal surfaces of the teeth portions 112 have minimal to no irregular/unsmooth areas. In that regard, a computer-aided tool, such as a smoothing tool, morphing tool, spray can tool, brush tool, etc., may be used to smooth or even out protruding areas of a tooth portion, such as by reducing in size protruding areas of a tooth portion, adding material to recessed areas, smoothing out rough areas, etc. FIG. 50B shows a buccal view of a portion of a 3D model of the replacement arch UJ of FIG. 50A, wherein the irregular/unsmooth area in the incisal/occlusal section of the molar tooth portion has been smoothed out/reduced, such as using a computer-aided smoothing tool, morphing tool, etc.

Figure 51A:
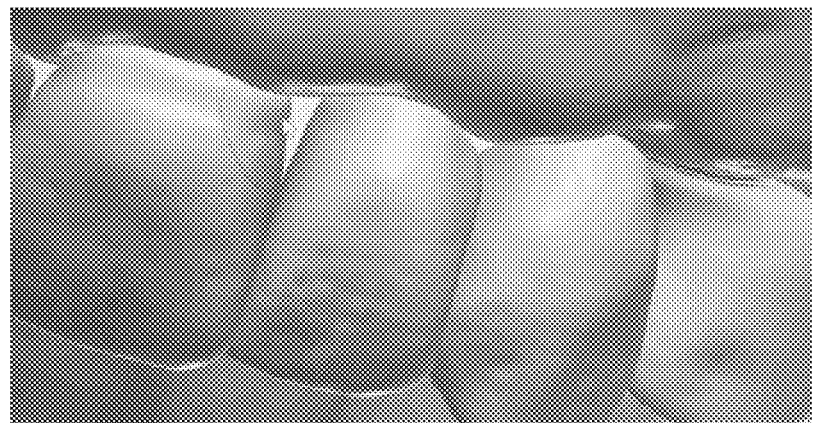

FIG. 51A shows a buccal view of a portion of a 3D model of the replacement arch UJ, wherein a gap is defined between the first and second incisor tooth portions in the gingival sections of the tooth portions. A gap between the gingival sections of the tooth portions can be a trap for food and other debris. Such a gap can also increase the susceptibility of breakage in that area, both during milling of the dental bridge 100 and when in use in a patient's mouth. In that regard, a computer-aided tool, such as a morphing tool, spray can tool, etc., may be used to add material to the teeth portions 112, enlarge the tooth portions, alter the shape of the teeth portions, etc., to decrease or substantially eliminate any gaps.

Figure 51B:
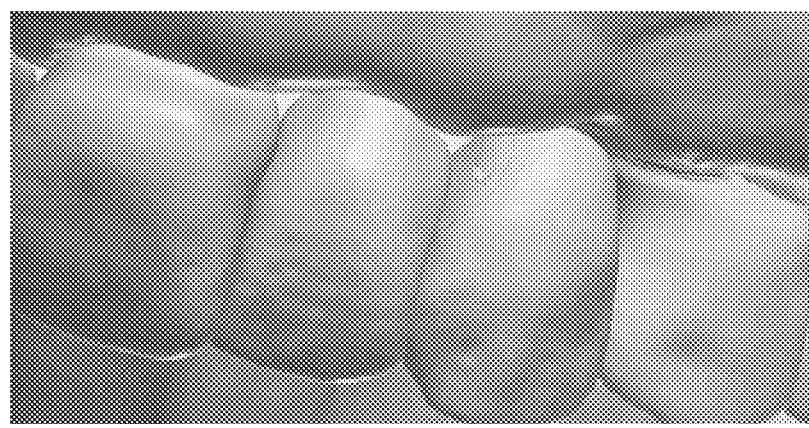
Figure 51C:
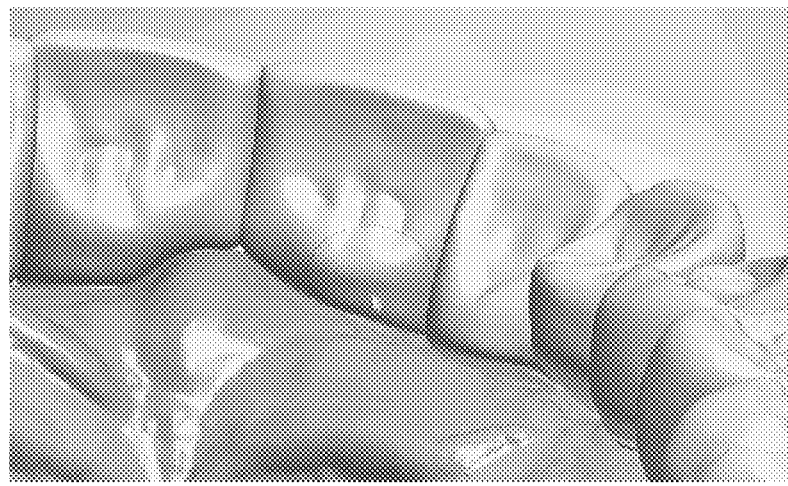

FIG. 51B shows a buccal view of a portion of a 3D model of the replacement arch UJ of FIG. 51A, wherein the gap between the gingival and middle sections of the first and second incisor tooth portions has been reduced, such as using a computer-aided enlarging tool, spray can tool, etc. FIG. 51C shows a lingual view of a portion of a 3D model of the replacement arch UJ of FIG. 51A, wherein a gap between the gingival and middle sections of the first and second incisor tooth portions has been further reduced, such as using a computer-aided enlarging tool, spray can tool, etc. In that regard, it may be beneficial to view the 3D model from various views and/or angles when reshaping/resizing/relocating the teeth portions 112, both to aid in adjusting/designing/customizing the teeth portions with the various computer-aided design tools and to check the bridge for proper design (e.g., proper mating of the teeth portions 112 with the gums, aesthetic appearance, secure connections between teeth portions, etc.).

Figure 52A:
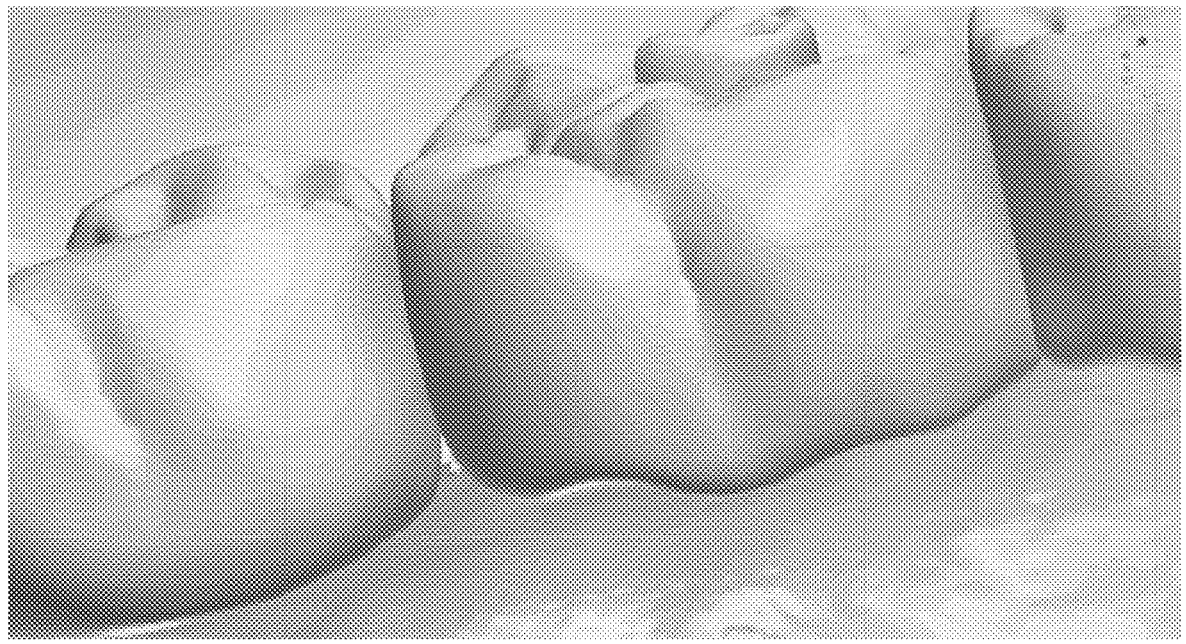

FIG. 52A shows a lingual view of a portion of a 3D model of the replacement arch UJ, wherein a gap is defined between molar tooth portions in the gingival sections of the tooth portions. A gap is also defined between the gingival section of a molar tooth portion and the gums. In that regard, a computer-aided tool, such as a morphing tool, spray can tool, etc., may be used to add material to the teeth portions 112, enlarge the tooth portions, alter the shape of the teeth portions, etc., to decrease or substantially eliminate any gaps between adjacent tooth portions and/or between a tooth portion and the gums.

Figure 52B:
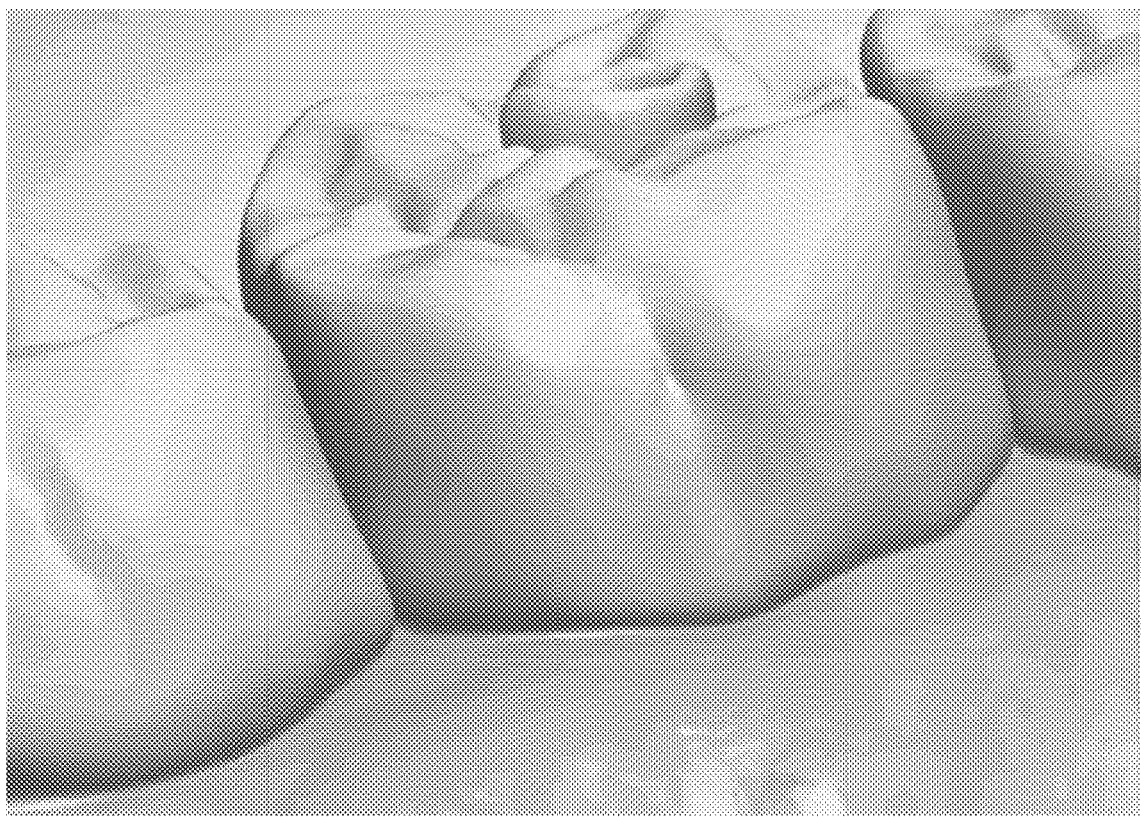

FIG. 52B shows a lingual view of a portion of a 3D model of the replacement arch UJ of FIG. 52A, wherein the gap between molar tooth portions has been reduced, such as using a computer-aided enlarging tool, spray can tool, etc. Further, the gap between the gingival section of a molar tooth portion and the gums has also been reduced, such as using a computer-aided enlarging tool, spray can tool, etc. As noted above, when a tooth portion is adjusted in its position, shape, or size relative to the gums, it may be beneficial to view the 3D model from the bottom to ensure that only a desired portion of the tooth portion penetrates the gums (see FIGS. 49A and 49B, wherein the tooth portion is further adjusted to decrease the size/area of the penetration into the gums).

Figure 53A:
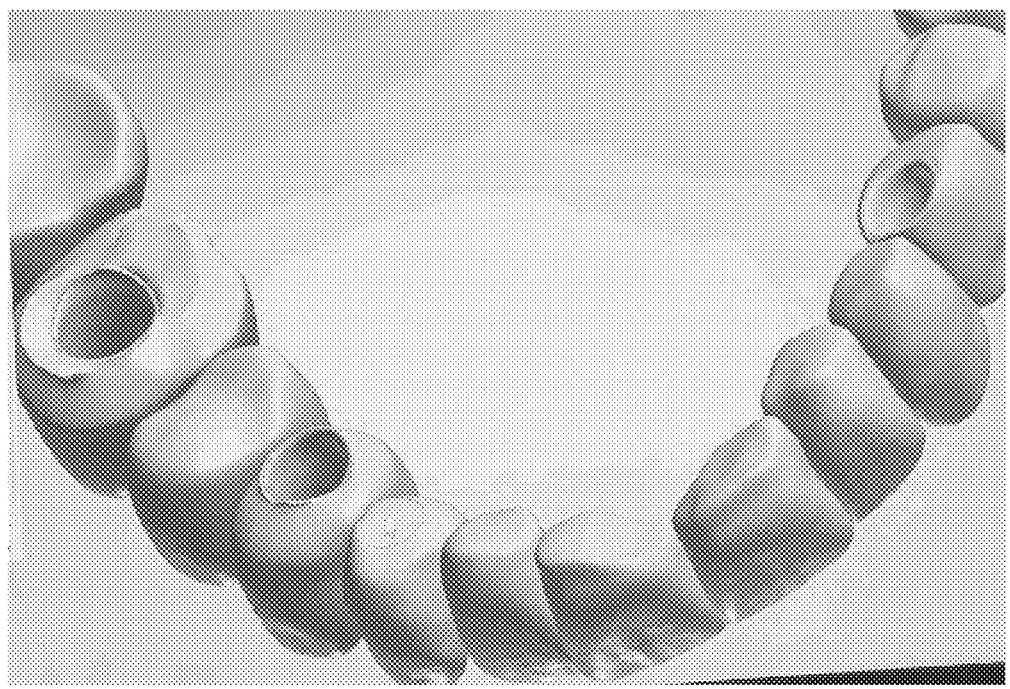

FIG. 53A shows a bottom isometric view of a portion of a 3D model of the replacement arch UJ, wherein a pre-finalization step of the dental bridge design has been performed, such as a step for checking or reviewing the design before it is finalized for fabrication. A pre-finalization step may include a "connection to margin line" step, where the bridge design engine 1814 of the interface(s) 1806 may clean up distorted areas, excess material, etc., of a tooth portion. When connecting to the margin lines, distortions or other issues with the teeth portions 112 of the bridge design may result.

For instance, as shown in FIG. 53A, a flange was created on the gingival side of the second molar tooth portion around the scan body defining an abutment hole during a pre-finalization step. Such a flange is obviously undesirable as it would cause tissue irritation with the gums and prevent proper seating of the second molar tooth portion with the gums. Although such a flange could be removed after fabrication of the bridge (such as with a grinding tool), it is most efficient to remove any irregular/unsmooth areas of a tooth portion before fabrication.

Figure 53B:
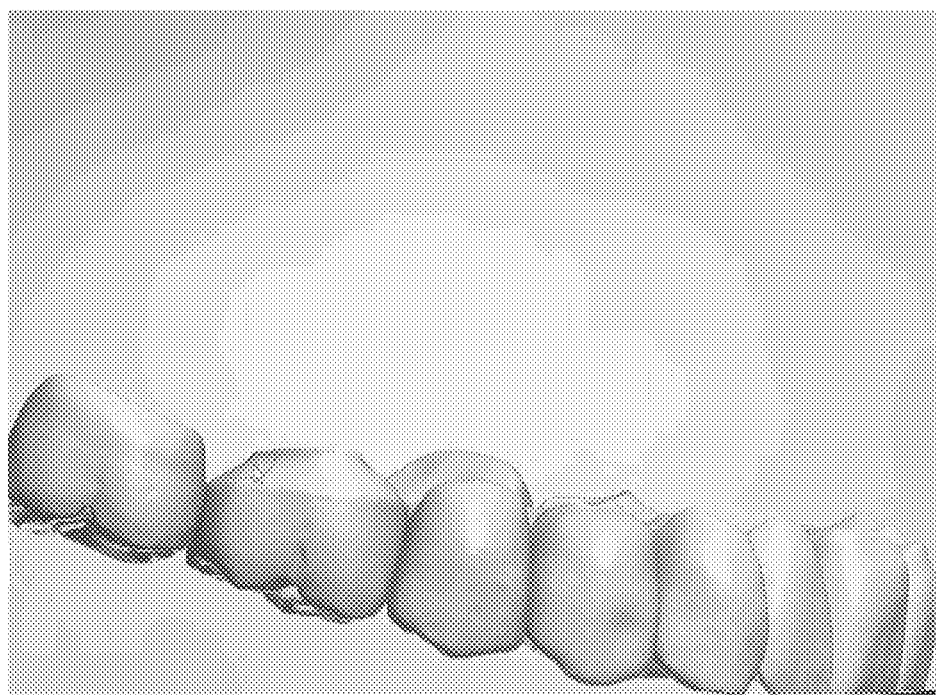

FIG. 53B shows a buccal view of a portion of a 3D model of the replacement arch UJ of FIG. 53A, wherein a portion of the flange on the gingival and buccal side of the second molar tooth portion has been reduced or otherwise eliminated, such as using a computer-aided smoothing tool, morphing tool, etc. For instance, a computer-aided smoothing tool may be used on a strong or aggressive setting to remove large portions of the flange, and then the tool may be adjusted to a finer setting to smooth out or further refine the area that included the flange.

Figure 54A:
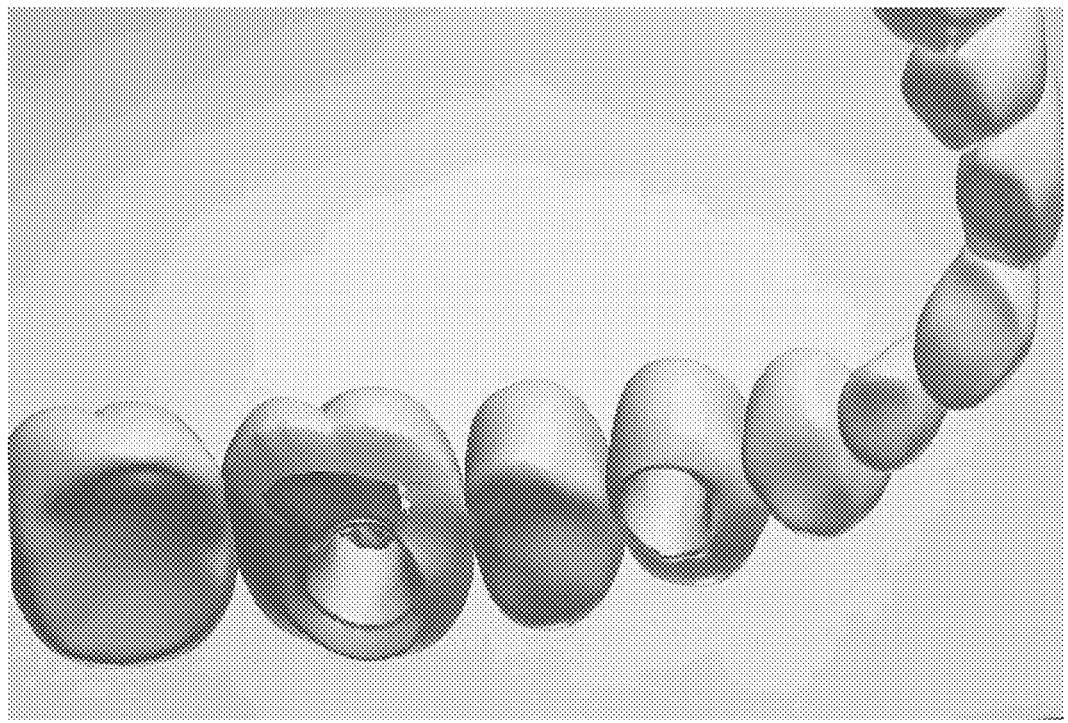
Figure 54B:
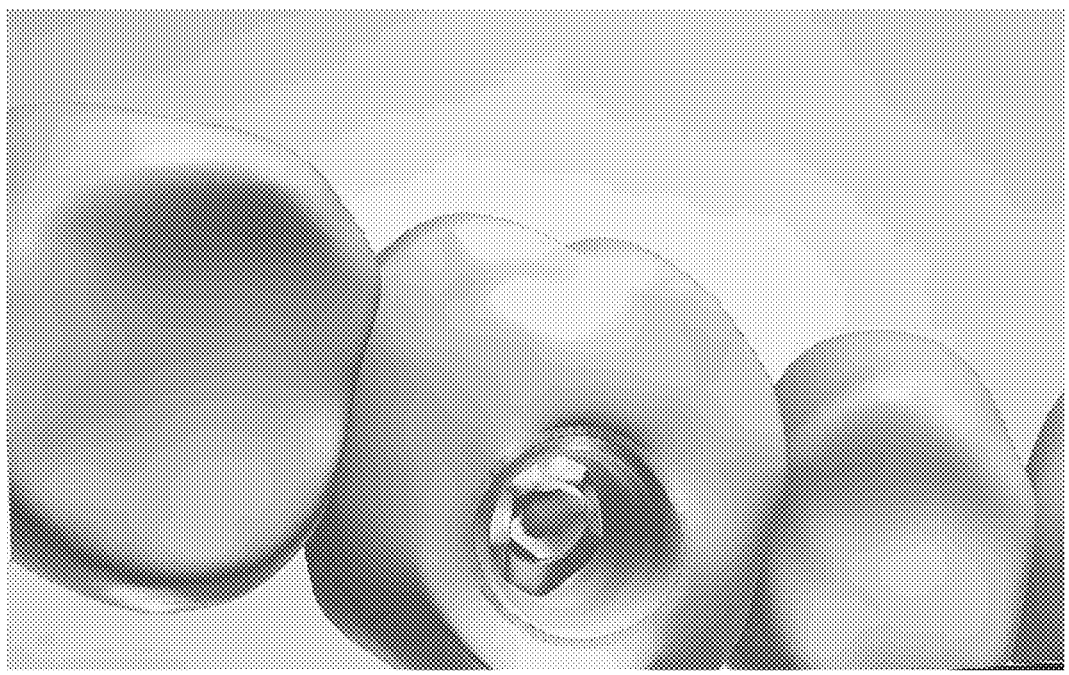

FIG. 54A shows a top view of a portion of a 3D model of the replacement arch UJ of FIG. 53A, wherein a portion of the flange on the gingival and lingual side of the second molar tooth portion is being reduced or otherwise eliminated, such as using a computer-aided smoothing tool, morphing tool, etc. For instance, a computer-aided smoothing tool may be used on a strong or aggressive setting to remove large portions of the flange, and then the tool may be adjusted to a finer setting to smooth out or further refine the area that included the flange. FIG. 54B shows a top view of a portion of a 3D model of the replacement arch UJ of FIG. 54A after removal of the portion of the flange on the gingival and lingual side of the second molar tooth portion.

Other aspects of the dental bridge 100 may also be reviewed and adjusted as necessary after a pre-finalization step of the dental bridge design has been performed. For instance, any gaps between adjacent tooth portions may be reduced or otherwise eliminated to minimize any traps for food and other debris and/or the susceptibility of breakage in that area. Similarly, any gaps between a tooth portion and the gums may be reduced or otherwise eliminated to minimize any traps for food and other debris and/or the susceptibility of breakage in that area. In that regard, a computer-aided tool, such as a morphing tool, spray can tool, etc., may be used to add material to the teeth portions 112, enlarge the tooth portions, alter the shape of the teeth portions, etc., to decrease or substantially eliminate any gaps. Of course, a further step of viewing the 3D model from the bottom to ensure that only a desired portion of the tooth portion penetrates the gums may be performed (see FIGS. 49A and 49B, wherein the tooth portion is further adjusted to decrease the size/area of the penetration into the gums). Other aspects of the dental bridge 100 may also be reviewed and adjusted as necessary after a pre-finalization step, such as irregular surfaces, aesthetics, etc.

Figure 55A:
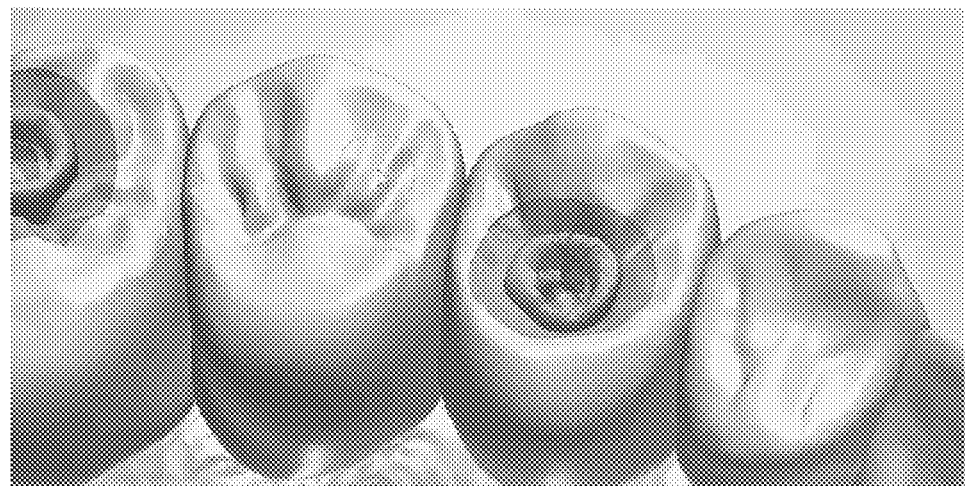

FIG. 55A shows a top view of a portion of a 3D model of the replacement arch UJ, wherein a pre-finalization step of the dental bridge design has been performed that includes a "minimum thickness" check. For instance, the bridge design engine 1814 of the interface(s) 1806 may analyze a thickness of teeth portions 112 surrounding the scan bodies/abutment holes to ensure sufficient tooth portion support for the abutment holes 130. For instance, the bridge design engine 1814 may check whether each tooth portion 112 has a minimum thickness of surrounding each abutment hole 130, such as 2 mm.

Figure 55B:
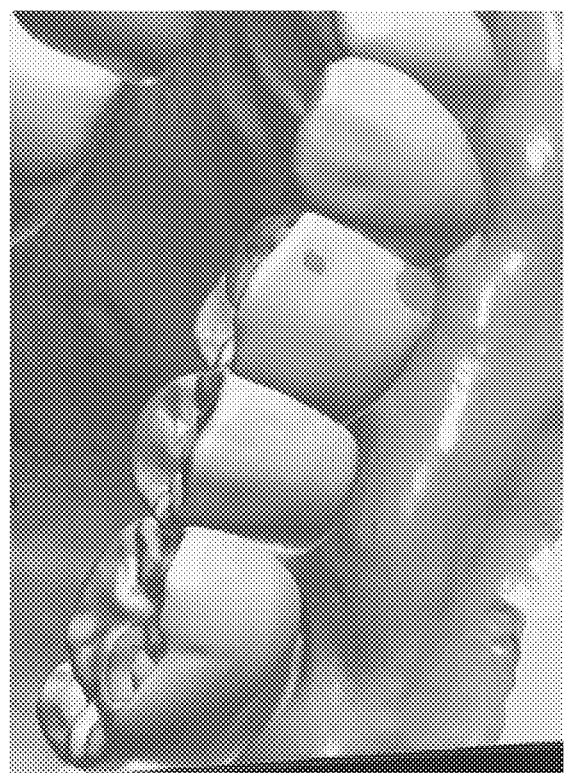

In some examples, the bridge design engine 1814 may indicate a minimum thickness of teeth portions 112 surrounding the scan bodies/abutment holes. In some examples, the bridge design engine 1814 may indicate if an area has less than the minimum required thickness. For example, FIG. 55B shows a buccal view of a portion of a 3D model of the replacement arch UJ, wherein two areas of a first molar are shown as being less than a required minimum thickness. Such areas are shown in FIG. 55B as being a different color, although any other suitable indication may be used. In any event, steps may be taken to increase any necessary areas of the teeth portions 112, such as with a computer-aided enlarging tool.

Other aspects of the dental bridge 100 may also be reviewed and adjusted as necessary after a finalization step of the dental bridge design has been performed. For instance, any gaps, irregularities, aesthetic issues, etc., may be fixed as needed. In some aspects, a finalization step may include reviewing any errors produced from a final automatic review of the design by the bridge design engine 1814, such as a review of margin lines, minimum thickness, etc. In some aspects, if errors are generated because the bridge design engine 1814 is intended for use in designing other dental devices (such as dentures, single crowns, or partial bridges), errors regarding teeth overlap/connection, openings or through-holes defined by scan bodies extending through teeth portions, etc., may be reviewed and ignored/accepted assuming that such an error is expected for the dental bridge design. After "finalization" of the dental bridge design, the dental bridge 100 may be ready for fabrication.

The steps and techniques described above may be carried out manually, at least in part, by a user interacting with one or more software modules of a computing device (e.g., the scanner computing device 1716 and the design computing device 1706). In other examples, many of the steps and techniques described above may be carried out automatically with artificial intelligence, such as by executing one or more machine learning models on a computing device (e.g., the scanner computing device 1716, the design computing device 1706, and/or a computing device in communication therewith).

For instance, one or more machine learning models may be used to design/customize various aspects of the dental bridge 100 using various information regarding the patient and dental bridge parameters as input. In that regard, exemplary methods of training and using one or more machine learning models for designing a custom dental bridge will now be described with reference to FIGS. 56 and 57.

Figure 56:
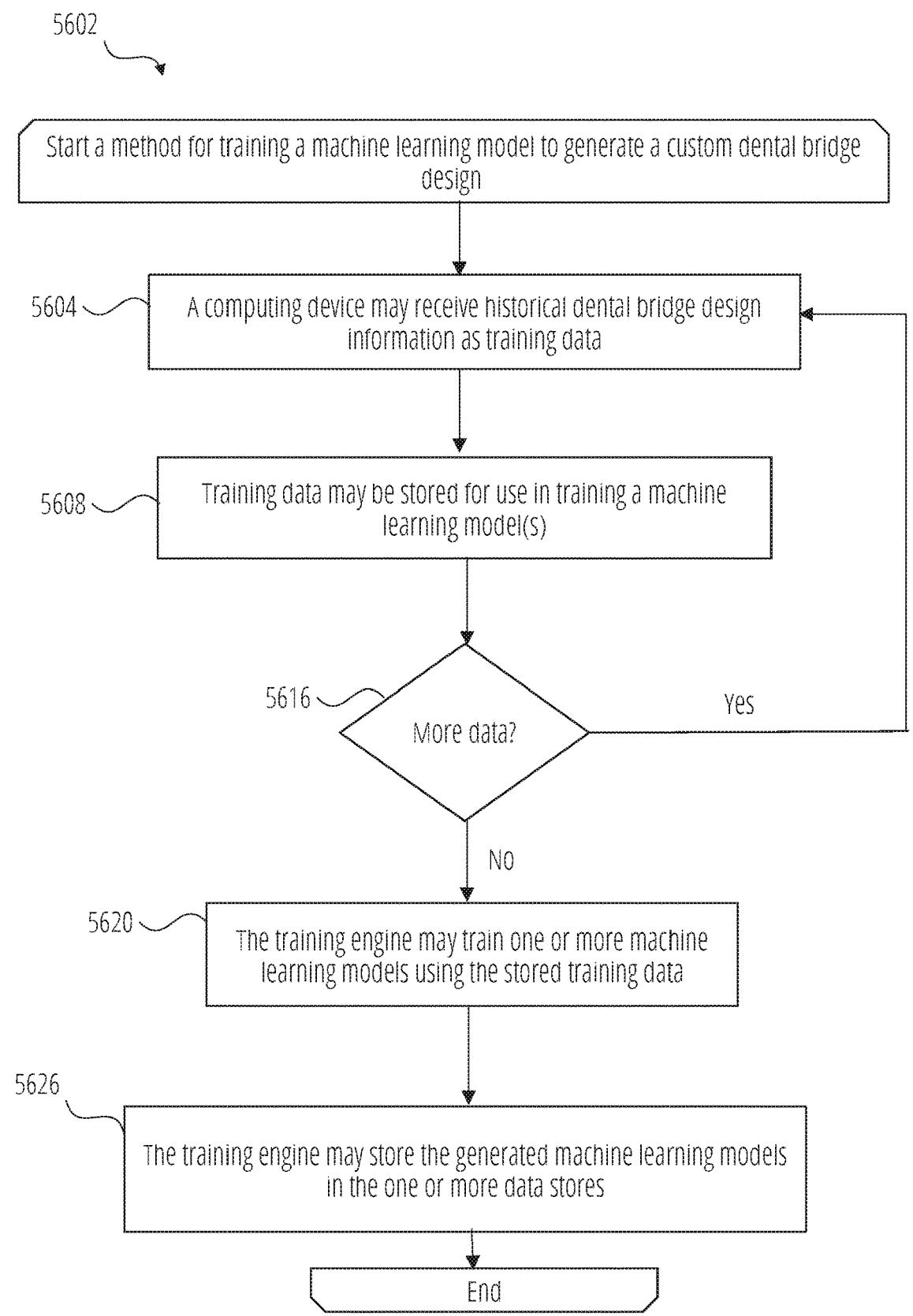
FIG. 56 is a flowchart that illustrates an exemplary method of training at least one machine learning model to generate a custom dental bridge design.

FIG. 56 is a flowchart that illustrates an exemplary method 5602 of training at least one machine learning model to produce a custom dental bridge design, such as by generating a model of a teeth-only, gingiva-free dental restoration device for a replacement arch of a patient. The method 5602 may be carried out at least in part by one or more of the scanning data processing engine 1810, the model generation engine 1812, and the bridge design engine 1814 of the design computing device 1706, and/or any other engine of a computing device in communication with the design computing device 1706. In the method 300, a set of training data is collected, and a computing device uses the training data to generate one or more machine learning models that can then be used to generate a model of a teeth-only, gingiva-free dental restoration device for a replacement arch of a patient.

From a start block, the method 5602 may proceed to block 5604, where a computing device (such as a data collection engine of the design computing device 1706) may receive historical dental bridge design information or models of teeth-only, gingiva-free dental restoration devices for replacement arches of patients as training data. For instance, models of teeth-only, gingiva-free dental restoration devices for replacement arches of patients that were created by a user, such as by interacting with a design interface presented by the bridge design engine 1814 using one or more of the techniques described above with respect to FIGS. 20-55 or any other suitable techniques, may be used.

In that regard, the historical dental bridge design information may include models of teeth-only, gingiva-free dental restoration devices and at least one of corresponding scan data of an antagonist arch, corresponding scan data of a replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetics requirements, and corresponding bridge material.

At block 5608, the training data may be stored for use in training a machine learning model(s). For instance, a data collection engine may transmit the training data to a training engine, which may store the training data in the one or more data stores 1818, such as in a training data store.

At decision block 5616, a determination is made regarding whether more training data is to be collected. This determination may be based on a predetermined threshold amount of training data that is considered by an administrator to be enough for training the machine learning model. If it is determined that more training data is to be collected, then the result of decision block 5616 is YES, and the method 5602 returns to block 5606 to collect more training data. Otherwise, if enough training data has been collected, then the result of decision block 5616 is NO.

At block 5620, the training engine may train one or more machine learning models using the stored training data, such as the training data stored in the training data store. The one or more machine learning models may be trained to generate a model of a teeth-only, gingiva-free dental restoration device for a replacement arch of a patient as output using, for instance, information pertaining to the patient and/or dental bridge design requirements as input.

In some examples, the machine learning models may be neural networks, including but not limited to feedforward neural networks, convolutional neural networks, and recurrent neural networks. In some examples, any suitable training technique may be used, including but not limited to gradient descent (including but not limited to stochastic, batch, and mini-batch gradient descent).

At block 5626, the training engine may store the generated machine learning models in the one or more data stores 1818, such as in a model data store.

Figure 57:
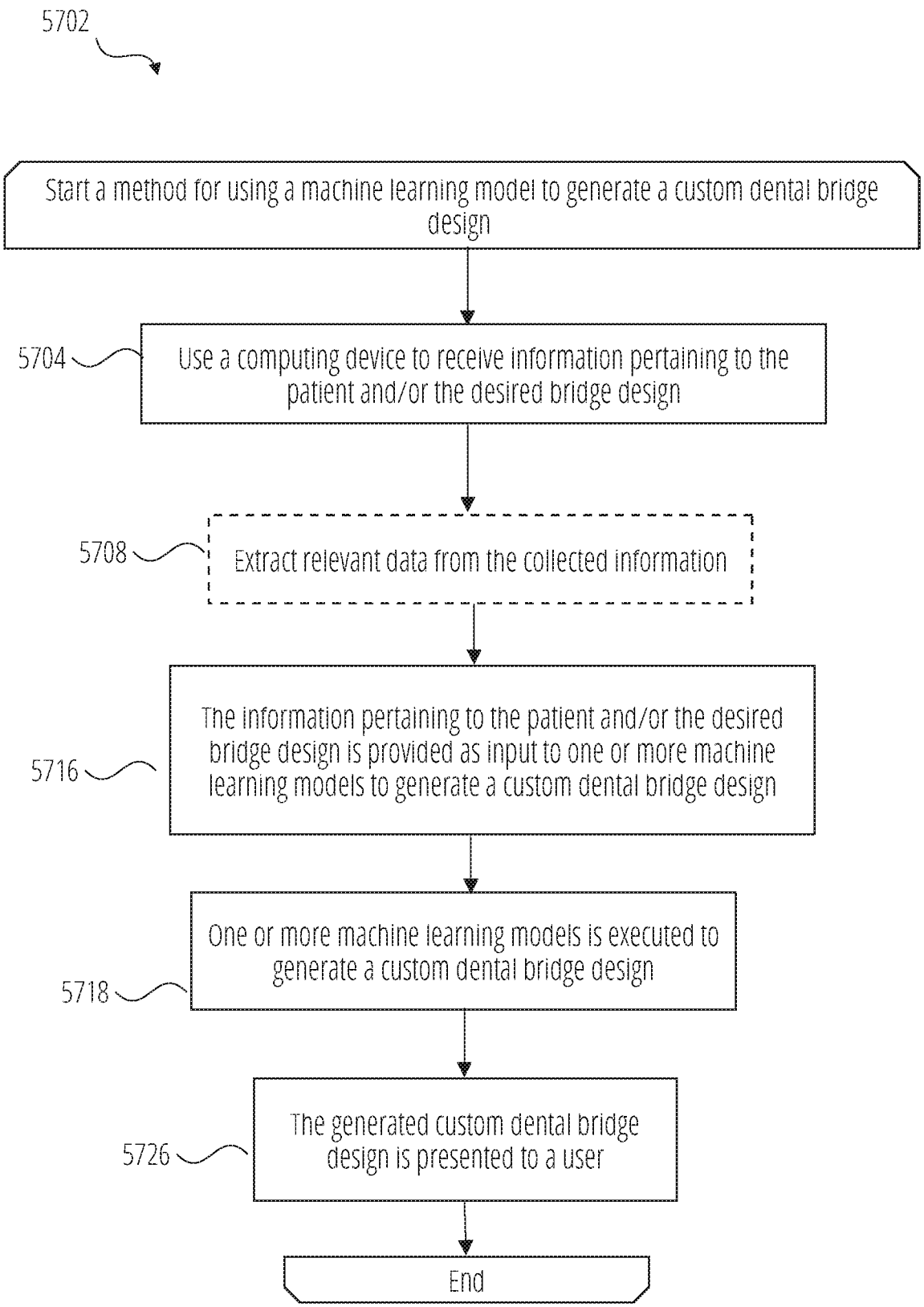
FIG. 57 is a flowchart that illustrates an exemplary method of using at least one machine learning model to generate a custom dental bridge design.

FIG. 57 is a flowchart that illustrates an exemplary method 5702 of using at least one machine learning model to generate a custom dental bridge design, such as a model of a teeth-only, gingiva-free dental restoration device for a replacement arch of a patient. In some examples, the method 5702 includes using one or more machine learning models stored in the model data store to process a dental bridge design request to generate a custom dental bridge design. The method 5702 may be carried out at least in part by one or more of the scanning data processing engine 1810, the model generation engine 1812 and the bridge design engine 1814 of the design computing device 1706, and/or any other engine of a computing device in communication with the design computing device 1706.

From a start block, the method 5702 may proceed to block 5704, where a computing device (such as the design computing device 1706) may receive or collect at least one input regarding dental restoration for the replacement arch of a patient, such as information pertaining to the patient and/or dental bridge design requirements. Information pertaining to the patient may include, for instance, at least one of scan data of the antagonist arch, scan data of the replacement arch before extraction, scan data of the replacement arch after extraction and before implant placement, scan data of the replacement arch after extraction and after implant placement, etc. Dental bridge design requirements may include, for instance, implant specifications, abutment specifications, required crown tooth portion size surrounding an abutment hole, desired aesthetics, chosen bridge material, etc.

At block 5708, a computing device (such as the design computing device 1706) may optionally be used to extract or otherwise process relevant data from the received/collected information pertaining to the patient and/or dental bridge design requirements. For instance, a root socket axis and/or an implant axis may be extracted/determined from scan data of the replacement arch. As another example, an incisal/occlusal biting plane of the dental bridge may be defined based on scan data of the antagonist arch. As another example, an abutment body diameter may be determined based on the known abutment specifications.

At block 5716, the information pertaining to the patient and/or the desired bridge design, and/or any data extracted therefrom, may be provided as input to one or more machine learning models to generate a custom dental bridge design. In that regard, at block 5718, one or more machine learning models may be retrieved/executed to generate a custom dental bridge design.

At block 5726, the generated custom dental bridge design may be presented to a user. The generated custom dental bridge design may be presented to a user for further adjustments, modifications, customization, etc. For instance, a user may make adjustments, modifications, customizations, etc., to a machine learning model generated custom dental bridge design through a design interface presented by the bridge design engine 1814 using one or more of the techniques described above with respect to FIGS. 20-55 or any other suitable techniques.

Referring back to FIG. 20, when the design of the dental bridge 100 is complete/finalized/ready for fabrication, the method 2002 may proceed to block 2014, where a computing device (such as the design computing device 1706) may be used to output instructions for fabricating the teeth-only, gingiva-free, integrally formed dental restoration device or the dental bridge 100. In that regard, the method may include performing, such as with the fabrication instructions output engine 1816, at least one of retrieving, verifying, formatting, repackaging, compressing, encrypting, exporting, sending, etc., information regarding instructions for fabricating the designed dental bridge 100.

For instance, performing a verification of the design may include verifying the design is "finalized" or "designed", generating a 3D preview of the dental bridge 100, etc. Formatting and/or repackaging the information regarding instructions for fabrication may include generating cam output instructions, perhaps specific to a certain type of mill or for a certain process used. Compressing and/or encrypting the information regarding instructions for fabrication may include performing any necessary steps for sending the information to a fabrication facility, such as a third-party facility specifically designed to fabricate dental devices. Of course, any necessary or beneficial steps for outputting the information regarding instructions for fabrication may be performed by the fabrication instructions output engine 1816 of the design computing device 1706 and/or another computing device.

After any necessary retrieving, verifying, formatting, repackaging, compressing, encrypting, etc., of the information regarding instructions for fabricating the designed dental bridge 100, the fabrication instructions output engine 1816 may send the information regarding fabrication instructions to a mill computing device 1710 of the fabrication assembly 1708. The mill computing device 1710 may include suitable software modules for importing, receiving, processing, and outputting fabrication instructions to a mill 1712 of the fabrication assembly 1708 for fabricating the dental bridge 100.

In some examples, a commercially available dental restoration device fabrication platform may be used for at least one of importing, receiving, processing, and carrying out the fabrication instructions for fabricating the dental bridge 100. For instance, ivoclar Digital® from Ivoclar Vivadent Inc. of Amherst, NY, may be used.

In any event, the mill computing device 1710 may first be used to import or receive fabrication instructions from the fabrication instructions output engine 1816 and perform any necessary processing of the information for generating and/or carrying out fabrication instructions. After obtaining and performing any necessary processing of the information, a module on the mill computing device 1710 may be used to select one or more milling options for the dental bridge 100, such as selecting the bridge material, defining a cut path for the mill in a disc of material, defining drill settings, etc.

FIGS. 58-62 each depict an exemplary GUI generated by a module(s) of the mill computing device 1710 that may be used for carrying out one or more aspects of the milling process. Each exemplary GUI of FIGS. 58-62 are provided for illustrating various fabrication steps that may be used, but other steps may additionally or instead be used to fabricate the dental bridge 100. Moreover, fabrication steps may occur in any order and are not limited to the sequence as shown. Finally, the fabrication steps may be carried out using any suitable software module(s).

Figure 58:
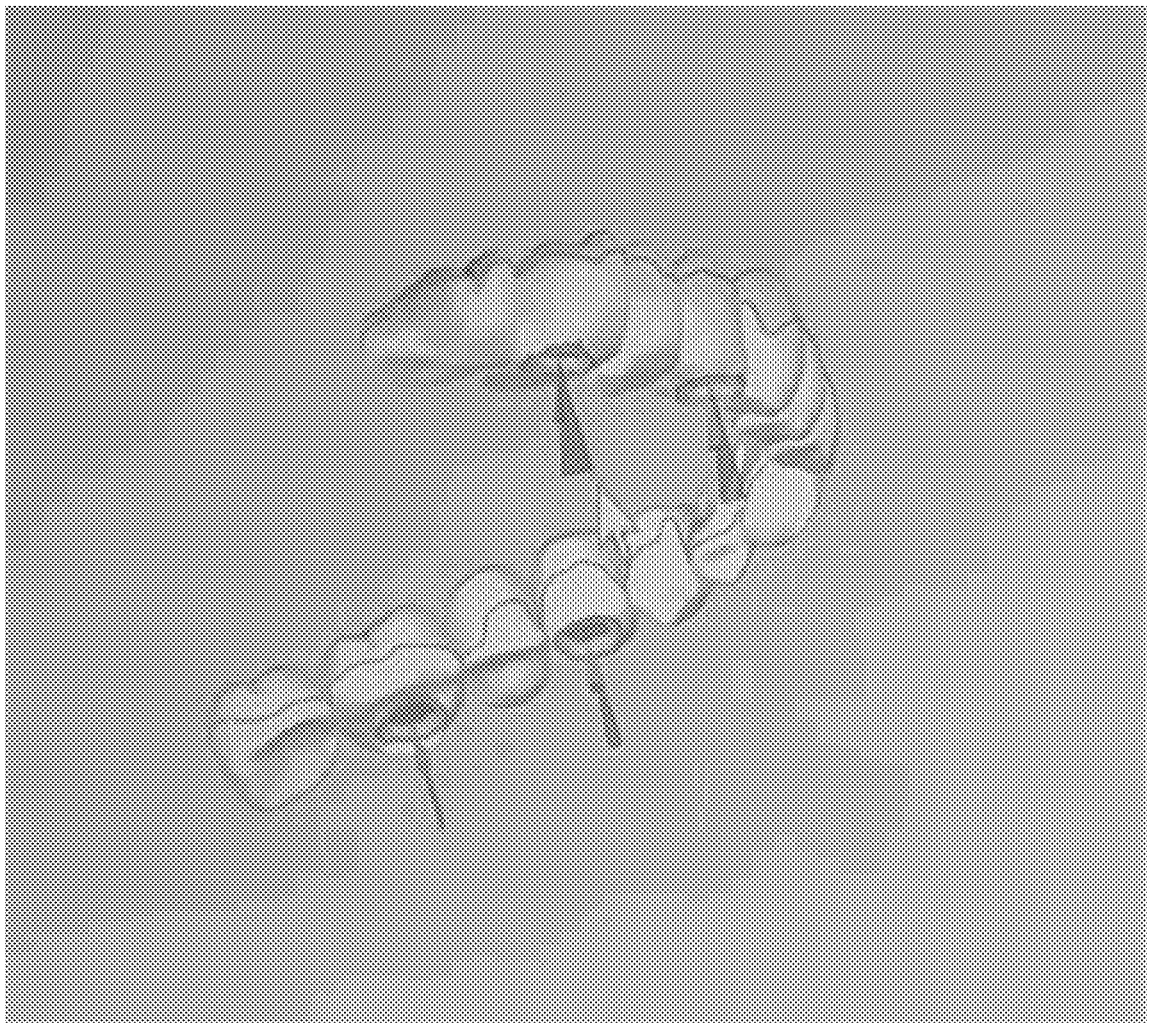
FIGS. 58-62 each depict an exemplary GUI generated by a computing device that may be used for carrying out one or more aspects of the milling process.

Referring to the exemplary GUI shown in FIG. 58, a user may interact with a module of the mill computing device 1710 to provide drilling instructions for the dental bridge 100. For instance, a user may interact with a module of the mill computing device 1710 to ensure that a drilling angle of each of the abutment holes 130 (as defined by the scan bodies) is within an acceptable range of the drill. As a non-limiting example, a drill may have a range between 0-10 degrees offset from vertical. In such an example, if the abutment holes 130 are at a 15-degree angle relative to vertical as the bridge is currently arranged in the disc, the drill would not be able to define the abutment holes as specified. Thus, the arrangement of the dental bridge 100 within the disc of material can be adjusted to accommodate the drill range.

Figure 59:
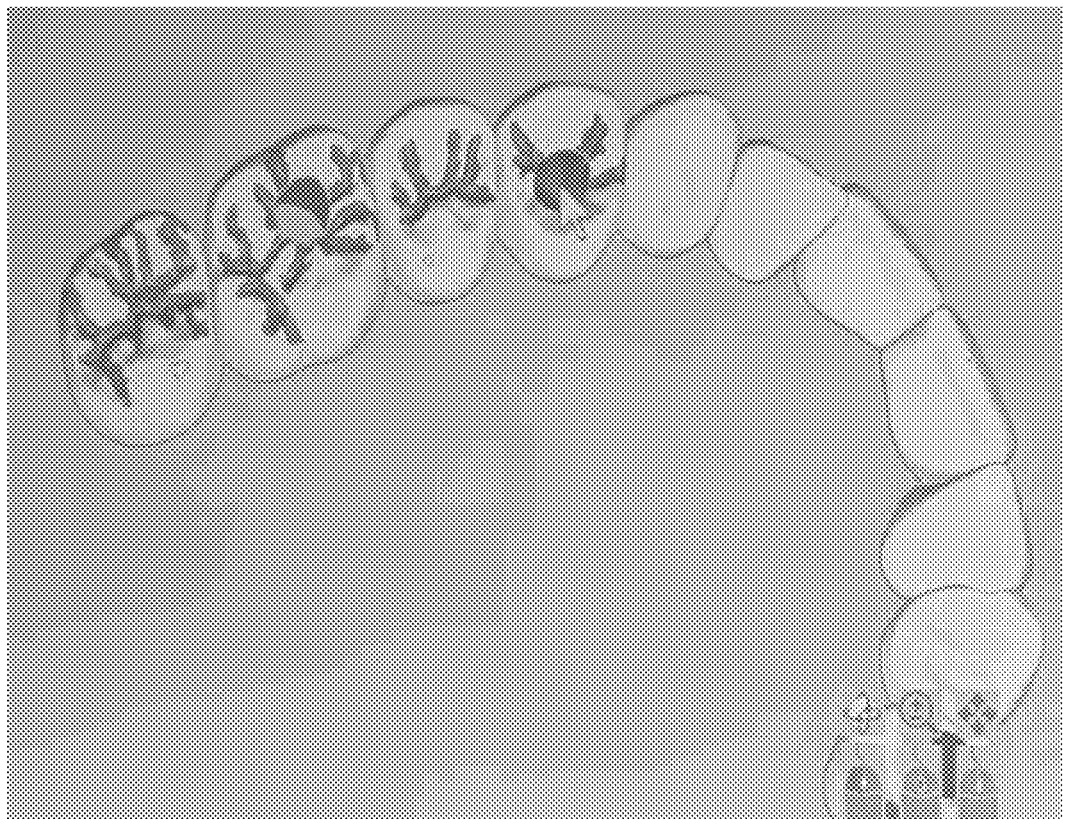

Referring to the exemplary GUI shown in FIG. 59, a user may also interact with a module of the mill computing device 1710 to define a depth limitation of one or more features of the dental bridge 100. For instance, a user may define a depth limitation for each of the abutment holes 130 such that the drill does not create a hole that extends all the way through the disc, or further than necessary. In that regard, the user may instruct the mill to stop drilling an abutment hole 130 at a bottom surface of the tooth portion 112, wherein the bottom surface of the tooth portion is the occlusal/incisal surface or the gingival surface, whatever surface faces the bottom of the disc (or the side of the disc opposite drill entry). In one example, the user simply clicks on a center of the abutment hole 130 on the bottom surface of the tooth portion, such as after selecting a bottom surface instruction.

A user may also interact with a module of the mill computing device 1710 to choose the type of material for the dental bridge 100, such as zirconia in a specific shade/grade/version (e.g. Zirconia Prime, A1). Further, the specific disc of zirconia may be chosen. For instance, a disc of zirconia may be used to produce at least one dental restoration device, and if a disc has sufficient material to generate the designed bridge, it may be chosen for fabrication.

Figure 60:
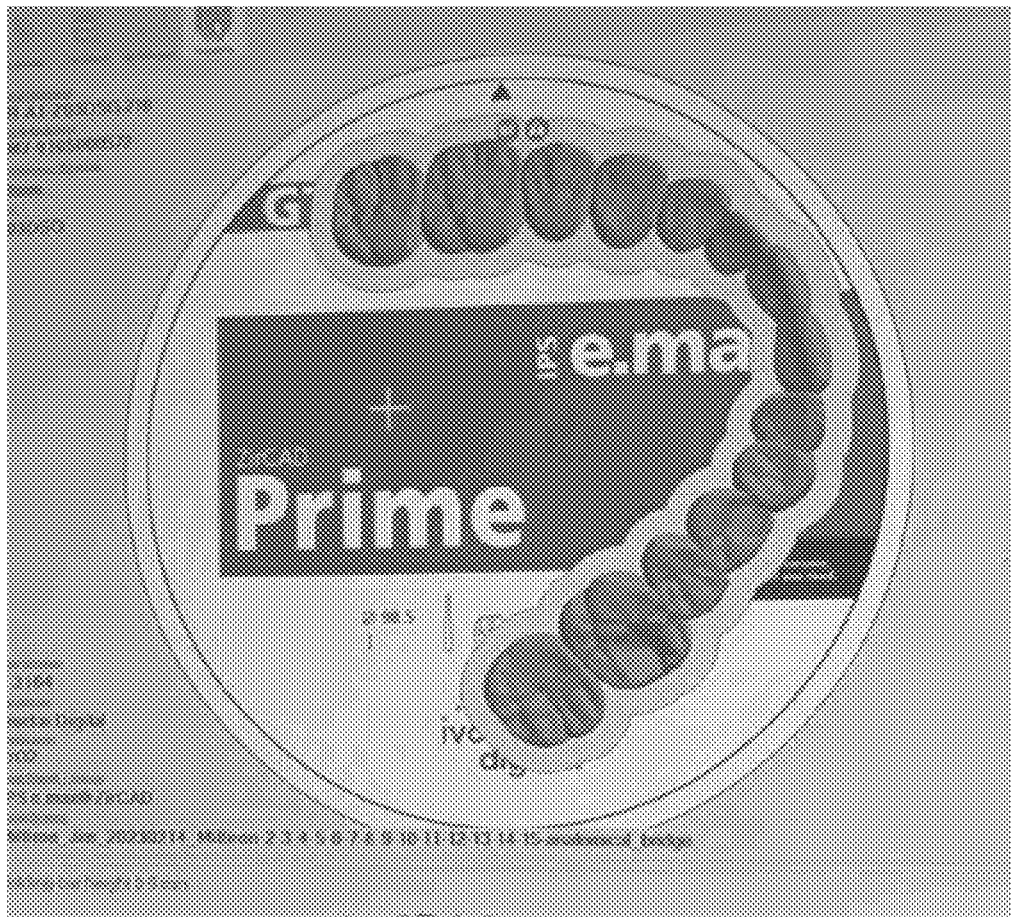

Referring to the exemplary GUI shown in FIG. 60, a user may interact with a module of the mill computing device 1710 to arrange or nest the dental bridge 100 in a disc of material that will be used for fabrication of the bridge, such as in a solid piece disc of zirconia (e.g., IPS e.max ZirCAD Prime). Arranging the dental bridge 100 in a disc of material may include defining a location of the bridge within the disc, an orientation of the bridge within the disc, etc.

In one example, arranging the dental bridge 100 in a disc of material may include aligning the bridge near an outer perimeter of a 3D model of the disc to maximize use of the disc. In one example, arranging the dental bridge 100 in a 3D model of disc of material may also include defining an angle at which the dental bridge is milled from the disc to use a minimum amount of disc height or thickness when fabricating the bridge. For instance, in some instances, an angle of the dental bridge 100 within a disc of material is adjusted to achieve a minimum amount of disc height or thickness used. In one example, arranging the dental bridge 100 in a 3D model of a disc of material may include defining an angle at which the dental bridge is milled from the disc to substantially align the longitudinal axis of the abutment holes with a drill angle. Any other suitable arrangements may also be made.

Figure 61:
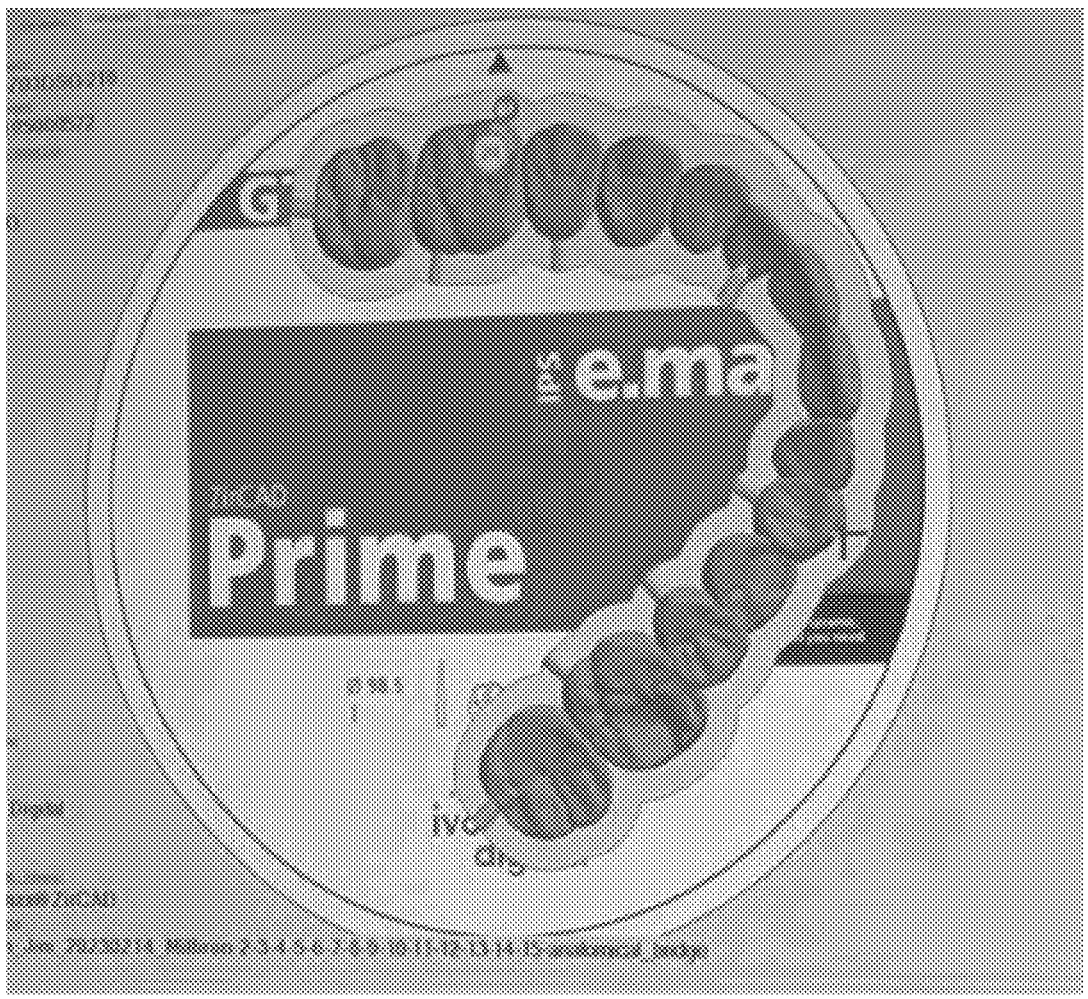

Referring to the exemplary GUI shown in FIG. 61, a user may interact with a module of the mill computing device 1710 to define a plurality of holding features for maintaining the dental bridge 100 within its position in the disc when it is being milled. As can be appreciated, as a portion of the dental bridge 100 is milled/drilled from the disc of material, such as zirconia, the milled portion will need to be maintained in its position within the disc such that the remainder of the bridge can be milled/drilled. For instance, holding bars or the like may be used to secure the bridge in its position within the disc until milling/drilling is complete.

As can be seen in FIG. 61, a holding bar may be defined by a piece of disc material extending between an outer surface of a tooth portion and the remaining material of the 3D model of the disc. In other words, a holding bar is defined as a portion of the disc to be left intact during milling/drilling of the bridge. Any suitable number of holding bars or similar features may be used to secure the dental bridge 100 in its position within the disc, such as at least four holding bars. Ideally, a holding bar is not defined on a crown tooth portion having an abutment hole, seeing as the thickness of a crown tooth portion is less than the pontic tooth portions having no abutment holes. As can be appreciated, an area of decreased thickness of a tooth portion may not provide sufficient strength for the holding bar and/or when the holding bar is later removed.

After milling/drilling is complete except for the holding bars, each holding bar may be severed from the dental bridge 100 and the disc in a manner well known in the art. For instance, a lab technician or other personnel may manually cut the holding bars in between an outer surface of the tooth portion and the disc, such as before curing/sintering the bridge. After the holding bars are removed, fine grinding or other techniques may be used to smooth out the surface of the tooth portion attached to the holding bar. In that regard, a holding bar is preferable not defined on an incisor tooth portion or a tooth portion that is visible when the patient smiles such that the tooth portion is not adversely affected by removal of the holding bar.

Figure 62:
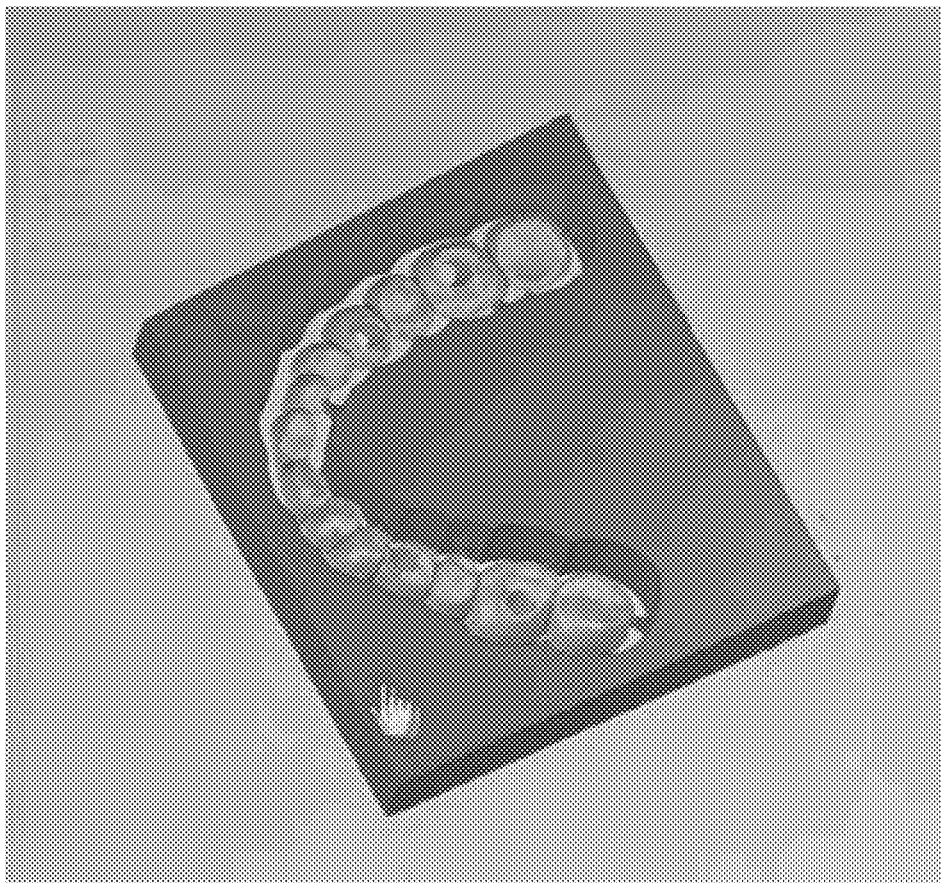

After the milling process has been defined, such as in accordance with the steps described above, a module(s) of the mill computing device 1710 may be used to finalize the fabrication instructions for the mill 1712. Finalization may include performing a verification step to ensure that the milling/drilling instructions for the dental bridge 100 do not conflict with any settings of the mill 1712. A verification step may include comparing parameters of the bridge as defined in the milling instructions to set thresholds of the mill 1712. A verification step may also or instead include running a simulation of the milling process and generating a 3D model of the bridge milled in the simulation. For instance, FIG. 62 depicts an exemplary GUI generated by a module(s) of the mill computing device 1710 upon completion of a milling process simulation. Finalization may also include calculating or otherwise defining the milling job, such as a cut/drill path(s) for the mill 1712.

If any issues are detected during finalization of the fabrication instructions, a module(s) of the mill computing device 1710 may generate an error message, a warning symbol, etc., and adjustments to the milling instructions may be made. Adjustments may include, for example, adjusting the bridge arrangement within the disc, relocating a holding bar, adding a holding bar, etc.

If no issues are detected or after any issues are resolved or dismissed, the mill computing device 1710 may output instructions to the mill 1712 of the fabrication assembly 1708 for carrying out the milling process. In that regard, the mill computing device 1710 is in communication with the mill 1712 using suitable communication means to enable a transfer of data. In some examples, the mill computing device 1710 is an integral part of the mill 1712.

The mill 1712 is configured to perform at least one of milling, drilling, grinding, burring, and cutting material(s) for creating the dental bridge 100 (sometimes simply referred to as "milling" or the like). Any suitable mill may be used, such as the PrograMill® milling machine available from Ivoclar Vivadent Inc. of Amherst, NY.

After the dental bridge 100 has been milled, the holding bars may be cut to release the dental bridge 100 from the disc. Thereafter, fine grinding or other techniques may be used to smooth out the surface of the tooth portion attached to the holding bar. The dental bridge 100 may then be cleaned, painted, dried, cured/sintered, polished, glazed, stained, fired, etc., in accordance with known techniques for creating a zirconia crown. An example of a finished dental bridge ready for installation may be seen in FIG. 12.

As noted above, the steps and techniques described herein may be carried out manually, at least in part, by a user interacting with one or more software modules of a computing device (e.g., the scanner computing device 1716, the design computing device 1706 and/or the mill computing device 1710). In other examples, many of the steps and techniques described herein may be carried out automatically with artificial intelligence, such as by executing one or more machine learning models on a computing device (e.g., the scanner computing device 1716, the design computing device 1706 and/or the mill computing device 1710). In that regard, one or more machine learning models may be trained to generate fabrication instructions for the dental bridge 100 using the dental bridge design as input.

Figure 63:
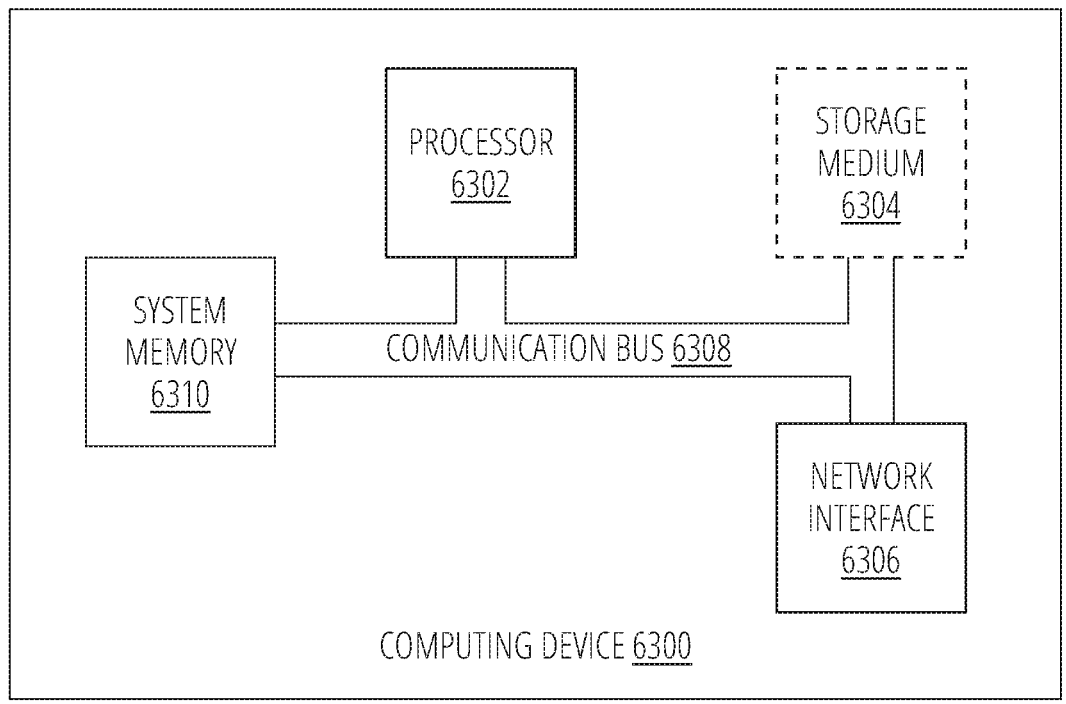
FIG. 63 shows a block diagram that illustrates a non-limiting example embodiment of a computing device appropriate for use as a computing device with embodiments of the present disclosure.

FIG. 63 is a block diagram that illustrates aspects of an exemplary computing device 6300 appropriate for use as a computing device of the present disclosure. While multiple different types of computing devices were discussed above, the exemplary computing device 6300 describes various elements that are common to many different types of computing devices. While FIG. 63 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 6300 may be any one of any number of currently available or yet to be developed devices.

In its most basic configuration, the computing device 6300 includes at least one processor 6302 and a system memory 6310 connected by a communication bus 6308. Depending on the exact configuration and type of device, the system memory 6310 may be volatile or nonvolatile memory, such as read only memory ("ROM"), random access memory ("RAM"), EEPROM, flash memory, or similar memory technology. Those of ordinary skill in the art and others will recognize that system memory 6310 typically stores data and/or program modules that are immediately accessible to and/or currently being operated on by the processor 6302. In this regard, the processor 6302 may serve as a computational center of the computing device 6300 by supporting the execution of instructions.

As further illustrated in FIG. 63, the computing device 6300 may include a network interface 6306 comprising one or more components for communicating with other devices over a network. Embodiments of the present disclosure may access basic services that utilize the network interface 6306 to perform communications using common network protocols. The network interface 6306 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 6306 illustrated in FIG. 63 may represent one or more wireless interfaces or physical communication interfaces described and illustrated above with respect to particular components of the computing device 6300.

In the exemplary embodiment depicted in FIG. 63, the computing device 6300 also includes a storage medium 6304. However, services may be accessed using a computing device that does not include means for persisting data to a local storage medium. Therefore, the storage medium 6304 depicted in FIG. 63 is represented with a dashed line to indicate that the storage medium 6304 is optional. In any event, the storage medium 6304 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 6302, system memory 6310, communication bus 6308, storage medium 6304, and network interface 6306 are known and commercially available. For ease of illustration and because it is not important for an understanding of the claimed subject matter, FIG. 63 does not show some of the typical components of many computing devices. In this regard, the computing device 6300 may include input devices, such as a keyboard, keypad, mouse, microphone, touch input device, touch screen, tablet, and/or the like. Such input devices may be coupled to the computing device 6300 by wired or wireless connections including RF, infrared, serial, parallel, Bluetooth, Bluetooth low energy, USB, or other suitable connections protocols using wireless or physical connections. Similarly, the computing device 6300 may also include output devices such as a display, speakers, printer, etc. Since these devices are well known in the art, they are not illustrated or described further herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an exemplary embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "up", "down", "left", "right", "first", "second", etc., in the present disclosure is meant to provide orientation for the reader with reference to the drawings and is not intended to be the required orientation of the components or graphical images or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIG. Additionally, the inclusion of a structural or method feature in a particular FIG. or described herein is not meant to imply that such feature is required in all embodiments, and, in some embodiments, it may not be included or may be combined with other features. For instance, the method 2002 described above may exclude one or more of the described steps, combine one or more of the described steps, rearrange the order of the described steps, etc.

As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

Where electronic or software components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Headings of sections provided in this patent application and the title of this patent application are for convenience only and are not to be taken as limiting the disclosure in any way.

While preferred embodiments of the present invention have been shown and described herein, it will be apparent to those skilled in the art that such embodiments are provided by way of example only. Numerous variations, changes, and substitutions will now occur to those skilled in the art without departing from the invention. Various alternatives to the embodiments of the invention described herein may be employed in practicing the invention. It is intended that the following claims define the scope of the invention and that methods and structures within the scope of these claims and their equivalents be covered thereby.

Listing of Innovations

Clause 1. A method of making a teeth-only, gingiva-free dental restoration device for a full-arch dental replacement of a replacement arch of a patient, the method comprising: receiving, with a computing device, a model of a replacement arch of a patient having post-extraction tooth sockets defined by a substantially original interdental and interradicular ridge of the patient; generating, with a computing device, a model of a teeth-only, gingiva-free dental restoration device having individual replacement teeth portions, each individual replacement tooth portion having a tooth axis extending between a gingival section and an incisal/occlusal section of the tooth portion; designating, with a computing device, at least first, second, third, and fourth individual replacement teeth portions to include abutment holes based on a location in the model of the replacement arch of at least first, second, third, and fourth straight implants secured within at least first, second, third, and fourth corresponding post-extraction tooth sockets; modifying, with a computing device, at least one of a location, shape, and size of one or more of the teeth portions; and outputting, with a computing device, information regarding the model of the teeth-only, gingiva-free dental restoration device for fabricating a teeth-only, gingiva-free dental restoration device.

Clause 2. The method of Clause 1, further comprising modifying, with a computing device, at least one of a shape, size, and location of the teeth portions to substantially align the tooth axis of each individual replacement teeth portion with a root socket axis of a corresponding post-extraction tooth socket in the model of the replacement arch.

Clause 3. The method of Clause 1, further comprising connecting, with a computing device, adjacent individual replacement teeth portions such that the individual replacement teeth portions define an integrally formed body of the model of a teeth-only, gingiva-free dental restoration device.

Clause 4. The method of Clause 3, wherein connecting, with a computing device, adjacent individual replacement teeth portions includes at least one of enlarging at least a portion of at least one of the adjacent individual replacement teeth portions and reshaping at least a portion of at least one of the adjacent individual replacement teeth portions Clause 5. The method of Clause 1, further comprising locating, with a computing device, each of the individual replacement teeth portions relative to corresponding post-extraction tooth sockets in the model of the replacement arch such that the tooth axis of each individual replacement tooth portion is substantially coaxially aligned with a longitudinal axis of the corresponding post-extraction tooth socket and the gingival section of each individual replacement tooth portion is configured to seal against the corresponding post-extraction tooth socket.

Clause 6. The method of Clause 5, wherein locating, with a computing device, each of the individual replacement teeth portions relative to the corresponding post-extraction tooth sockets in the model of the replacement arch includes at least one of rearranging the individual replacement teeth portions, moving the individual replacement teeth portions, and rotating the individual replacement teeth portions, either individually or together.

Clause 7. The method of Clause 1, further comprising locating, with a computing device, each of the individual replacement teeth portions relative to corresponding post-extraction tooth sockets in the model of the replacement arch such that the gingival section of each individual replacement tooth portion seals against the corresponding post-extraction tooth socket.

Clause 8. The method of Clause 1, further comprising locating, with a computing device, each of the individual replacement teeth portions relative to a model of an antagonist arch of the patient such that the incisal/occlusal section of each of the tooth portions is configured to substantially engage an incisal/occlusal section of corresponding tooth portions in the model of the antagonist arch.

Clause 9. The method of Clause 1, wherein modifying, with a computing device, at least one of a location, shape, and size of one or more of the teeth portions includes at least one of rearranging the individual replacement teeth portions, moving the individual replacement teeth portions, resizing the individual replacement teeth portions, scaling the individual replacement teeth portions, rotating the individual replacement teeth portions, shear tilting the individual replacement teeth portions, reshaping the individual replacement teeth portions, transforming the individual replacement teeth portions, morphing the individual replacement teeth portions, contouring the individual replacement teeth portions, and distorting the individual replacement teeth portions, either individually or together.

Clause 10. The method of Clause 1, further comprising generating, with a computing device, a biting plane for the individual replacement teeth portions.

Clause 11. The method of Clause 10, further comprising moving, with a computing device, the biting plane such that it is substantially aligned with at least one of distal end surfaces of at least first, second, third, and fourth scan bodies secured to the at least first, second, third, and fourth straight implants in the model of the replacement arch and incisal/occlusal surfaces of tooth portions of a model of an antagonist arch of the patient.

Clause 12. The method of Clause 1, further comprising defining, with a computing device, a size, shape, and longitudinal axis of an abutment hole in each of the at least first, second, third, and fourth individual replacement teeth portions to include abutment holes, wherein the longitudinal axis of each abutment hole is substantially coaxially aligned with the tooth axis of corresponding individual replacement tooth portion.

Clause 13. The method of Clause 12, wherein the size, shape, and longitudinal axis of each of the abutment holes in the at least first, second, third, and fourth individual replacement teeth portions to include abutment holes is substantially the same as a size, shape, and longitudinal axis of corresponding at least first, second, third, and fourth scan bodies secured to the at least first, second, third, and fourth straight implants in the model of the replacement arch.

Clause 14. The method of Clause 13, wherein the longitudinal axis of each of the at least first, second, third, and fourth scan bodies is substantially coaxially aligned with a longitudinal implant axis of each of the corresponding at least first, second, third, and fourth straight implants, and wherein the longitudinal implant axis of each of the corresponding at least first, second, third, and fourth straight implants is substantially coaxially aligned with the longitudinal axis of the corresponding post-extraction tooth socket.

Clause 15. The method of Clause 13, wherein each of the abutment holes is generally cylindrical in shape and has an inner diameter about 1 mm larger than an outer diameter of the corresponding scan body.

Clause 16. The method of Clause 13, further comprising defining, with a computing device, a size and shape of each of the abutment holes in the at least first, second, third, and fourth individual replacement teeth portions to include abutment holes by at least one of smoothing an exterior surface of the corresponding at least first, second, third, and fourth scan bodies and enlarging the corresponding at least first, second, third, and fourth scan bodies.

Clause 17. The method of Clause 13, further comprising defining, with a computing device, margin lines of an abutment hole enlarged opening on at least one of a gingival side and an incisal/occlusal side of each of the at least first, second, third, and fourth individual replacement teeth portions to include abutment holes by at least one of encircling a base portion of the corresponding scan body and identifying a generally circular dimple in gums the corresponding scan body in the model of the replacement arch.

Clause 18. The method of Clause 13, further comprising at least one of increasing a height of a scan body, decreasing a height of a corresponding tooth portion, and reshaping an incisal/occlusal section of the corresponding tooth portion to expose a top end of the scan body such that the scan body protrudes through an incisal/occlusal surface of the corresponding tooth portion with a computing device.

Clause 19. The method of Clause 12, further comprising defining, with a computing device, an abutment hole enlarged opening on a gingival side of each of the at least first, second, third, and fourth individual replacement teeth portions to include abutment holes, the abutment hole enlarged opening substantially sized and shaped to receive an abutment skirt of an abutment with an abutment body of the abutment extending into the abutment hole.

Clause 20. The method of Clause 19, further comprising defining, with a computing device, a size of the abutment hole enlarged opening to receive an abutment skirt of an abutment such that the abutment is engageable with a collar of an implant located generally above an outer cortex layer of bone at least partially in the gingiva layer.

Clause 21. The method of Clause 12, further comprising defining, with a computing device, a minimum thickness surrounding each abutment hole of each of the at least first, second, third, and fourth individual replacement teeth portions to include abutment holes.

Clause 22. The method of Clause 1, wherein each straight implant has an implant axis that is substantially coaxially aligned with a tooth socket axis of the corresponding post-extraction tooth socket in the model of the replacement arch and has a threaded opening for receiving an abutment screw with a thread axis extending substantially along the implant axis.

Clause 23. The method of Clause 1, further comprising adjusting, with a computing device, penetration areas of the gingival section of the teeth portions with gums covering the original interdental and interradicular ridge of the patient in the model of the replacement arch to substantially eliminate gaps between the gingival section of the individual replacement teeth portions and the gums.

Clause 24. The method of Clause 23, further comprising substantially eliminating, with a computing device, penetration areas of the gingival section of the individual replacement teeth portions with the gums in areas of the gums surrounding each of the abutment holes.

Clause 25. The method of Clause 1, wherein outputting, with a computing device, instructions for fabricating the dental restoration device includes defining at least one tool path of a mill for milling the teeth-only, gingiva-free dental restoration device from a piece of material.

Clause 26. The method of Clause 1, wherein outputting, with a computing device, instructions for fabricating the dental restoration device includes sending data containing the model of the teeth-only, gingiva-free dental restoration device to a computing device of a fabrication system.

Clause 27. The method of Clause 1, 25, or 26 further comprising fabricating, with a fabrication machine, a teeth-only, gingiva-free dental restoration device in accordance with the instructions.

Clause 28. The method of Clause 1, further comprising orienting, with a computing device, the model of the teeth-only, gingiva-free dental restoration device in a model of a piece of material to define a drill insertion angle for each abutment hole that is substantially coaxially aligned with a longitudinal axis of the abutment hole, wherein the longitudinal axis of each abutment hole is substantially coaxially aligned with the longitudinal axis of the corresponding individual replacement tooth portion.

Clause 29. The method of Clause 28, further comprising defining, with a computing device, a drill depth limitation for each of the abutment holes.

Clause 30. The method of Clause 1, further comprising executing, with a computing device one or more machine learning models to generate instructions for fabricating the dental restoration device as output using the model of the teeth-only, gingiva-free dental restoration device as input.

Clause 31. The method of Clause 1, further comprising executing, with a computing device one or more machine learning models to define at least one of a location, shape, and size of one or more of the individual replacement teeth portions as output using at least one of scan data of an antagonist arch of the patient, scan data of the replacement arch before extraction, scan data of the replacement arch after extraction and before implant placement, scan data of the replacement arch after extraction and after implant placement, scan data of the replacement arch after extraction and implant placement with scan bodies, implant specifications, abutment specifications, required crown tooth portion size surrounding an abutment hole, aesthetic requirements, and bridge material as input.

Clause 32. The method of Clause 31, further comprising training, with a computing device the at least one machine learning model to define at least one of a location, shape, and size of one or more of the individual replacement teeth portions as output using as training data a plurality of models of teeth-only, gingiva-free dental restoration devices and at least one of corresponding scan data of the antagonist arch, corresponding scan data of the replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetic requirements, and corresponding bridge material.

Clause 33. The method of Clause 31, further comprising training the one or more machine learning models by: receiving, by a computing device, training data including models of teeth-only, gingiva-free dental restoration devices for replacement arches of patients and at least one of corresponding scan data of the antagonist arch, corresponding scan data of the replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetic requirements, and corresponding bridge material; adding, by a computing device, the training data in a data store; training, by a computing device, the machine learning model to define at least one of a location, shape, and size of one or more of the individual replacement teeth portions as output using the training data as input; and storing, by a computing device, the one or more machine learning models in a data store.

Clause 34. A method of training one or more machine learning models to generate a model of a teeth-only, gingiva-free dental restoration device for a replacement arch of a patient, comprising: receiving, by a computing device, training data including models of teeth-only, gingiva-free dental restoration devices for replacement arches of patients and at least one of corresponding scan data of an antagonist arch, corresponding scan data of a replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetics requirements, and corresponding bridge material; adding, by a computing device, the training data in a data store; training, by a computing device, the machine learning model to generate a model of a teeth-only, gingiva-free dental restoration device for the replacement arch of the patient using the training data as input; and storing, by a computing device, the one or more machine learning models in a data store.

Clause 35. A method of using one or more machine learning models to generate a model of a teeth-only, gingiva-free dental restoration device for a replacement arch of a patient, the method comprising: receiving, with a computing device, at least one input regarding dental restoration for the replacement arch of a patient including at least one of scan data of an antagonist arch of the patient, scan data of the replacement arch before extraction, scan data of the replacement arch after extraction and before implant placement, scan data of the replacement arch after extraction and after implant placement, scan data of the replacement arch after extraction and implant placement with scan bodies, implant specifications, abutment specifications, required crown tooth portion size surrounding an abutment hole, aesthetic requirements, and bridge material; retrieving, by a computing device, one or more machine learning models from a data store; and processing, by a computing device, the input using the one or more machine learning models to generate a model of a teeth-only, gingiva-free dental restoration device for the replacement arch of the patient as output.

Clause 36. A system for making a teeth-only, gingiva-free dental restoration device for a full-arch dental replacement of a replacement arch of a patient, the method comprising: a scanning system having a scanner for capturing scan data of a replacement arch of a patient having post-extraction tooth sockets defined by a substantially original interdental and interradicular ridge of the patient; a design computing device having at least one processor and a non-transitory computer-readable medium; wherein the design computing device is communicatively coupled to the scanning system; wherein the non-transitory computer-readable medium has a data store and computer-executable instructions stored thereon; and wherein the instructions, in response to execution by the at least one processor, cause the design computing device to perform actions comprising: receiving a model of the replacement arch of the patient generated from the scan data; generating a model of a teeth-only, gingiva-free dental restoration device having individual replacement teeth portions, each individual replacement tooth portion having a tooth axis extending between a gingival section and an incisal/occlusal section of the tooth portion; designating at least first, second, third, and fourth individual replacement teeth portions to include abutment holes based on a location in the model of the replacement arch of at least first, second, third, and fourth straight implants secured within at least first, second, third, and fourth corresponding post-extraction tooth sockets; modifying at least one of a location, shape, and size of one or more of the teeth portions; and outputting information regarding the model of the teeth-only, gingiva-free dental restoration device for fabricating a teeth-only, gingiva-free dental restoration device.

Clause 37. The system of Clause 36, wherein the instructions, in response to execution by the at least one processor, cause the design computing device to perform actions comprising: modifying at least one of a shape, size, and location of the teeth portions to substantially align the tooth axis of each individual replacement teeth portion with a root socket axis of a corresponding post-extraction tooth socket in the model of the replacement arch.

Clause 38. The system of Clause 36, wherein the instructions, in response to execution by the at least one processor, cause the design computing device to perform actions comprising: connecting adjacent individual replacement teeth portions such that the individual replacement teeth portions define an integrally formed body of the model of a teeth-only, gingiva-free dental restoration device.

Clause 39. The system of Clause 38, wherein connecting, with a computing device, adjacent individual replacement teeth portions includes at least one of enlarging at least a portion of at least one of the adjacent individual replacement teeth portions and reshaping at least a portion of at least one of the adjacent individual replacement teeth portions Clause 40. The system of Clause 36, wherein the instructions, in response to execution by the at least one processor, cause the design computing device to perform actions comprising: locating each of the individual replacement teeth portions relative to corresponding post-extraction tooth sockets in the model of the replacement arch such that the tooth axis of each individual replacement tooth portion is substantially coaxially aligned with a longitudinal axis of the corresponding post-extraction tooth socket and the gingival section of each individual replacement tooth portion is configured to seal against the corresponding post-extraction tooth socket.

Clause 41. The system of Clause 40, wherein locating, with a computing device, each of the individual replacement teeth portions relative to the corresponding post-extraction tooth sockets in the model of the replacement arch includes at least one of rearranging the individual replacement teeth portions, moving the individual replacement teeth portions, and rotating the individual replacement teeth portions, either individually or together.

Clause 42. The system of Clause 36, wherein the instructions, in response to execution by the at least one processor, cause the design computing device to perform actions comprising: locating each of the individual replacement teeth portions relative to corresponding post-extraction tooth sockets in the model of the replacement arch such that the gingival section of each individual replacement tooth portion seals against the corresponding post-extraction tooth socket.

Clause 43. The system of Clause 36, wherein the instructions, in response to execution by the at least one processor, cause the design computing device to perform actions comprising: locating each of the individual replacement teeth portions relative to a model of an antagonist arch of the patient such that the incisal/occlusal section of each of the tooth portions is configured to substantially engage an incisal/occlusal section of corresponding tooth portions in the model of the antagonist arch.

Clause 44. The system of Clause 36, wherein modifying at least one of a location, shape, and size of one or more of the teeth portions includes at least one of rearranging the individual replacement teeth portions, moving the individual replacement teeth portions, resizing the individual replacement teeth portions, scaling the individual replacement teeth portions, rotating the individual replacement teeth portions, shear tilting the individual replacement teeth portions, reshaping the individual replacement teeth portions, transforming the individual replacement teeth portions, morphing the individual replacement teeth portions, contouring the individual replacement teeth portions, and distorting the individual replacement teeth portions, either individually or together.

Clause 45. The system of Clause 36, wherein the instructions, in response to execution by the at least one processor, cause the design computing device to perform actions comprising: generating a biting plane for the individual replacement teeth portions.

Clause 46. The system of Clause 45, wherein the instructions, in response to execution by the at least one processor, cause the design computing device to perform actions comprising: moving the biting plane such that it is substantially aligned with at least one of distal end surfaces of at least first, second, third, and fourth scan bodies secured to the at least first, second, third, and fourth straight implants in the model of the replacement arch and incisal/occlusal surfaces of tooth portions of a model of an antagonist arch of the patient.

Clause 47. The system of Clause 36, wherein the instructions, in response to execution by the at least one processor, cause the design computing device to perform actions comprising: defining a size, shape, and longitudinal axis of an abutment hole in each of the at least first, second, third, and fourth individual replacement teeth portions to include abutment holes, wherein the longitudinal axis of each abutment hole is substantially coaxially aligned with the tooth axis of corresponding individual replacement tooth portion.

Clause 48. The system of Clause 47, wherein the size, shape, and longitudinal axis of each of the abutment holes in the at least first, second, third, and fourth individual replacement teeth portions to include abutment holes is substantially the same as a size, shape, and longitudinal axis of corresponding at least first, second, third, and fourth scan bodies secured to the at least first, second, third, and fourth straight implants in the model of the replacement arch.

Clause 49. The system of Clause 48, wherein the longitudinal axis of each of the at least first, second, third, and fourth scan bodies is substantially coaxially aligned with a longitudinal implant axis of each of the corresponding at least first, second, third, and fourth straight implants, and wherein the longitudinal implant axis of each of the corresponding at least first, second, third, and fourth straight implants is substantially coaxially aligned with the longitudinal axis of the corresponding post-extraction tooth socket.

Clause 50. The system of Clause 49, wherein each of the abutment holes is generally cylindrical in shape and has an inner diameter about 1 mm larger than an outer diameter of the corresponding scan body.

Clause 51. The system of Clause 49, wherein the instructions, in response to execution by the at least one processor, cause the design computing device to perform actions comprising: defining a size and shape of each of the abutment holes in the at least first, second, third, and fourth individual replacement teeth portions to include abutment holes by at least one of smoothing an exterior surface of the corresponding at least first, second, third, and fourth scan bodies and enlarging the corresponding at least first, second, third, and fourth scan bodies.

The embodiments of the invention in which an exclusive property or privilege is claimed are defined as follows:

1. A method of making a teeth-only, gingiva-free dental restoration device for a full-arch dental replacement of a replacement arch of a patient, the method comprising:
receiving, with a computing device, a model of a replacement arch of a patient having post-extraction tooth sockets defined by a substantially original interdental and interradicular ridge of the patient;

generating, with a computing device, a model of a teeth-only, gingiva-free dental restoration device having individual replacement teeth portions, each individual replacement tooth portion having a tooth axis extending between a gingival section and an incisal/occlusal section of the tooth portion;

designating, with a computing device, at least first, second, third, and fourth individual replacement teeth portions to include abutment holes based on a location in the model of the replacement arch of at least first, second, third, and fourth straight implants secured within at least first, second, third, and fourth corresponding post-extraction tooth sockets;

modifying, with a computing device, at least one of a location, shape, and size of one or more of the teeth portions;

outputting, with a computing device, fabrication instructions regarding the model of the teeth-only, gingiva-free dental restoration device for fabricating a teeth-only, gingiva-free dental restoration device;

receiving, with a computing device in communication with a mill, the fabrication instructions; and fabricating, with the mill, the teeth-only, gingiva-free dental restoration device from a solid piece disc of zirconia based on the fabrication instructions.

2. The method of claim 1, further comprising modifying, with a computing device, at least one of a shape, size, and location of the teeth portions to substantially align the tooth axis of each individual replacement teeth portion with a root socket axis of a corresponding post-extraction tooth socket in the model of the replacement arch.

3. The method of claim 1, further comprising connecting, with a computing device, adjacent individual replacement teeth portions such that the individual replacement teeth portions define an integrally formed body of the model of a teeth-only, gingiva-free dental restoration device.

4. The method of claim 3, wherein connecting, with a computing device, adjacent individual replacement teeth portions includes at least one of enlarging at least a portion of at least one of the adjacent individual replacement teeth portions and reshaping at least a portion of at least one of the adjacent individual replacement teeth portions.

5. The method of claim 1, further comprising locating, with a computing device, each of the individual replacement teeth portions relative to corresponding post-extraction tooth sockets in the model of the replacement arch such that the tooth axis of each individual replacement tooth portion is substantially coaxially aligned with a longitudinal axis of the corresponding post-extraction tooth socket and the gingival section of each individual replacement tooth portion is configured to seal against the corresponding post-extraction tooth socket.

6. The method of claim 1, further comprising locating, with a computing device, each of the individual replacement teeth portions relative to corresponding post-extraction tooth sockets in the model of the replacement arch such that the gingival section of each individual replacement tooth portion seals against the corresponding post-extraction tooth socket.

7. The method of claim 1, wherein modifying, with a computing device, at least one of a location, shape, and size of one or more of the teeth portions includes at least one of rearranging the individual replacement teeth portions, moving the individual replacement teeth portions, resizing the individual replacement teeth portions, scaling the individual replacement teeth portions, rotating the individual replacement teeth portions, shear tilting the individual replacement teeth portions, reshaping the individual replacement teeth portions, transforming the individual replacement teeth portions, morphing the individual replacement teeth portions, contouring the individual replacement teeth portions, and distorting the individual replacement teeth portions, either individually or together.

8. The method of claim 1, further comprising:
generating, with a computing device, a biting plane for the individual replacement teeth portions; and
moving, with a computing device, the biting plane such that it is substantially aligned with at least one of distal end surfaces of at least first, second, third, and fourth scan bodies secured to the at least first, second, third, and fourth straight implants in the model of the replacement arch and incisal/occlusal surfaces of tooth portions of a model of an antagonist arch of the patient.

9. The method of claim 1, further comprising defining, with a computing device, a size, shape, and longitudinal axis of an abutment hole in each of the at least first, second, third, and fourth individual replacement teeth portions to include abutment holes, wherein the longitudinal axis of each abutment hole is substantially coaxially aligned with the tooth axis of corresponding individual replacement tooth portion.

10. The method of claim 9, wherein the size, shape, and longitudinal axis of each of the abutment holes in the at least first, second, third, and fourth individual replacement teeth portions to include abutment holes is substantially the same as a size, shape, and longitudinal axis of corresponding at least first, second, third, and fourth scan bodies secured to the at least first, second, third, and fourth straight implants in the model of the replacement arch, wherein the longitudinal axis of each of the at least first, second, third, and fourth scan bodies is substantially coaxially aligned with a longitudinal implant axis of each of the corresponding at least first, second, third, and fourth straight implants, and wherein the longitudinal implant axis of each of the corresponding at least first, second, third, and fourth straight implants is substantially coaxially aligned with the longitudinal axis of the corresponding post-extraction tooth socket.

11. The method of claim 9, further comprising defining, with a computing device, an abutment hole enlarged opening on a gingival side of each of the at least first, second, third, and fourth individual replacement teeth portions to include abutment holes, the abutment hole enlarged opening substantially sized and shaped to receive an abutment skirt of an abutment with an abutment body of the abutment extending into the abutment hole, wherein a size of the abutment hole enlarged opening is configured to receive an abutment skirt of an abutment such that the abutment is engageable with a collar of an implant located generally above an outer cortex layer of bone at least partially in the gingiva layer.

12. The method of claim 1, further comprising executing, with a computing device, one or more machine learning models to generate instructions for fabricating the dental restoration device as output using the model of the teeth-only, gingiva-free dental restoration device as input.

13. The method of claim 1, further comprising executing, with a computing device, one or more machine learning models to define at least one of a location, shape, and size of one or more of the individual replacement teeth portions as output using at least one of scan data of an antagonist arch of the patient, scan data of the replacement arch before extraction, scan data of the replacement arch after extraction and before implant placement, scan data of the replacement arch after extraction and after implant placement, scan data of the replacement arch after extraction and implant placement with scan bodies, implant specifications, abutment specifications, required crown tooth portion size surrounding an abutment hole, aesthetic requirements, and bridge material as input.

14. The method of claim 13, further comprising training, with a computing device, the at least one machine learning model to define at least one of a location, shape, and size of one or more of the individual replacement teeth portions as output using as training data a plurality of models of teeth-only, gingiva-free dental restoration devices and at least one of corresponding scan data of the antagonist arch, corresponding scan data of the replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetic requirements, and corresponding bridge material.

15. The method of claim 13, further comprising training the one or more machine learning models by:

receiving, by a computing device, training data including models of teeth-only, gingiva-free dental restoration devices for replacement arches of patients and at least one of corresponding scan data of the antagonist arch, corresponding scan data of the replacement arch before extraction, corresponding scan data of the replacement arch after extraction and before implant placement, corresponding scan data of the replacement arch after extraction and after implant placement, corresponding scan data of the replacement arch after extraction and implant placement with scan bodies, corresponding implant specifications, corresponding abutment specifications, crown tooth portion size surrounding an abutment hole, corresponding aesthetic requirements, and corresponding bridge material;

adding, by a computing device, the training data in a data store;

training, by a computing device, the machine learning model to define at least one of a location, shape, and size of one or more of the individual replacement teeth portions as output using the training data as input; and storing, by a computing device, the one or more machine learning models in a data store.

\* \* \* \* \*